US008161463B2

(12) United States Patent
Johnson et al.

(10) Patent No.: US 8,161,463 B2
(45) Date of Patent: Apr. 17, 2012

(54) SYSTEM AND METHOD OF INTERLOCKING TO PROTECT SOFTWARE—MEDIATED PROGRAM AND DEVICE BEHAVIORS

(75) Inventors: Harold Joseph Johnson, Ottawa (CA); Yuan Xiang Gu, Ottawa (CA); Yongxin Zhou, Mequon, WI (US)

(73) Assignee: Irdeto Canada Corporation, Ottawa, ON (CA)

( * ) Notice: Subject to any disclaimer, the term of this patent is extended or adjusted under 35 U.S.C. 154(b) by 1172 days.

(21) Appl. No.: 11/980,392

(22) Filed: Oct. 31, 2007

(65) Prior Publication Data

US 2008/0208560 A1    Aug. 28, 2008

Related U.S. Application Data

(62) Division of application No. 11/709,654, filed on Feb. 23, 2007.

(51) Int. Cl.
*G06F 9/45* (2006.01)
*G06F 12/14* (2006.01)

(52) U.S. Cl. .......... 717/136; 717/137; 726/26; 713/190; 713/193

(58) Field of Classification Search .................. None
See application file for complete search history.

(56) References Cited

U.S. PATENT DOCUMENTS

| | | | |
|---|---|---|---|
| 5,892,899 A * | 4/1999 | Aucsmith et al. | 726/27 |
| 6,088,452 A | 7/2000 | Johnson et al. | |
| 6,192,475 B1 * | 2/2001 | Wallace | 713/190 |
| 6,594,761 B1 | 7/2003 | Chow et al. | |

(Continued)

FOREIGN PATENT DOCUMENTS

WO    03046698 A1    5/2003

OTHER PUBLICATIONS

Zhou, Y., et al., "Information Hiding in Software with Mixed Boolean-Arithmetic Transforms", Proceedngs of the 8th International Conference on Information Security Applications [online], Aug. 2007 [retrieved Jun. 28, 2011], Retrieved from Internet: <http://www.springerlink.com/content/m70619k7735620n4/fulltext.pdf>, pp. 61-75.*

(Continued)

*Primary Examiner* — Tuan Dam
*Assistant Examiner* — Todd Aguilera

(57) ABSTRACT

A method for rendering software resistant to reverse engineering. Replace at least one first constant (mathematical expression, etc.) in a computational expression with a second mixed mathematical and bitwise-Boolean expression, the first constant being simpler than the second expression and the second expression being based on the value or the variables found in the first constant (or expression). Evaluation of the second mixed mathematical and bitwise-Boolean expression produces a value preserving the value of the first constant, either: with the original value of the first constant or the original value of the result of the first expression, in which case the second mixed mathematical and bitwise-Boolean expression is obtained from the first constant by converting the first constant by mathematical identities; or, in an encoded form, as a new value, which can be converted back to the original value of the first constant by applying an information-preserving decoding function, in which case the second mixed mathematical and bitwise-Boolean expression is obtained from the first constant by modifying the first constant by a combination of conversion according to mathematical identities and transformation according to an information preserving encoding function.

18 Claims, 6 Drawing Sheets

U.S. PATENT DOCUMENTS

| | | | |
|---|---|---|---|
| 6,668,325 | B1 | 12/2003 | Collberg et al. |
| 6,779,114 | B1 | 8/2004 | Chow et al. |
| 6,842,862 | B2 | 1/2005 | Chow et al. |
| 7,243,340 | B2 * | 7/2007 | Tobin ............................. 717/130 |
| 7,287,166 | B1 | 10/2007 | Chang et al. |
| 7,334,133 | B2 * | 2/2008 | Goubin ........................ 713/190 |
| 7,350,085 | B2 * | 3/2008 | Johnson et al. ............... 713/193 |
| 7,397,916 | B2 * | 7/2008 | Johnson et al. ................. 380/28 |
| 7,430,670 | B1 * | 9/2008 | Horning et al. ............... 713/190 |
| 7,506,177 | B2 * | 3/2009 | Chow et al. ................... 713/194 |
| 7,634,091 | B2 * | 12/2009 | Zhou et al. .................... 380/277 |
| 7,757,097 | B2 * | 7/2010 | Atallah et al. ................ 713/187 |
| 7,779,394 | B2 * | 8/2010 | Horning et al. ............... 717/136 |
| 7,966,499 | B2 * | 6/2011 | Kandanchatha et al. ..... 713/190 |
| 2003/0163718 | A1 | 8/2003 | Johnson et al. |
| 2004/0025032 | A1 * | 2/2004 | Chow et al. ................... 713/189 |
| 2004/0030905 | A1 | 2/2004 | Chow et al. |
| 2004/0139340 | A1 | 7/2004 | Johnson et al. |
| 2005/0002532 | A1 | 1/2005 | Zhou et al. |
| 2005/0166191 | A1 | 7/2005 | Kandanchatha et al. |
| 2005/0210275 | A1 | 9/2005 | Horning et al. |
| 2006/0031686 | A1 | 2/2006 | Atallah et al. |
| 2010/0058477 | A1 * | 3/2010 | Ciet et al. ........................ 726/26 |
| 2010/0199354 | A1 * | 8/2010 | Eker et al. ....................... 726/26 |

OTHER PUBLICATIONS

Batchelder, M., "Java Bytecode Obfuscation", McGill University [online], Jan. 2007 [retrieved Jun. 28, 2011], Retrieved from Internet: <http://www.sable.mcgill.ca/publications/thesis/masters-mbatchelder/sable-thesis-2007-masters-mbatchelder.pdf>, whole document (cover—p. 125).*

Warren, H., "Hacker's Delight" [online]. Boston, MA, Addison-Wesley, 2002 [retrieved Jun. 30, 2011], Retrieved from Internet: <http://academic.safaribooksonline.com>, pp. vii, 1-20, ISBN 0201914654.*

Ertaul, L., et al. "Novel Obfuscation Algorithms for Software Security", 2005 International Conference on Software Engineering and Research [online], 2005 [retrieved Dec. 7, 2011], Retrieved from Internet: <http://citeseerx.ist.psu.edu/viewdoc/summary?doi=10.1.1.62.7268>, pp. 1-7.*

Chow, S., et al., "An approach to the Obfuscation of Control-Flow of Sequential Computer Programs" Lecture Notes in Computer Science [online], 2001 [retrieved Dec. 7, 2011], Retrieved from Internet: <http://www.springerlink.com/content/41135jkqxv9I3xme/>, pp. 144-155.*

Office Action dated Jan. 20, 2011; U.S. Appl. No. 11/709,654, filed Feb. 23, 2007.

International Search Report for PCT Patent Application No. PCT/CA2008/000331, dated May 23, 2008.

European Patent Application No. 08714655.1, Search Report dated Dec. 23, 2010.

* cited by examiner

```
U
  if ( c ) {
    V
  }
  else {
    W
  }
  Z
```

FIGURE 4A

```
U
switch ( i ) {
case v₁ :
  V₁ ;
  break;
case v₂ :
  V₂ ;
  break;

case vₖ :
  Vₖ ;
  break;
default:
  W
}
Z
```

FIGURE 4B $U$
if ( $c$ ) {
  $V$
}
$Z$

FIGURE 5A $U$
switch ( $i$ ) {
  case $v_1$ :
    $V_1$ ;
    break;

case $v_{i-1}$ :
    $V_{i-1}$ ;
    break;
  case $v_i$ : /* no code */
    break;
  case $v_{i+1}$ :
    $V_{i+1}$ ;
    break;

case $v_k$ :
    $V_k$ ;
    break;
  default:
    $W$
}
$Z$

FIGURE 5B

SYSTEM AND METHOD OF INTERLOCKING TO PROTECT SOFTWARE—MEDIATED PROGRAM AND DEVICE BEHAVIORS

RELATED APPLICATION

This application is a divisional application of U.S. patent application Ser. No. 11/709,654 filed on 23 Feb. 2007.

FIELD OF THE INVENTION

The present invention relates generally to compiler technology. More specifically, the present invention relates to methods and devices for thwarting control flow and code editing based attacks on software.

BACKGROUND TO THE INVENTION

The following document makes reference to a number of external documents. For ease of reference, these documents will be referred to by the following reference numerals:

1. O. Billet, H. Gilbert, C. Ech-Chatbi, *Cryptanalysis of a White Box AES Implementation*, Proceedings of sac 2004—Conference on Selected Areas in Cryptography, August, 2004, revised papers. Springer (LNCS 3357).
2. Stanley T. Chow, Harold J. Johnson, and Yuan Gu. Tamper Resistant Software Encoding. U.S. Pat. No. 6,594,761.
3. Stanley T. Chow, Harold J. Johnson, and Yuan Gu. Tamper Resistant Software Control Flow Encoding. U.S. Pat. No. 6,779,114.
4. Stanley T. Chow, Harold J. Johnson, and Yuan Gu. Tamper Resistant Software Encoding. U.S. divisional Pat. No. 6,842,862.
5. Stanley T. Chow, Harold J. Johnson, Alexander Shokurov. Tamper Resistant Software Encoding and Analysis. 2004. U.S. Pat. No. 7,506,177.
6. Stanley Chow, Yuan X. Gu, Harold Johnson, and Vladimir A. Zakharov, *An Approach to the Obfuscation of Control-Flow of Sequential Computer Programs*, Proceedings of isc 2001—Information Security, 4th International Conference (LNCS 2200), Springer, October, 2001, pp. 144-155.
7. S. Chow, P. Eisen, H. Johnson, P. C. van Oorschot, *White-Box Cryptography and an AES Implementation* Proceedings of SAC 2002—Conference on Selected Areas in Cryptography, March, 2002 (LNCS 2595), Springer, 2003.
8. S. Chow, P. Eisen, H. Johnson, P. C. van Oorschot, A White-Box DES Implementation for DRM Applications, Proceedings of DRM 2002—2nd ACM Workshop on Digital Rights Management, Nov. 18, 2002 (LNCS 2696), Springer, 2003.
9. Christian Sven Collberg, Clark David Thomborson, and Douglas Wai Kok Low. Obfuscation Techniques for Enhancing Software Security. U.S. Pat. No. 6,668,325.
10. *Extended Euclidean Algorithm*, Algorithm 2.107 on p. 67 in A. J. Menezes, P. C. van Oorschot, S. A. Vanstone, *Handbook of Applied Cryptography*, CRC Press, 2001 ($5^{th}$ printing with corrections). Available for down-load, by publisher's permission.
11. Extended Euclidean Algorithm for $Z_p[x]$, Algorithm 2.221 on p. 82 in A. J. Menezes, P. C. van Oorschot, S. A. Vanstone, *Handbook of Applied Cryptography*, CRC Press, 2001 (5th printing with corrections). Available for down-load, by publisher's permission.
12. *DES*, §7.4, pp. 250-259, in A. J. Menezes, P. C. van Oorschot, S. A. Vanstone, *Handbook of Applied Cryptography*, CRC Press, 2001 (5th printing with corrections). Available for down-load, by publisher's permission.
13. *MD5*, Algorithm 9.51 on p. 347 in A. J. Menezes, P. C. van Oorschot, S. A. Vanstone, *Handbook of Applied Cryptography*, CRC Press, 2001 (5th printing with corrections). Available for down-load, by publisher's permission.
14. *SHA*-1, Algorithm 9.53 on p. 348 in A. J. Menezes, P. C. van Oorschot, S. A. Vanstone, *Handbook of Applied Cryptography*, CRC Press, 2001 (5th printing with corrections). Available for down-load, by publisher's permission.
15. National Institute of Standards and Technology (nist), *Advanced Encryption Standard* (AES), FIPS Publication 197, 26 Nov. 2001.
16. Harold J. Johnson, Stanley T. Chow, Yuan X. Gu. Tamper Resistant Software—Mass Data Encoding. U.S. Pat. No. 7,350,085.
17. Harold J. Johnson, Stanley T. Chow, Philip A. Eisen. System and Method for Protecting Computer Software Against a White Box Attack. U.S. Pat. No. 7,397,916.
18. Harold J. Johnson, Philip A. Eisen. System and Method for Protecting Computer Software Against a White Box Attack. U.S. Pat. No. 7,809,135.
19. Harold Joseph Johnson, Yuan Xiang Gu, Becky Laiping Chang, and Stanley Taihai Chow. Encoding Technique for Software and Hardware. U.S. Pat. No. 6,088,452.
20. Arun Narayanan Kandanchatha, Yongxin Zhou. System and Method for Obscuring Bit- Wise and Two's Complement Integer Computations in Software. U.S. Pat. No. 7,966,499.
21. D. E. Knuth, *The art of computer programming, volume 2: semi-numerical algorithms,* 3rd edition, ISBN 0-201-89684-2, Addison-Wesley, Reading, Mass., 1997.
22. Extended Euclid's Algorithm, Algorithm X on p. 342 in D. E. Knuth, *The art of computer programming, volume 2: semi-numerical algorithms,* 3rd edition, ISBN 0-201-89684-2, Addison-Wesley, Reading, Mass., 1997.
23. T. Sander, C. F. Tschudin, *Towards Mobile Cryptography*, pp. 215-224, Proceedings of the 1998 IEEE Symposium on Security and Privacy.
24. T. Sander, C. F. Tschudin, *Protecting Mobile Agents Against Malicious Hosts*, pp. 44-60, Vigna, Mobile Agent Security (LNCS 1419), Springer, 1998.
25. Sharath K. Udupa, Saumya K. Debray, Matias Madou, *Deobfuscation: Reverse Engineering Obfuscated Code*, in 12th Working Conference on Reverse Engineering, 2005, ISBN 0-7695-2474-5, pp. 45-54.
26. WDL-Online.
27. David R. Wallace. System and Method for Cloaking Software. U.S. Pat. No. 6,192,475.
28. Henry S. Warren, *Hacker's Delight*. Addison-Wesley, ISBN-10: 0-201-91465-4; ISBN-13: 978-0-201-91465-8; 320 pages, pub. Jul. 17, 2002.
29. Glenn Wurster, Paul C. van Oorschot, Anil Somayaji. *A generic attack on checksumming-based software tamper resistance*, in 2005 IEEE Symposium on Security and Privacy, pub. by IEEE Computer Society, ISBN 0-7695-2339-0, pp. 127-138.

The information revolution of the late 20th century has given increased import to commodities not recognized by the general public as such: information and the information systems that process, store, and manipulate such information. An integral part of such information systems is the software and the software entities that operate such systems.

Software Entities and Components, and Circuits as Software. Note that software programs as such are never executed—they must be processed in some fashion to be turned into executable entities, whether they are stored as text files containing source code in some high-level programming language, or text files containing assembly code, or ELF-format linkable files which require modification by a linker and loading by a loader in order to become executable. Thus, we intend by the term software some executable or invocable behavior-providing entity which ultimately results from the conversion of code in some programming language into some executable form.

The term software-mediated implies not only programs and devices with behaviors mediated by programs stored in normal memory (ordinary software) or read-only memory such as EPROM (firmware) but also electronic circuitry which is designed using a hardware specification language such as VHDL. Online documentation for the hardware specification language VHDL [26] states that The big advantage of hardware description languages is the possibility to actually execute the code. In principle, they are nothing else than a specialized programming language [italics added]. Coding errors of the formal model or conceptual errors of the system can be found by running simulations. There, the response of the model on stimulation with different input values can be observed and analyzed.

It then lists the equivalences between VHDL and programmatic concepts shown in Table A.

Thus a VHDL program can be used either to generate a program which can be run and debugged, or a more detailed formal hardware description, or ultimately a hardware circuit whose behavior mirrors that of the program, but typically at enormously faster speeds. Thus in the modern world, the dividing line among software, firmware, and hardware implementations has blurred, and we may regard a circuit as the implementation of a software program written in an appropriate parallel-execution language supporting low-level data types, such as VHDL. A circuit providing behavior is a software entity or component if it was created by processing a source program in some appropriate hardware-description programming language such as VHDL or if such a source program describing the circuit, however the circuit was actually designed, is available or can readily be provided.

Hazards Faced by Software-Based Entities. An SBE is frequently distributed by its provider to a recipient, some of whose goals may be at variance with, or even outright inimical to, the goals of its provider. For example, a recipient may wish to eliminate program logic in the distributed software or hardware-software systems intended to prevent unauthorized use or use without payment, or may wish to prevent a billing function in the software from recording the full extent of use in order to reduce or eliminate the recipients' payments to the provider, or may wish to steal copyrighted information for illicit redistribution, at low cost and with consequently high profit to the thief.

Similar considerations arise with respect to battlefield communications among military hardware SBEs, or in SBEs which are data management systems of corporations seeking to meet the requirements of federally mandated requirements such as those established by legislated federal standards: the Sarbanes-Oxley act (SOX) governing financial accounting, the Gramm-Leach-Bliley act (GLB) regarding required privacy for consumer financial information, or the Health Insurance Portability and Accountability Act (HIPAA) respecting privacy of patient medical records, or the comprehensive Federal Information Security Management Act (FISMA), which mandates a growing body of NIST standards for meeting federal computer system security requirements. Meeting such standards requires protection against both outsider attacks via the internet and insider attacks via the local intranet or direct access to the SBEs or computers hosting the SBEs to be protected.

To provide such protections for SBEs against both insider- and outsider-attacks, obscuring and tamper-proofing software are matters of immediate importance to various forms of enterprise carried out by means of software or devices embodying software, where such software or devices are exposed to many persons, some of whom may seek, for their own purposes, to subvert the normal operation of the software or devices, or to steal intellectual property or other secrets embodied within them.

| VHDL Concepts and Programmatic Equivalent | |
|---|---|
| VHDL Concept | Programmatic Equivalent |
| entity | interface |
| architecture | Implementation, behavior, function |
| configuration | model chaining, structure, hierarchy |
| process | concurrency, event controlled |
| package | modular design, standard solution, data types, constants |
| library | compilation, object code |

Various means are known for protecting software by obscuring it or rendering software tamper-resistant: for examples, see [2, 3, 4, 5, 6, 7, 8, 9, 16, 17, 18, 19, 20, 27].

Software may resist tampering in various ways. It may be rendered aggressively fragile under modification by increasing the interdependency of parts of the software: various methods and systems for inducing such fragility in various degrees are disclosed in [2, 3, 4, 6, 16, 17, 18, 19, 27]. It may deploy mechanisms which render normal debuggers non-functional. It may deploy integrity verification mechanisms which check that the currently executing software is in the form intended by its providers by periodically checksumming the code, and emitting a tampering diagnostic when a checksum mismatch occurs, or replacing modified code by the original code (code healing) as in Arxan EnforceIT™.

These various protection mechanisms, which seek to protect software, or the software-mediated behaviors of hardware devices, must be executed correctly for their intended protection functions to operate. If an attacker can succeed in disabling these protection mechanisms, then the aggressive fragility may be removed, the integrity verification may not occur, or the code may fail to be healed when it is altered.

Useful defenses against removal of such protections, extending beyond more obscurity, are found in [2, 3, 4, 6, 16, 17, 18, 19, 27] and in Arxan EnforceIT™. For [19], this protection takes the form of interweaving a specific kind of data-flow network, called a cascade, throughout the code, in an attempt to greatly increase the density of interdependencies within the code. Plainly such an approach involves a significant increase in code size, since much of the code will be extraneous to the normal computation carried out by the software, being present solely for protection purposes. For [3], the protection takes the form of a many-to-many mapping of code sites to fragments of the software's functionality. Like the code-healing approach of Arxan EnforceIT™, this requires a significant degree of code replication (the same or equivalent code information appears in the software implementation two or more times for any code to be protected by the many-to-many mapping or the code-healing mechanism), which can introduce a significant code-size overhead if applied indiscriminately. For [27], data addressing is rendered interdependent, and variant over time, by means of geometric transformations in a multidimensional space, resulting in bulkier and slower, but very much more obscure and fragile, addressing code.

The overhead of broadly based (that is, applicable to most software code), regionally applied (that is, applied to all of the suitable code in an entire code region) increases in interdependency, as in [2, 3, 4, 6, 16, 19] and in the somewhat less broadly-based [27], or of the code redundancy found in various forms in [3, 6, 17, 18, 19, 27] or in Arxan EnforceIT™, varies considerably depending on the proportion of software regions in a program protected and the intensity with which the defense is applied to these regions.

Of course, tolerable overhead depends on context of use. Computing environments may liberal use of various scripting languages such as Perl, Python, Ruby, MS-DOS™ .BAT (batch) files, shell scripts, and so on, despite the fact that execution of interpreted code logic is at least tens of times slower than execution of optimized compiled code logic. In the context of their use, however, the ability to update the logic in such scripts quickly and easily is more important than the added overhead they incur.

The great virtue of the kinds of protection described in [2, 3, 4, 5, 6, 9, 16, 19, 20], and to a lesser extent in [27], is that they are broadly based (although [27] requires programs with much looping, whether express or implied, for full effectiveness) and regionally applied: their natural use is to protect substantial proportions of the code mediating the behaviors of SBEs—a very useful form of protection given the prevalence of various forms of attacks on SBEs, and one which does not require careful identification of the parts of the software most likely to be attacked.

However, sometimes we need the utmost protection for a small targeted set of specific SBE behaviors, but performance and other overhead considerations mandate that we should either altogether avoid further overheads to protect behaviors falling outside this set, or that the level of protection for those other behaviors be minimized, to ensure that performance, size, and other overhead costs associated with software protection are held in check. In such cases, use of the instant invention, with at most limited use of regionally applied methods, is recommended.

Alternatively, sometimes significant overhead is acceptable, but very strong protection of certain specific SBE behaviors, beyond that provided by regionally applied methods, is also required. In such cases, use of both the instant invention and one or more regionally applied methods is recommended.

Typically, the targeted set of specific SBE behaviors is implemented by means of specific, localized software elements, or the interactions of such elements—routines, control structures such as particular loops, and the like—within the software mediating the behavior of the SBE.

Existing forms of protection as described in [2, 3, 4, 5, 6, 9, 16, 19, 27] provide highly useful protections, but, despite their considerable value, they do not address the problem of providing highly secure, targeted, specific, and localized protection of software-mediated program and device behaviors.

The protection provided in [7, 8, 17, 18] is targeted to a specific, localized part of a body of software (namely, the implementation of encryption or decryption for a cipher), but the methods taught in this application apply to specific forms of computation used as building blocks for the implementation of ciphers and cryptographic hashes, so that they are narrowly, rather than broadly, based; i.e., they apply only to very specific kinds of behaviors. Nevertheless, with strengthening as described herein, such methods can be rendered useful for meeting the need noted below.

The protection provided by [27], while not so targeted to specific contexts as those of [7, 8, 17, 18,] is limited to contexts where live ranges of variables are well partitioned and where constraints on addressing are available (as in loops or similar forms of iterative or recursive behavior)—it lacks the wide and general applicability of [2, 3, 4, 5, 6, 9, 16, 19]. It is very well suited, however, for code performing scientific computations on arrays and vectors, or computations involving many computed elements such as graphics calculations. Of course, for graphics, the protection may be moot: if information is to be displayed, it is unclear that it needs to be protected. However, if such computations are performed for digital watermarking, use of [27] to protect intellectual property such as the watermarking algorithm, or the nature of the watermark itself, would be suitable.

Based on the above, it is thus evident that there is a need for a method which can provide strong protection of specific, localized portions of the software mediating a targeted set of specific SBE behaviors, thus protecting a targeted, specific set of SBE behaviors without the overhead of, and with stronger protection than, existing regionally applied methods of software protection such as [2, 3, 4, 5, 6, 9, 16, 19, 20, 27] and applicable to a wider variety of behaviors than the narrowly based methods of [7, 8, 17, 18].

SUMMARY OF THE INVENTION

An improved method for rendering a software program resistant to reverse engineering analysis, whereby existing methods are based on substituting, modifying, or encoding computational expressions or statements, whether the computational expressions or statements themselves are to be protected, or the computational expressions or statements are used to render control flow obscure or tamper-resistant, or the computational expressions or statements are used to render data addressing obscure or tamper-resistant, or the computational expressions or statements are used to render accesses to large bodies of data obscure or tamper-resistant, or the computational expressions or statements are used for some combination of the previously-listed purposes (computation protection, control-flow protection, data-addressing-protection, or protection of accesses to large bodies of data), tampering with one basic block's code causes other basic blocks to malfunction when executed.

The method most generally comprises the steps of replacing at least one first constant, mathematical expression, Boolean expression, or bitwise-Boolean expression in such a computational expression or statement, whether the computational expression or statement is in source code or binary code form, of the software program, with a second mixed mathematical and bitwise-Boolean expression, the first constant or expression being simpler than the second expression and the second expression being based on the value or the variables found in the first expression, wherein evaluation of the second mixed mathematical and bitwise-Boolean expression produces a value which preserves the value of the first constant or expression, either: with the original value of the first constant or the original value of the result of the first expression, in which case the second mixed mathematical and bitwise-Boolean expression is obtained from the first constant or expression by converting the first constant or expression by mathematical identities; or, in an encoded form, that is, as a new value, which can be converted back to the original the value of the first constant or expression by applying an information-preserving (that is, bijective) decoding function, in which case the second mixed mathematical and bitwise-Boolean expression is obtained from the first constant or expression by modifying the first constant expression by a combination of conversion according to mathematical identities and transformation according to an information preserving (that is, bijective) encoding function.

Optionally, subsequent to the performance of the foregoing steps, the second expression resulting from the performance, or a subexpression of the second expression, is itself again converted according to those steps one or more times, so that that method is applied more than once to the original constant or expression or its subexpressions. The conversion of the original constant or expression may be performed according to a mathematical identity of the form $$\sum_{i=1}^{k} a_i e_i = E$$

where $a_i$ are coefficients, $e_i$ are bitwise expressions, whether simple or complex, and E is the original constant or expression.

Further, the conversion of the original constant or expression may be performed according to one or more mathematical identities derived by ordinary algebraic manipulation of an identity of the form $$\sum_{i=1}^{k} a_i e_i = E$$

where $a_i$ are coefficients, $e_i$ are bitwise expressions, and E is the original constant or expression. Further still, the conversion of the original constant or expression may be performed according to a mathematical identity of the form $$\sum_{i=1}^{k} a_i e_i = 0$$

where $a_i$ are coefficients and $e_i$ are bitwise expressions, whether simple or complex. Still further, the conversion of the original constant or expression may be performed according to one or more mathematical identities derived by ordinary algebraic manipulation of an identity of the form $$\sum_{i=1}^{k} a_i e_i = 0$$

where $a_i$ are coefficients and $e_i$ are bitwise expressions, whether simple or complex. Still further, the conversion of the original constant or expression may be preceded by conversion according to the mathematical identity $-x=\bar{x}+1$ wherein x is a variable, thereby further obfuscating and complicating the resulting code.

The first expression may be a conditional comparison Boolean expression and the second expression may be preceded by conversion according to the Boolean identity that $x=0$ iff $(-(x\vee(-x))-1)<0$ wherein x is a variable, thereby further obfuscating and complicating the resulting code. The second expression may be preceded by conversion according to the Boolean identity that $x=y$ iff $x-y=0$ wherein x and y are variables, thereby further obfuscating and complicating the resulting code. The first expression may be a Boolean inequality comparison expression and the second expression may be preceded by conversion according to the Boolean identity that $x<y$ iff $((x \wedge \bar{y}) \vee ((\neg (x \oplus y)) \wedge (x-y)))<0$ wherein x and y are variables, thereby further obfuscating and complicating the resulting code. Further, the first expression may be a Boolean inequality comparison expression and the second expression may be preceded by conversion according to the Boolean identity that $x<y$ iff $((\bar{x} \vee y) \wedge ((\bar{x} \vee y) \wedge (x-y)))<0$ wherein x and y are variables, thereby further obfuscating and complicating the resulting code.

Still further, the first constant or expression may be a bitwise-Boolean constant or expression, and the mathematical identity may be of the form $$\sum_{i=1}^{k} a_i e_i = E$$

where $a_i$ are coefficients, $e_i$ are bitwise expressions, whether simple or complex, and E is an expression yielding the first constant, or E is the first expression, with the mathematical identity derived by a method comprising:

(a) summarizing the first expression, or an expression yielding the first constant, being an expression of t variables, as a truth table of two columns, with left column S and right column P, the left column S of which is a list of $2^t$ conjunctions, each conjunction being the logical and of each of the variables or a conjunction obtained from the logical and of each of the variables by complementing (i.e., logical not-ing) of some or all of those variables, such that each possible such conjunction appears exactly once, and the right column P of which is a list of $2^t$ Boolean (0 for false or 1 for true) values, where the pair in any given row of the table comprises a conjunction (in the left column S) and its Boolean value when the expression E is true (in the right column P);

(b) randomly choosing an invertible $2^t \times 2^t$ matrix A over $Z/(2)$, and, if any column C of A is the same as the right (Boolean value) column P of the truth table, adding a randomly chosen nontrivial linear combination of other columns of A to the column C of A so that the column C of A differs from the right column P of the truth table, so that A is or becomes a randomly chosen invertible matrix with no column equal to P, the matrix thus being invertible, not only over $Z/(2)$, but over $Z/(2^n)$ for any n>1 as well;

(c) solving the linear matrix equation $AV=P$ over $Z/(2^n)$, where $2^n$ is the natural modulus of computations on the target execution platform for the code modified according to the instant invention, each element $v_i$ of V being a variable of the matrix equation for the solution column vector U of length $2^t$, where $V=U$, or equivalently, $v_i=u_i$ for $i=1, \ldots, 2^t$, is the solution to the linear matrix equation, each element $u_i$ of U being a $2^n$-bit constant; and (d) deriving the resulting mathematical identity $u_0 s_0 + u_1 s_1 + \ldots + u_k s_k = E$, where $k=2^t-1$.

Further, the mathematical identity may be of the form $$\sum_{i=1}^{k} a_i e_i = 0$$

where $a_i$ are coefficients and $e_i$ are bitwise expressions, whether simple or complex, with the mathematical identity derived by a method comprising:

(a) for a set of t variables, choosing a set of k bitwise Boolean expressions $e_1, \ldots, e_k$ of those t variables, such that, when we construct the k truth tables of the k bitwise Boolean expressions, where the ith truth table is the truth table for bitwise Boolean expression $e_i$, and contains two columns, with left column $S_i$ and right column $P_i$, the left column $S_i$ of which is a list of $2^t$ conjunctions, each conjunction being the logical and of each of the t variables or a conjunction obtained from the logical and of each of the t variables by complementing (i.e., logical not-ing) of some or all of the t variables, such that each possible such conjunction appears exactly once, and the right column $P_i$ of which is a list of $2^t$ Boolean (0 for false or 1 for true) values, where the pair in any given row of the table comprises a conjunction (in the left column $S_i$) and its Boolean value when the expression $e_i$ is true (in the right column $P_i$), then the k value columns of the k truth tables, $P_1, \ldots, P_k$, are linearly dependent over $Z/(2^n)$; that is, there are k nonzero coefficients $a_1, \ldots, a_k$ chosen from the ring $Z/(2^n)$ such that the vector $a_1 P_1 + a_2 P_2 + \ldots + a_k P_k$ is the all-zeroes vector; and, (b) deriving as a consequence of this fact the identity $$\sum_{i=1}^{k} a_i e_i = 0$$

where $a_1, \ldots, a_k$ are the k nonzero coefficients and $e_1, \ldots, e_k$ are the k bitwise Boolean expressions.

The automated method may provide that the identities are obtained and stored in an initial setup phase and in which the replacement of the first constant or expression by the second expression is performed in a second, subsequent phase by matching the first expression or an expression for the first constant with the identities obtained in the initial phase and performing the replacement by selecting a randomly chosen matching identity, with or without encoding by a bijective function. The initial phase may not be performed whenever the method is applied, but rather may be performed once, or may be performed only infrequently, whereas the second phase of matching and replacement may be performed whenever the method is applied, so that the initial phase, which is computationally intensive, is performed rarely, whereas the second phase, which is less computationally demanding, is performed frequently. Further, the initial phase may be performed once during the construction of a compiler or compiler-like program translation tool, and in which the second phase may be performed by the compiler or compiler-like translation tool acting on software to be protected according to the foregoing methods. The compiler or compiler-like program may be an obfuscating compiler or a compiler which adds tamper-resistance to software or which adds a combination of obfuscation and tamper-resistance to the programs which it processes, and for which the addition of obfuscation and tamper-resistance is augmented by taking as the first constant or expression, a constant or expression installed by the obfuscating or tamper-resistance-adding compiler for the purpose of adding obfuscation or tamper resistance, and strengthening the obfuscation or tamper-resistance by replacing an expression for the first constant or the first expression according to stored identities obtained and stored in the first phase, and applied during the operation of the obfuscating, tamper-resistance-adding compiler in the second phase.

The method may provide that the at least one first constant, mathematical expression, Boolean expression in source code is an expression producing a vector-valued result, the constants or variables of which include a vector-valued variable or variables, and in which the value of the second mixed mathematical and bitwise-Boolean expression preserves the value of the at least one first constant, mathematical expression, Boolean expression or bitwise-Boolean expression in source code in encoded form, where the encoding employed in the encoded form is obtained by computing a function of the result of the first constant, mathematical expression, Boolean expression, or bitwise-Boolean expression, the function being a deeply nonlinear function $f$ constructed by a method comprising:

(a) selecting numbers n, u, and v, such that n=u+v;
(b) selecting finite fields which are specific representations N, U, and V of finite fields $GF(2^n)$, $GF(2^u)$, and $GF(2^v)$, respectively;
(c) selecting p and q with q not less than p and with each of p and q not less than 3;
(d) randomly selecting 1-to-1 linear functions $L: U^p \to U^q$ and $G_0, G_1, \ldots, G_{k-1}: V^p \to V^q$, where each of p, q, and k is at least 2 and k is a power of 2 and k is not greater than $2^u$;
(e) randomly selecting a linear function $z: U^p \to U$ and obtaining from z a function $s: U^p \to \{0, 1, \ldots, k-1\}$ by selecting, by a bitwise-Boolean operation, the low order m bits of z's output, where $k=2^m$; or alternatively, directly choosing a random onto function $s: U^p \to \{0, 1, \ldots, k-1\}$;
(f) building the function $f$ from the above-constructed components, where $f: N^p \to N^q$ is computed by computing the leftmost u bits of all of its output vector elements by applying L to the vector P obtained by taking only the leftmost u bits of its input vector elements, and computing the rightmost v bits of all of its output vector elements by applying $G_{s(P)}$ to the vector Q obtained by taking only the rightmost v bits of its input vector elements, so that the output bits supplied by L(P) and those supplied by $G_{s(P)}(Q)$ are interleaved throughout the output; and
(g) testing $f$ by enumeration of the frequency of occurrence of its 1-by-1 projections to determine whether $f$ is deeply nonlinear, and if not, repeating the above construction until a deeply nonlinear function $f$ is obtained.

Further, the method may provide that the linear functions $L: U^p \to U^q$ and $G_0, G_1, \ldots, G_{k-1}: V^p \to V^q$, are not merely 1-to-1, but also bijective, so that both $f$ and its inverse are bijective deeply nonlinear encodings. Still further, the linear functions $L: U^p \to U^q$ and $G_0, G_1, \ldots, G_{k-1}: V^p \to V^q$, may not be merely 1-to-1, but also maximum distance separable, so that the input information is distributed evenly over the output, and so that $f$, and also its inverse $f^1$ if $f$ is bijective, are maximum distance separable deeply nonlinear functions.

BRIEF DESCRIPTION OF THE DRAWINGS

A better understanding of the invention will be obtained by considering the detailed description below, with reference to the following drawings in which:

FIG. 4A shows pseudo-code for a conditional IF statement with ELSE-code (i.e., an IF statement which either executes the THEN-code or executes the ELSE-code);

FIG. 4B shows pseudo-code for a statement analogous to that in FIG. 4A but where the choice among the code alternatives is made by indexed selection;

FIG. 5A shows pseudo-code for a conditional IF statement with no ELSE-code; and;

FIG. 5B shows pseudo-code for a statement analogous to that in FIG. 5A but where the choice among alternatives which have code and those which have no code is made by indexed selection.

DETAILED DESCRIPTION

Figure 1:
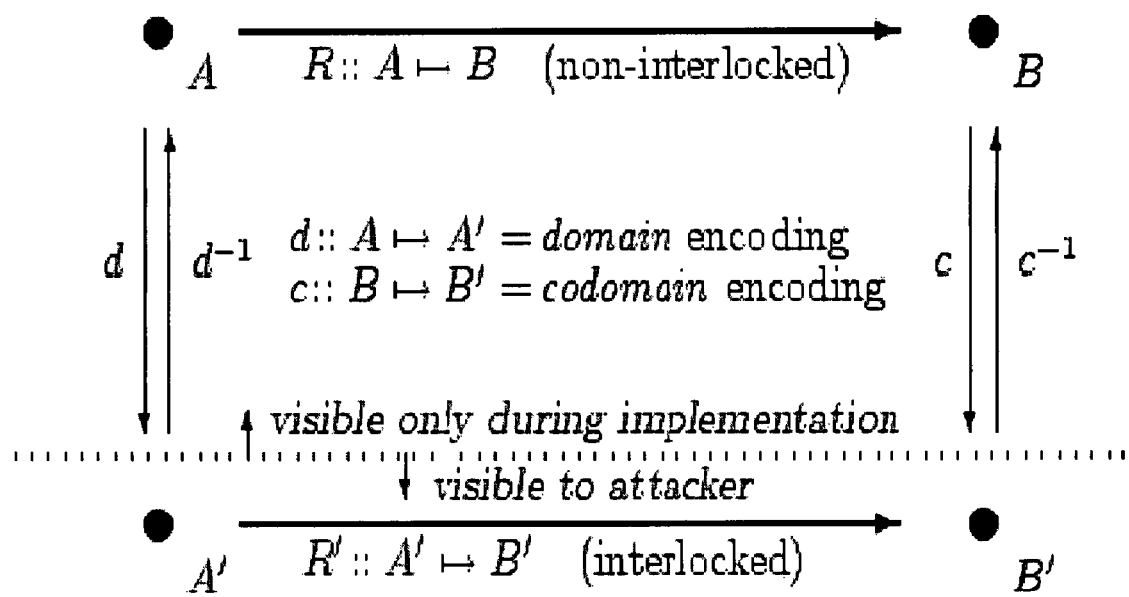
FIG. 1 shows initial and final program states connected by a computation.

In one preferred embodiment, the present invention receives the source code of a piece of software and subdivides that source code into various basic blocks of logic. These basic blocks are, based on their contents and on their position in the logic and control flow of the program, amended to increase or create dependence between the various basic blocks. The amendment to the basic blocks has the effect of extending the outputs of some basic blocks while similarly extending the inputs of other corresponding basic blocks. The extended output contains the output of the original as well as extra information introduced or injected by the code amendments. The extended input requires the regular input of the original basic block as well as the extra information of the extended output.

The following description of preferred embodiments of the invention will be better understood with reference to the following explanation of concepts and terminology used throughout this description.

We define an interlock to be a connection among parts of a system, mechanism, or device in which the operation of some part or parts Y of the system is affected by the operation of some other part or parts X, in such a fashion that tampering with the behavior of part or parts X will cause malfunctioning or failure of the part or parts Y with high probability.

That is, the connection between parts of a system which are interlocked is aggressively fragile under tampering. The purpose of the instant invention is to provide a general, powerful, targeted facility for inducing such aggressive fragility affecting specific SBE behaviors.

When an attacker tampers with the data or code of a program, the motivation is generally to modify the behavior of the program in some specific way. For example, if an application checks some piece of data, such as a password or a data token, which must be validated before the user may employ the application, an attacker may wish to produce a new version of the program which is similar to the original, but which does not perform such validation, thus obtaining unrestricted and unchecked access to the facilities of the application. Similarly, if an application meters usage for the purpose of billing, an attacker may wish to modify the application so that it performs the same services, but its usage metrics record little or no usage, thereby reducing or eliminating the cost of employing the application. If an application is a trial version, which is constructed so as to perform normally but only for a limited period of time, in hopes that someone will purchase the normal version, an attacker may wish to modify the trial version so that that limited period of time is extended indefinitely, thereby avoiding the cost of the normal version.

Thus a characteristic of tampering with the software or data of a program is that it is a goal-directed activity which seeks specific behavioral change. If the attacker simply wished to destroy the application, there would be a number of trivial ways to accomplish that with no need for a sophisticated attack: for example, the application executable file could be deleted, or it could be modified randomly by changing random bits of that file, rendering it effectively unexecutable with high probability. The protections of the instant invention are not directed against attacks with such limited goals, but against more sophisticated attacks aimed at specific behavioral modifications.

Thus the aggressive fragility under tampering which is induced by the method and system of the instant invention frustrates the efforts of attackers by ensuring that the specific behavioral change is not achieved: rather, code changes render system behavior chaotic and purposeless, so that, instead of obtaining the desired result, the attacker achieves mere destruction and therefore fails to derive the desired benefit.

The instant invention provides methods and systems by means of which, in the software mediating the behavior of an SBE, a part or parts X of the software which is not interlocked with a part or parts Y of the software, may be replaced by a part or parts X', providing the original functionality of part or parts X, which is interlocked with a part or parts Y', providing the original functionality of part or parts Y, in such a fashion that the interlocking aspects of X' and Y' are essential, integral, obscure, and contextual. These required properties of effective interlocks, and automated methods for achieving these properties, are described hereinafter.

Referring to Table A, the table contains symbols and their meanings as used throughout this document.

TABLE A

| Notation | Meaning |
|---|---|
| B | the set of bits = $\{0, 1\}$ |
| N | the set of natural numbers = $\{1, 2, 3, \ldots\}$ |
| $N_0$ | the set of finite cardinal numbers = $\{0, 1, 2, \ldots\}$ |
| Z | the set of integers = $\{\ldots, -1, 0, 1, \ldots\}$ |
| x:-y | x such that y |
| x iff y | if and only if y |
| x∥y | concatenation of tuples or vectors x and y |
| x ∧ y | logical or bitwise and of x and y |
| x ∨ y | logical or bitwise inclusive-or of x and y |
| x ⊕ y | logical or bitwise exclusive-or of x and y |
| ¬x or $\bar{x}$ | logical or bitwise not of x |
| $x^{-1}$ | inverse of x |
| f{S} | image of set S under MF f |
| f(x) = y | applying MF f to x yields y and only y |
| f(x) → y | applying MF f to x may yield y |
| f(x) = ⊥ | the result of applying MF f to x is undefined |
| $M^T$ | transpose of matrix M |
| \|S\| | cardinality of set S |
| \|V\| | length of tuple or vector V |
| \|n\| | absolute value of number n |
| $(x_1, \ldots, x_k)$ | k-tuple or k-vector with elements $x_1, \ldots, x_k$ |
| $[m_1, \ldots, m_k]$ | k-aggregation of MFs $m_1, \ldots, m_k$ |
| $<m_1, \ldots, m_k>$ | k-conglomeration of MFs $m_1, \ldots, m_k$ |
| $\{x_1, \ldots, x_k\}$ | set of $x_1, \ldots, x_k$ |
| $\{x\|C\}$ | set of x such that C |
| $\{x \in S\|C\}$ | set of members x of set S such that C |
| Δ(x, y) | Hamming distance (= number of changed element positions) from x to y |
| $S_1 \times \ldots \times S_k$ | Cartesian product of sets $S_1, \ldots, S_k$ |
| $m_1 \circ \ldots \circ m_k$ | composition of MFs $m_1, \ldots, m_k$ |

TABLE A-continued

| Notation | Meaning |
|---|---|
| $x \in S$ | x is a member of set S |
| $S \subseteq T$ | set S is contained in or equal to set T |
| $\sum_{i=1}^{k} x_i$ | sum of $x_1, \ldots, x_k$ |
| GF(n) | Galois field (= finite field) with n elements |
| Z/(k) | finite ring of the integers modulo k |
| $id_s$ | identity function on set S |
| extract[a, b](x) | bit-field in positions a to b of bit-string x |
| extract[a, b](v) | (extract[a, b]($v_1$), ..., extract[a, b]($v_k$)), where v = ($v_1, \ldots, v_k$) |
| interleave(u, v) | , where u = ($u_1, \ldots, u_k$) and v = ($v_1, \ldots, v_k$) |

Table B further contains abbreviations used throughout this document along with their meanings.

TABLE B

| Abbreviation | Expansion |
|---|---|
| AES | Advanced Encryption Standard |
| agg | aggregation |
| API | application procedural interface |
| BA | Boolean-arithmetic |
| BB | basic block |
| CFG | control-flow graph |
| DES | Data Encryption Standard |
| DG | directed graph |
| dll | dynamically linked library |
| GF | Galois field (=finite field) |
| IA | intervening aggregation |
| iff | if and only if |
| MBA | mixed Boolean-arithmetic |
| MDS | maximum distance separable |
| MF | multi-function |
| OE | output extension |
| PE | partial evaluation |
| PLPB | point-wise linear partitioned bijection |
| RSA | Rivest--Shamir--Adleman |
| RNS | residual number system |
| RPE | reverse partial evaluation |
| TR | tamper resistance |
| SB | substitution box |
| SBE | software-based entity |
| so | shared object |
| VHDL | very high speed integrated circuit hardware |

We write ":-" to denote "such that" and we write "iff" to denote "if and only if". Table A summarizes many of the notations, and Table B summarizes many of the abbreviations, employed herein.

2.3.1. Sets, Tuples, Relations, and Functions. For a set S, we write |S| to denote the cardinality of S (i.e., the number of members in set S). We also use |n| to denote the absolute value of a number n.

We write $\{m_1, m_2, \ldots, m_k\}$ to denote the set whose members are $m_1, m_2, \ldots, m_k$. (Hence if $m_1, m_2, \ldots, m_k$ are all distinct, $|\{m_1, m_2, \ldots, m_k\}|=k$.) We also write $\{x|C\}$ to denote the set of all entities of the form x such that the condition C holds, where C is normally a condition depending on x.

Cartesian Products, Tuples, and Vectors. Where A and B are sets, A×B is the Cartesian product of A and B; i.e., the set of all pairs (a,b) where a∈A (i.e., a is a member of A) and b∈B (i.e., b is a member of B). Thus we have (a,b)∈A×B. In general, for sets $S_1, S_2, \ldots, S_k$, a member of $S_1 \times S_2 \times \ldots \times S_k$ is a k-tuple of the form $(s_1, s_2, \ldots, s_k)$ where $s_i \in S_i$ for $i=1,2,\ldots,k$. If $t=(s_1, \ldots, s_k)$ is a tuple, we write |t| to denote the length of t (in this case, |t|=k; i.e., the tuple has k element positions). For any x, we consider x to be the same as (x)—a tuple of length one whose sole element is x. If all of the elements of a tuple belong to the same set, we call it a vector over that set.

If u and v are two tuples, then || is the tuple of length |u|+|v| obtained by creating a tuple containing the elements of u in order and then the elements of v in order: e.g., (a,b,c,d)||(x,y,z)=(a,b,c,d,x,y,z).

We consider parentheses to be significant in Cartesian products: for sets A, B, C, members of (A×B)×C look like ((a,b),c) whereas members of A×(B×C) look like (a,(b,c)), where a∈A, b∈B, and c∈C. Similarly, members of A×(B×B)×C look like (a,($b_1, b_2$),c) where a∈A, $b_1, b_2 \in B$, and c∈C.

Relations, Multi-functions (MFs), and Functions. A k-ary relation on a Cartesian product $S_1 \times \ldots \times S_k$ of k sets (where we must have $k \geq 2$) is any set $R \subseteq S_1 \times \ldots \times S_k$. Usually, we will be interested in binary relations; i.e., relations $R \subseteq A \times B$ for two sets A, B (not necessarily distinct). For such a binary relation, we write a R b to indicate that (a,b)∈R. For example, where R is the set of real numbers, the binary relation on pairs of real numbers is the set of all pairs of real numbers (x,y) such that x is smaller than y, and when we write x<y it means that (x,y)∈<.

The notation R:: A↦B indicates that $R \subseteq A \times B$; i.e., that R is a binary relation on A×B. This notation is similar to that used for functions below. Its intent is to indicate that the binary relation is interpreted as a multi-function (MF), the relational abstraction of a computation—not necessarily deterministic—which takes an input from set A and returns an output in set B. In the case of a function, this computation must be deterministic, whereas in the case of an MF, the computation need not be deterministic, and so it is a better mathematical model for much software in which external events may effect the progress of execution within a given process. A is the domain of MF R, and B is the codomain of MF R. For any set $X \subseteq A$, we define $R\{X\}=\{y \in B | \exists x \in X :-(x,y) \in R\}$. $R\{X\}$ is the image of X under R. For an MF R:: A↦B and a∈A, we write R(a)=b to mean $R\{\{a\}\}=\{b\}$, we write R(a)→b to mean that $b \in R\{\{a\}\}$, and we write R(a)=⊥ (read "R(a) is undefined" to mean that there is no b∈B:-(a,b)∈R.

For a binary relation R:: A↦B, we define
$R^{-1}=\{(b,a)|(a,b) \in R\}$.
$R^{-1}$ is the inverse of R.

For binary relations R:: A↦B and S:: B↦C, we define S∘R:: A↦C by
S∘R={(a,c)|∃B:-a R b and b S c}.
S∘R is the composition of S with R. Composition of binary relations is associative; i.e., for binary relations Q,R,S, (S∘R)∘Q=S∘(R∘Q). Hence for binary relations $R_1, R_2, \ldots, R_k$, we may freely write $R_k \circ \ldots \circ R_2 \circ R_1$ without parentheses because the expression has the same meaning no matter where we put them. Note that $(R_k \circ \ldots \circ R_2 \circ R_1)\{X\}=R_k\{\ldots \{R_2\{R_1\{X\}\}\} \ldots\}$ in which we first take the image of X under $R_1$, and then that image's image under $R_2$, and so on up to the penultimate image's image under $R_k$, which is the reason that the $R_i$'s in the composition on the left are written in the reverse order of the imaging operations, just like the $R_i$'s in the imaging expression on the right.

Where $R_i:: A_i \mapsto B_i$ for $i=1, \ldots, k$, $R=[R_1, \ldots, R_k]$ is that binary relation:
R:: $A_1 \times \ldots \times A_k \mapsto B_1 \times \ldots \times B_k$
and
$R(x_1, \ldots, x_k) \to (y_1, \ldots, y_k)$ iff $R_i(x_i) \to y_i$ for $i=1, \ldots, k$.
$[R_1, \ldots, R_k]$ is the aggregation of $R_1, \ldots, R_k$.

Where $R_i:: A_1 \times \ldots \times A_m \mapsto B_i$ for $i=1, \ldots, n$, $R=\langle R_1, \ldots, R_n \rangle$ is that binary relation:
R:: $A_1 \times \ldots \times A_m \mapsto B_1 \times \ldots \times B_n$
and
$R(x_1, \ldots, x_m) \to (y_1, \ldots, y_n)$ iff $R_i(x_1, \ldots, x_m) \to y_i$ for $i=1, \ldots, n$.

$\langle R_1, \ldots, R_k \rangle$ is the conglomeration of $R_1, \ldots, R_k$.

We write $f: A \mapsto B$ to indicate that $f$ is a function from A to B; i.e., that $f:: A \mapsto B$:-for any $a \in A$ and $b \in B$, if $f(a) \to b$, then $f(a)=b$. For any set S, $id_S$ is the function for which $id_S(x)=x$ for every $x \in S$.

Directed Graphs, Control Flow Graphs, and Dominators. A directed graph (DG) is an ordered pair $G=(N,A)$ where set N is the node-set and binary relation $A \subset N \times N$ is the arc-relation or edge-relation. $(x,y) \in A$ is an arc or edge of G.

A path in a DG $G=(N,A)$ is a sequence of nodes $(n_1, \ldots, n_k)$ where $n_i \in N$ for $i=1, \ldots, k$ and $(n_i, n_{i+1}) \in A$ for $i=1, \ldots, k-1$. $k-1 \geq 0$ is the length of the path. The shortest possible path has the form $(n_1)$ with length zero. A path $(n_1, \ldots, n_k)$ is acyclic iff no node appears twice in it; i.e., iff there are no indices i, j with $1 \leq i < j \leq k$ for which $n_i = n_j$. For a set S, we define $S^r = S \times \ldots \times S$ where S appears r times and $\times$ appears $r-1$ times (so that $S^1 = S$), and we define $S^+ = S^1 \cup S^2 \cup S^3 \cup \ldots$ —the infinite union of all Cartesian products for S of all possible lengths. Then every path in C is an element of $N^+$.

In a directed graph (DG) $G=(N,A)$, a node $y \in N$ is reachable from a node $x \in N$ if there is a path in G which begins with x and ends with y. (Hence every node is reachable from itself.) The reach of a node x in N is the set of nodes which are reachable from x. Two nodes x,y are connected in G iff one of the two following conditions hold recursively:

there is a path of G in which both x and y appear, or there is a node $z \in N$ in G such that x and z are connected and y and z are connected.

(If $x=y$, then the singleton (i.e., length one) path (x) is a path from x to y, so every node $n \in N$ of G is connected to itself.) A DG $G=(N,A)$ is a connected DG iff every pair of nodes $x,y \in N$ of G is connected.

For every node $x \in N$, $|\{y|(x,y) \in A\}|$, the number of arcs in A which start at x and end at some other node, is the out-degree of node x, and for every node $y \in N$, $|\{x|(x,y) \in A\}|$, the number of arcs in A which start at some node and end at y, is the in-degree of node y. The degree of a node $n \in N$ is the sum of n's in- and out-degrees.

A source node in a DG $G=(N,A)$ is a node whose in-degree is zero, and a sink node in a DG $G=(N,A)$ is a node whose out-degree is zero.

A DG $G=(N,A)$ is a control-flow graph (CFG) iff it has a distinguished source node $n_0 \in N$ from which every node $n \in N$ is reachable.

Let $G=(N,A)$ be a CFG with source node $n_0$. A node $x \in N$ dominates a node $y \in N$ iff every path beginning with $n_0$ and ending with y contains x. (Note that, by this definition and the remarks above, every node dominates itself.)

With $G=(N,A)$ and s as above, a nonempty node set $X \subset N$ dominates a nonempty node set $Y \subset N$ iff every path starting with $n_0$ and ending with an element of Y contains an element of X. (Note that the case of a single node dominating another single node is the special case of this definition where $|X|=|Y|=1$.)

2.3.2 Algebraic Structures. Z denotes the set of all integers and N denotes the set of all integers greater than zero (the natural numbers). $Z/(m)$ denotes the ring of the integers modulo m, for some integer m>0. Whenever m is a prime number, $Z/(m)=GF(m)$, the Galois field of the integers modulo m. B denotes the set $\{0,1\}$ of bits, which may be identified with the two elements of the ring $Z/(2)=GF(2)$.

Identities. Identities (i.e., equations) play a crucial role in obfuscation: if for two expressions X, Y, we know that $X=Y$, then we can substitute the value of Y for the value of X, and we can substitute the computation of Y for the computation of X, and vice versa.

That such substitutions based on algebraic identities are crucial to obfuscation is easily seen by the fact that their use is found to varying extents in every one of [2, 4, 5, 7, 8, 9, 17, 18, 19, 20, 23, 24, 27].

Sometimes we wish to identify (equate) Boolean expressions, which may themselves involve equations. For example, in typical computer arithmetic, $x=0$ iff $(-(x \vee (-x))-1)<0$ (using signed comparison). Thus "iff" equates conditions, and so expressions containing "iff" are also identities—specifically, condition identities or Boolean identities.

Matrices. We denote an r×c (r rows, c columns) matrix M by $$M = \begin{bmatrix} m_{1,1} & m_{1,2} & \ldots & m_{1,c} \\ m_{2,1} & m_{2,2} & \ldots & m_{2,c} \\ \vdots & \vdots & \ddots & \vdots \\ m_{r,1} & m_{r,2} & \ldots & m_{r,c} \end{bmatrix},$$

where its transpose is denoted by $M^T$ where $$M^T = \begin{bmatrix} m_{1,1} & m_{2,2} & \ldots & m_{r,1} \\ m_{1,2} & m_{2,2} & \ldots & m_{r,2} \\ \vdots & \vdots & \ddots & \vdots \\ m_{1,c} & m_{2,c} & \ldots & m_{r,c} \end{bmatrix},$$

so that, for example, $$\begin{bmatrix} a & b \\ c & d \\ e & f \end{bmatrix}^T = \begin{bmatrix} a & c & e \\ b & d & f \end{bmatrix}.$$

Relationship of $Z/(2^n)$ to Computer Arithmetic. On $B^n$, the set of all length-n bit-vectors, define addition (+) and multiplication (·) as usual for computers with 2's complement fixed point arithmetic (see [21]). Then $(B^n,+,\cdot)$ is the finite two's complement ring of order $2^n$. The modular integer ring $Z/(2^n)$ is isomorphic to $(B^n,+,\cdot)$, which is the basis of typical computer fixed-point computations (addition, subtraction, multiplication, division, and remainder) on computers with an n-bit word length.

For convenience, we may write x·y (x multiplied by y) by xy; i.e., we may represent multiplication by juxtaposition, a common convention in algebra.

In view of this isomorphism, we use these two rings interchangeably, even though we can view $(B^n,+,\cdot)$ as containing signed numbers in the range $-2^{n-1}$ to $2^{n-1}-1$ inclusive. The reason that we can get away with ignoring the issue of whether the elements of $(B^n,+,\cdot)$ occupy the signed range above or the range of magnitudes from 0 to $2^n-1$ inclusive, is that the effect of the arithmetic operations "+" and "·" on bit-vectors in $B^n$ is identical whether we interpret the numbers as two's complement signed numbers or binary magnitude unsigned numbers.

The issue of whether we interpret the numbers as signed arises only for the inequality operators <, >, $\leq$, $\geq$, which means that we should decide in advance how particular numbers are to be treated: inconsistent interpretations will produce anomalous results, just as incorrect use of signed and unsigned comparison instructions by a C or C++ compiler will produce anomalous code.

Bitwise Computer Instructions and $(B'', \vee, \wedge, \neg)$. On $B''$, the set of all length-n bit-vectors, a computer with n-bit words typically provides bitwise and ($\wedge$), inclusive or ($\vee$) and not ($\neg$). Then $(B'', \vee, \wedge, \neg)$ is a Boolean algebra. In $(B, \vee, \wedge, \neg)$, in which the vector-length is one, 0 is false and 1 is true.

TABLE C

| Conjunction | Binary | Result |
|---|---|---|
| $\bar{x} \wedge \bar{y} \wedge \bar{z}$ | 000 | 1 |
| $\bar{x} \wedge \bar{y} \wedge z$ | 001 | 0 |
| $\bar{x} \wedge y \wedge \bar{z}$ | 010 | 0 |
| $\bar{x} \wedge y \wedge z$ | 011 | 1 |
| $x \wedge \bar{y} \wedge \bar{z}$ | 100 | 1 |
| $x \wedge \bar{y} \wedge z$ | 101 | 1 |
| $x \wedge y \wedge \bar{z}$ | 110 | 1 |
| $x \wedge y \wedge z$ | 111 | 1 |

Truth Table for $x \vee (y \oplus \bar{z})$

For any two vectors u, v∈$B''$, we define the bitwise exclusive or ($\oplus$) of u and v, by $u \oplus v = (u \wedge (\neg v)) \vee ((\neg u) \wedge v)$. For convenience, we typically represent $\neg x$ by $\bar{x}$. For example, we can also express this identity as $u \oplus v = (u \vee v) \wedge (\bar{u} \vee \bar{v})$.

Since vector multiplication—bitwise and ($\wedge$)—in a Boolean algebra is associative, $(B'', \oplus, \wedge)$ is a ring (called a Boolean ring).

Truth Tables. To visualize the value of an expression over $(B, \wedge, \vee, \neg)$, we may use a truth table such as that shown in Table C. The table visualizes the expression $x \vee (y \oplus \bar{z})$ for all possible values of Booleans (elements of B) x,y,z. In the leftmost column, headed "Conjunction", we display the various states of x,y,z by giving the only "and" (conjunction) in which each variable occurs exactly once in either normal (v) or complemented ($\bar{v}$) form which is true (i.e., 1). In the middle column, headed "Binary", we display the same information as a binary number, with the bits from left to right representing the values of the variables from left to right. In the right column, headed "Result", we show the result of substituting particular values of the variables in the expression $x \vee (y \oplus \bar{z})$. E.g., if $\bar{x} \wedge y \wedge z$ is true (i.e., 1), then the values of x,y,z, respectively, are 011, and $x \vee (y \oplus \bar{z}) = 0 \vee (1 \oplus \bar{1}) = 0 \vee (1 \oplus 0) = 1$.

Presence and Absence of Multiplicative Inverses and Inverse Matrices. For any prime power, while in GF(m), every element has a multiplicative inverse (i.e., for every $X \in \{0,1, \ldots, m-1\}$, there is a $y \in \{0,1, \ldots, m-1\}: x \cdot y = 1$), this is not true in general for $Z/(k)$ for an arbitrary $k \in N$—not even if k is a prime power. For example, in $Z/(2'')$, where $n \in N$ and $n > 1$, no even element has a multiplicative inverse, since there is no element which can yield 1, an odd number, when multiplied by an even number. Moreover, the product of two nonzero numbers can be zero. For example, over $Z/(2^3)$, $2 \cdot 4 = 0$, since 8 mod 8 = 0. As a result of these ring properties, a matrix over $Z/(2'')$ may have a nonzero determinant and still have no inverse. For example, the matrix $$\begin{bmatrix} 1 & 0 \\ 0 & 2 \end{bmatrix}$$

is not invertible over $Z/(2'')$ for any $n \in N$, even though its determinant is 2. A matrix over $Z/(2'')$ is invertible iff its determinant is odd.

Another important property of matrices over rings of the form $Z/(2'')$ is this. If a matrix M is invertible over $Z/(2''')$, then for any integer $n > m$, if we create a new matrix N by adding n−m "0" bits at the beginning of the binary representations of the elements, thereby preserving their values as binary numbers, but increasing the 'word size' from m bits to n bits, then N is invertible over $Z/(2'')$ (since increasing the word-length of the computations does not affect the even/odd property when computing the determinant).

Normally, we will not explicitly mention the derivation of a separate matrix N derived from M as above. Instead, for a matrix M over $Z/(2''')$ as above, we will simply speak of M "over $Z/(2'')$", where the intent is that we are now considering the matrix N derived by increasing the 'word size' of the elements of M; i.e., we effectively ignore the length of the element tuples of M, and simply consider the elements of M as integer values. Thus, when we speak of M "over $Z/(2'')$", we effectively denote M modified to have whatever word (tuple) size is appropriate to the domain $Z/(2'')$.

Combining the Arithmetic and Bitwise Systems. We will call the single system $(B'', +, \cdot, \vee, \vee, \neg)$ obtained by combining the algebraic systems $(B'', +, \cdot)$ (the two's complement ring of order $2''$) and $(B'', \wedge, \wedge, \neg)$ (the Boolean algebra of bit-vectors of length n under bitwise and, inclusive or, and not), a Boolean-arithmetic algebra (a BA algebra), and denote this particular ba algebra on bit-vectors of length n by BA[n].

BA[1] is a special case, because + and $\oplus$ are identical in this BA algebra ($\oplus$ is sometimes called "add without carry", and in BA[1] the vector length is one, so + cannot be affected by carry bits.)

We note that $u - v = u + (-v)$ in $Z/(2'')$, and that $-v = \bar{v} + 1$ (the 2's complement of v), where 1 denotes the vector $(0,0, \ldots, 0,1) \in B''$ (i.e., the binary number $00 \ldots 01 \in B''$). Thus the binary +, −, · operations and the unary − operation are all part of $Z/(2'')$.

If an expression over BA[n] contains both operations +, −, · from $Z/(2'')$ and operations from $(B'', \wedge, \vee, \neg)$, we will call it a mixed Boolean-arithmetic expression (an MBA expression). For example, "$(8234x) \vee y$" and "$\bar{x} + ((yz) \wedge x)$" are MBA expressions which could be written in C, C++, or Java™ as "8234*x|~x" and "~x+(y*z & x)", respectively. (Typically, integral arithmetic expressions in programming languages are implemented over BA[32]—e.g., targeting to most personal computers—with a trend towards increasing use of BA[64]—e.g., Intel Itanium™.)

If an expression E over BA[n] has the form $$E = \sum_{i=1}^{k} c_i e_i = c_1 e_1 + c_2 e_2 + \ldots + c_k e_k$$

where $c_1, c_2, \ldots, c_k \in B''$ and $e_1, e_2, \ldots, e_k$ are expressions of a set of variables over $(B'', \vee, \wedge, \neg)$, then we will call E a linear MBA expression.

Polynomials. A polynomial is an expression of the form $$f(x) = \sum_{i=0}^{d} a_i x^i = a_d x^d + \ldots + a_2 x^2 + a_1 x + a_0$$

(where $x^0 = 1$ for any x). If $a_d \neq 0$, then d is the degree of the polynomial. Polynomials can be added, subtracted, multiplied, and divided, and the result of such operations are themselves polynomials. If $d = 0$, the polynomial is constant; i.e., it consists simply of the scalar constant $a_0$. If $d > 0$, the polynomial is non-constant. We can have polynomials over finite and infinite rings and fields.

A non-constant polynomial is irreducible if it cannot be written as the product of two or more non-constant polynomials. Irreducible polynomials play a rôle for polynomials similar to that played by primes for the integers.

The variable x has no special significance: as regards a particular polynomial, it is just a place-holder. Of course, we may substitute a value for x to evaluate the polynomial—that is, variable x is only significant when we substitute something for it.

We may identify a polynomial with its coefficient $(d+1)$-vector $(a_d, \ldots, a_1, a_0)$.

Polynomials over $GF(2)=Z/(2)$ have special significance in cryptography, since the $(d+1)$-vector of coefficients is simply a bit-string and can efficiently be represented on a computer (e.g., polynomials of degrees up to 7 can be represented as 8-bit bytes); addition and subtraction are identical; and the sum of two such polynomials in bit-string representation is computed using bitwise $\oplus$ (exclusive or).

Finite Fields. For any prime number p, $Z/(p)$ is not only a modular integer ring, but a modular integer field. It is differentiated from a mere finite ring in that every element has a unique inverse.

Computation in such fields is inconvenient since many remainder operations are needed to restrict results to the modulus on a computer, and such operations are slow.

For any prime number p and integer $n \geq 1$, there is a field having $p^n$ elements, denoted $GF(p^n)$. The field can be generated by polynomials of degrees 0 to n−1, inclusive, over the modular ring $Z/(p)$, with polynomial computations performed modulo an irreducible polynomial of degree n. Such fields become computationally more tractable on a computer for cases where p=2, so that the polynomials can be represented as bit-strings and addition/subtraction as bitwise $\oplus$. For example, the advanced encryption standard (AES) [15] is based on computations over $GF(2^8)$. Matrix operations over $GF(2^n)$ are rendered much more convenient due to the fact that functions which are linear over $GF(2^n)$ are also linear over $GF(2)$; i.e., they can be computed using bit-matrices. Virtually every modern computer is a 'vector machine' for bit-vectors up to the length of the machine word (typically 32 or 64), which facilitates computations based on such bit-matrices.

2.3.3. Partial Evaluation (PE). While partial evaluation is not what we need to create general, low-overhead, effective interlocks for binding protections to SBEs, it is strongly related to the methods of the instant invention, and understanding partial evaluation aids in understanding those methods.

A partial evaluation (PE) of an MF is the generation of a MF by freezing some of the inputs of some other MF (or the MF so generated). More formally, let $f:: X \times Y \mapsto Z$ be an MF. The partial evaluation (PE) of $f$ for constant $c \in Y$ is the derivation of that MF $g:: X \mapsto Z$ such that, for any $x \in X$ and $z \in Z$, $g(x) \rightarrow z$ iff $f(x,c) \rightarrow z$. To indicate this PE relationship, we may also write $g(\cdot) \equiv f(\cdot, c)$. We may also refer to the MF g derived by PE of $f$ as a partial evaluation (PE) of $f$. That is, the term partial evaluation may be used to refer to either the derivation process or its result.

In the context of SBEs and their protection in software, $f$ and g above are programs, and x,c are program inputs, and the more specific program g is derived from the more general program $f$ by pre-evaluating computations in $f$ based on the assumption that its rightmost input or inputs will be the constant c. x,c may contain arbitrary amounts of information.

To provide a specific example, let us consider the case of compilation. Without PE, for a compiler program p, we may have p: $S \mapsto E$ where S is the set of all source code files and E is the set of object code files. Then $e=p(s)$ would denote an application of the compiler program p to the source code file s, yielding the object code file e. (We take p to be a function, and not just a multi-function, because we typically want compilers to be deterministic.)

Now suppose we have a very general compiler q, which inputs a source program s, together with a pair of semantic descriptions: a source language semantic description d and a description of the semantics of executable code on the desired target platform t. It compiles the source program according to the source language semantic description into executable code for the desired target platform. We then have q: $S \times (D \times T) \mapsto E$ where S is the set of source code files, D is the set of source semantic descriptions, T is the set of platform executable code semantic descriptions, and E is the set of object code files for any platform. Then a specific compiler is a PE p of q with respect to a constant tuple $(d,t) \in D \times T$, i.e., a pair consisting of a specific source language semantic description and a specific target platform semantic description: that is, $p(s)=q(s,(d,t))$ for some specific, constant $(d,t) \in D \times T$. In this case, X (the input set which the PE retains) is S (the set of source code files), Y (the input set which the PE removes by choosing a specific member of it) is $D \times T$ (the Cartesian product of the set D of source semantic descriptions and the set T of target platform semantic descriptions), and Z (the output set) is E (the set of object code files).

PE is used in [7, 8]: the AES −128 cipher [15] and the DES cipher [12] are partially evaluated with respect to the key in order to hide the key from attackers. A more detailed description of the underlying methods and system is given in [17, 18].

Optimizing compilers perform PE when they replace general computations with more specific ones by determining where operands will be constant at run-time, and then replacing their operations with constants or with more specific operations which no longer need to input the (effectively constant) operands.

2.3.4. Output Extension (OE). Suppose we have a function $f: U \mapsto V$. Function g: $U \mapsto V \times W$ is an output extension (OE) of $f$ iff for every $u \in U$ we have $g(u)=(f(u),w)$ for some $w \in W$. That is, g gives us everything that $f$ does, and in addition produces extra output information.

We may also use the term output extension (OE) to refer to the process of finding such a function g given such a function $f$.

Where function $f$ is implemented as a routine or other program fragment, it is generally straightforward to determine a routine or program fragment implementing a function g which is an OE of function $f$, since the problem of finding such a function g is very loosely constrained.

2.3.5. Reverse Partial Evaluation (RPE). To create general, low-overhead, effective interlocks for binding protections to SBEs, we will employ a novel method based on reverse partial evaluation (RPE).

Plainly, for almost any MF or program $g:: X \mapsto Z$, there is an extremely large set of programs or MFs $f$, sets Y, and constants $c \in Y$, for which, for any arbitrary $x \in X$, we always have $g(x)=f(x,c)$.

We call the process of finding such a tuple $(f,c,Y)$ (or the tuple which we find by this process) a reverse partial evaluation (RPE) of g.

Notice that PE tends to be specific and deterministic, whereas RPE offers an indefinitely large number of alternatives: for a given g, there can be any number of different tuples $(f,c,Y)$ every one of which qualifies as an RPE of g.

Finding an efficient program which is the PE of a more general program may be very difficult—that is, the problem is very tightly constrained. Finding an efficient RPE of a given specific program is normally quite easy because we have so many legitimate choices—that is, the problem is very loosely constrained.

2.3.6. Control Flow Graphs (CFGs) in Code Compilation. In compilers, we typically represent the possible flow of control through a program by a control flow graph (CFG), where a basic block (BB) of executable code (a 'straight line' code sequence which has a single start point, a single end point, and is executed sequentially from its start point to its end point) is represented by a graph node, and an arc connects the node corresponding to a BB U to the node corresponding to a BB V if, during the execution of the containing program, control either would always, or could possibly, flow from the end of BB U to the start of BB V. This can happen in multiple ways:

(1) • Control flow may naturally fall through from BB U to BB V.

For example, in the C code fragment below, control flow naturally falls through from U to V:

```
switch(radix) {
    case HEX:
        U
    case OCT:
        V
    ...
}
```

(2) • Control flow may be directed from U to V by an intra-procedural control construct such as a while-loop, an if-statement, or a goto-statement.

For example, in the C code fragment below, control is directed from A to Z by the break-statement:

```
switch(radix) {
    case HEX:
        A
        break;
    case OCT:
        B
    ...
}
Z
```

(3) • Control flow may be directed from U to V by a call or a return.

For example, in the C code fragment below, control is directed from B to A by the call to f( ) in the body of g( ), and from A to C by the return from the call to f( ):

```
void f(void) {
    A
    return;
}
int g(int a, float x) {
    B
    f( );
    C
}
```

(4) • Control flow may be directed from U to V by an exceptional control-flow event.

For example, in the C++ code fragment below, control is potentially directed from U to V by a failure of the dynamic_cast of, say, a reference y to a reference to an object in class A:

```
#include<typeinfo>
...
int g(int a, float x) {
    ...
    try {
        ...
        U
        A& x = dynamic_cast<A&>(y);
        ...
    catch(bad_cast c) {
        V
    }
    ...
}
```

For each node n∈N in a CFG C=(N,T)—C for control, T for transfer—node n is taken to denote a specific BB, and that BB computes an mf determined by the code which BB n contains: some function $f:: X \mapsto Y$, where X represents the set of all possible values read and used by the code of n (and hence the inputs to function $f$), and Y represents the set of all possible values written out by the code of n (and hence the outputs from function $f$). Typically $f$ is a function, but if $f$ makes use of nondeterministic inputs such as the current reading of a high-resolution hardware clock, $f$ is an MF but not a function. Moreover, some computer hardware includes instructions which may produce nondeterministic results, which, again, may cause $f$ to be an MF, but not a function.

For an entire program having a CFG C=(N,T) and start node $n_0$, we identify N with the set of BBs of the program, we identify $n_0$ with the BB appearing at the starting point of the program (typically the beginning BB of the routine main( ) for a C or C++ program), and we identify T with every feasible transfer of control from one BB of the program to another.

Sometimes, instead of a CFG for an entire program, we may have a CFG for a single routine. In that case, we identify N with the set of BBs of the routine, we identify $n_0$ with the BB appearing at the beginning of the routine, and we identify T with every possible transfer of control from one BB of the routine to another.

2.3.7. Alternative Interpretations of CFGs. In §2.3.6 we discuss the standard compiler-oriented view of a control flow graph (CFG). However, the relationships among sub-computations indicated by a CFG may occur in other ways.

For example, a CFG C=(N,T) may represent a slice of a computation, where a slice is that part of a computation related to a particular subset of inputs and/or variables and/or outputs. The concept of a slice is used in goal-directed analysis of programs, where analysis of the full program may consume excessive resources, but if attention is focused on only a part of the computation, a deeper analysis of that part is feasible.

In particular, we may have a multi-process or even distributed parallel program C=(N,T) in which a CFG C=(N,T) occurs with respect to a slice of the computation, in which only some of the BBs of the parallel program are included in N (i.e., in which N⊆N), and T represents the flow of execution among elements of N when computations which are in C but not in its subset C are ignored. That is, the single-process non-parallel program C may be embedded in a larger parallel program C so that C occupies more than one process, but with respect to the computations in the elements of N, the computations are effectively sequential, because of messaging constraints or other constraints imposed by C.

All of the methods of the instant invention apply equally to programs which have a natural, single-process method of control, and to slices of larger, containing, parallel programs, so long as the control-flow requirements of the instant invention are met. We exploit this alternative view of CFGs to implement the methods of §2.10.6.

In addition, the code within a BB is embodied in a series of computer instructions, which instruct the computer to change its state. Typically, an instruction affects a small part of the state and leaves the remainder of the state untouched. A BB may also include routines. A routine itself contains a CFG, and is constructed to permit this CFG to be executed by a call which passes into the routine initial parts of its state (arguments), with execution returning immediately after the call.

We may either view a routine as part of the normal control flow (the detailed view), or we may abstract from the detailed view and regard a routine-call as a sort of 'super instruction' which causes the computer to perform a more complex change of the state than the usual computer instruction.

Both views are useful in connection with the instant invention—we may choose whichever view of a particular call is more convenient for a particular purpose. Thus when we speak of the CFG of a program, we mean that CFG after the chosen forms of abstraction have been applied. Moreover, we may apply the instant invention to interlocking of different aspects of a program by employing different views of the same routine calls for different interlocks.

2.4. Relational and Computational Structure of Interlocks. In the straightforward construction of an SBE, there will often be parts which are naturally entirely free of interlocks: that is, there are parts whose operation makes them independent of one another. In order to protect specific behaviors of an SBE, possibly including specific protective behaviors added to an SBE, we must ensure that this is never the case for those parts of an SBE which implement the specific behaviors. Thus we must take parts of computations underlying SBE behaviors which are initially independent, and cause them to become dependent.

The instant invention describes a technique based on the concepts of partial evaluation (PE) of MFs, output extension (OE) of MFs, reverse partial evaluation (RPE) of MFs, and dominating nodes and sets in control-flow graphs.

2.4.1. Relational Structure of an Interlock. An interlock's minimal relational structure is shown in FIG. 1. In FIG. 1, initial and final program states connected by a computation are shown. The upper path from the A state to the B state represents a normal, unencoded or unobfuscated computation, and the lower path from state A' to state B' represents an encoded or obfuscated computation from an encoded or obfuscated state A' (an obfuscation of state A) to an encoded or obfuscated state B' (an obfuscation of state B) ("'" indicates a modified entity: an input-output encoded, input-encoded, or output-encoded MF or an encoded data state.) R' is the transfer MF: it carries interlocking information from state A' to state B'.

In this minimal structure, R was an original computation, transforming a computation state $a \in A$ to a state $b \in B$. (R need not be deterministic.) R' is the computation after it has been modified according to the instant invention. R' is the modified computation, transforming an extended state $a' \in A'$ to an extended state $b' \in B'$. By extended, we mean that a' and b' contain all of the information in a and b, respectively, plus additional information. The additional information can be used to determine whether (1) b' arose from the intended computation R' on a', or (2) b' instead arose from code which has been modified by an attacker, and/or from modified data replacing a' due to tampering by an attacker. This extra information, and the fact that it can be checked for validity, is the essential core of an interlock.

Normally, there will be further modifications according to the instant invention, which will provide additional initial computations to create the extra information at the outset, and further modifications which will provide additional final computations to consume the extra information, and depending on the legitimacy of the final state, computation proceeds normally thereafter if it is legitimate computation will fail with high probability if it is illegitimate.

If all of $R, R', d, d^{-1}, r, r^{-1}$ were not just relations, but functions, then FIG. 1 would be the commutative diagram for computing with an encrypted function, as suggested in [23, 24]. (In category theory, such a diagram is used to indicate relationships among functions such that different paths from one node to another in the diagram are equivalent. E.g., the diagram would indicate that $R' = c \circ R \circ d^{-1}$.)

Figure 2:
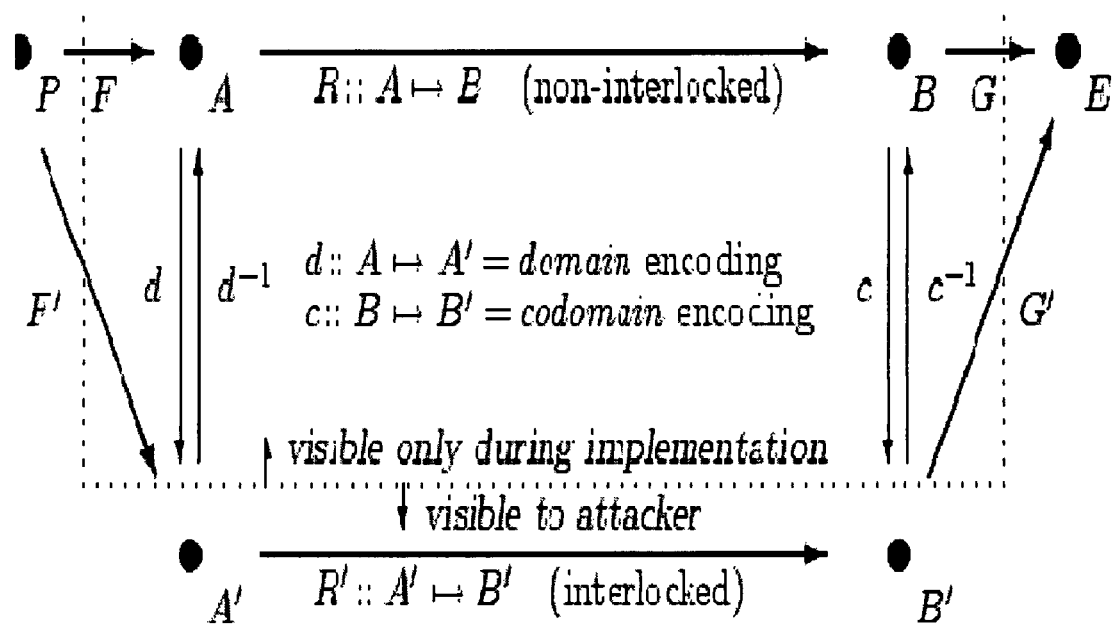
FIG. 2 shows exactly the same inner structure as FIG. 1 in a typical interlocking situation.

However, for our purposes this is inadequate. First, an interlock operates as protected code in a context of less protected code. Thus the diagram shows only a specific, protected part of the computation. (A more typical arrangement is shown in FIG. 2, which has the same inner structure.)

Secondly, producing an interlock which is essential, integral, obscure, and contextual, as these properties are defined hereinafter, requires a more powerful method. We do not require that $R, R', d, d^{-1}, r, r^{-1}$ be functions, but we do ensure the above-mentioned crucial properties by placing strong requirements on $R', d, d^{-1}, r, r^{-1}$. Hence the arrows in FIG. 1 denote MFs. E.g., the arrow from A to A' indicates that $d \subset A \times A'$; i.e., that d:: $A \mapsto A'$. Hence there may be no unique $a' \in A'$ corresponding to a specific $a \in A$.

FIG. 1 shows initial and final program states connected by a computation. This diagram applies to an interlock operating in isolation, where no significant data states precede the occurrence of the interlock and no significant data states follow it: i.e., such an interlock is derived by omissions from the interlock structure shown in FIG. 2 on: the (interlock-information-)production code F' of the interlock, which sets up (interlock-information-)produced state A' from some normal prologue state P and transitions the state to A', and the (interlock-information-)consumption code of the interlock, which transitions the (interlock-information-)transferred state B' to some normal epilogue state E, are computed elsewhere. For example, FIG. 1 would apply to the case of a transaction-processing program in a network in which (interlock-information-) transfer code R':: $A' \mapsto B'$ processes a transaction derived from a normal, unprotected pretransfer (i.e., pre-interlock-information-transfer) computation R:: $A \mapsto B$, but neither sets up the produced state of the interlock A' nor restores normal computation after the transferred state B' of the interlock is reached—nor induces computational failure if tampering occurs between state A' and state B'', the nonstandard variant of B' resulting from tampering. In this truncated version of an interlock, the action is 'off-stage', occurring at some other site, and only the transfer portion of the interlock, the computation R':: $A' \mapsto B'$, is present.

This figure shows that starting state A' (derived from A according to the domain encoding, d), the computation R' which converts state A' to state B', and ending state B' (derived from B according to the codomain encoding, c) are visible to the attacker. State A, the starting data state if no interlock had been introduced, computation R, the computation which would have converted A to B if no interlock had been introduced, and ending state B, the ending data state if no interlock had been introduced, are not available to the attacker: they have been eradicated by the insertion of the interlock into the program. N.B.: The actual isolated interlock computation is R'. Computations $R, d, d^{-1}, r, r^{-1}$ and states A, B do not exist in the final implementation; they are only used during construction of the interlock computation R' based on the non-interlock computation R.

FIG. 2 shows exactly the same inner structure as FIG. 1 in a typical interlocking situation, where execution along the lower path is interlocked by diverting execution from the A-to-B path at some preceding state P onto the encoded or obfuscated A'-to-B' path, and then returned to normal, unencoded or unobfuscated computation at some unencoded or unobfuscated ending state E which ends the interlock. The situation in FIG. 2 is the typical interlocking situation, however, where, prior to introduction of the interlock into the code, there was a preceding prologue state P, converted to the preproduced (i.e., pre-interlock-information-produced) state A by preproduction (i.e., pre-interlock-information-production) computation F, which in turn is converted to pretransferred (i.e., pre-interlock-information-transferred) state B by pretransfer computation R, which in turn is converted to the epilogue state E by preconsumption (i.e., pre-interlock-information-consumption) computation G. We have chosen to interlock A and B. After the introduction of the interlock, we start in prologue state P, convert it to the produced state A' by production computation F', where A is related to A' by domain encoding relation d, convert A' to the transferred state B' by transfer computation R', where B is related to B' by codomain encoding c, and convert B' to the epilogue state E by consumption computation G'. (Production of the interlock information brings it to a state in which it may be used, and consumption of the interlock information uses that information, and either functions normally if no tampering interferes, or malfunctions if tampering interferes with its operation.) The attacker has access only to the program after the interlock has been inserted; i.e., the attacker can see only states P,A', B',E and computations F',R',G'. The original states A,B, computations F,R,G, the relationship d between A and A', and the relationship c between B and B', have disappeared in the final version of the program with the interlock installed. N.B.: The components of the installed interlock are the production F', the produced state A', the transfer R', the transferred state B', and the consumption G'. The corresponding components before installation of the interlock are named by adding the prefix "pre" to indicate that the interlock installation modifications have not yet been made: the preproduction F, the preproduced state A, the pretransfer R, the pretransferred state B, and the preconsumption G. The prologue state P and the epilogue state E are present both before and after the interlock is installed.

F' is derived from F by output extension (OE). We create an output extension $F_{OE}$:: P↦A×J of F; i.e., we modify F to compute extra information J by output extension. We then encode A×J; i.e. we derive an encoding A'=(A×J)', where the "'" indicates a modified or encoded entity. We then modify $F_{OE}$ to obtain F':: P↦A' where A'=(A×J)' and F'=F'$_{OE}$ Thus F' is an encoded version of an OE $F_{OE}$ of the original F.

R':: A'↦B' is derived from R:: A↦B by aggregation. The original computation intervening between A and B, namely R:: A↦B, must be replaced by a computation which takes us from A' to B'. First, we note that A'=(A×J)'. We choose an MF (a computation) S:: J↦K with the property that it loses no information from J; i.e., that $S^{-1} \circ S$ is an identity function (for an arbitrary MF M., it is quite possible that $M^{-1} \circ M$ is not even a function, let alone an identity function) on J, so that $(S^{-1} \circ S)(x)=x$ for any x∈J.

Preserving Information. Functions which lose no information are well known in computer arithmetic and in finite rings and fields. For example, adding a constant c loses no information (the original can be recovered by subtracting c); exclusive-or with c loses no information (the original can be recovered by a second exclusive-or with c), multiplication by a nonsingular (i.e., invertible) matrix over a finite field or ring loses no information (the original vector is recovered by multiplying by its inverse), application of a deeply nonlinear bijective function to a vector, where the function is implemented according to the method described in The Solution: Use Wide-Input Deeply Nonlinear Functions loses no information (the original vector is retrieved by applying the inverse of that function derived as described in Inverting the Constructed Deeply Nonlinear Function). A wide choice of such functions is available for anyone versed in the properties of computer arithmetic and college algebra.

We define $R_{agg}$:: A×J↦B×K by $R_{agg}$=[R,S]

and input-output-encode $R_{agg}$, the intervening aggregation (IA) of the interlock, where the information-preserving MF S is constructed as noted above to preserve information, to obtain R':: A'↦B' where A'=(A×J)', B'=(B×K)', and R'=$R_{agg}$'=[R, S]'

G' is derived from G by reverse partial evaluation (RPE). We create an RPE $G_{RPE}$:: B×K↦E of G. We then encode $G_{RPE}$ and B×K, where the encoding of B×K is that chosen when we created R'. By encoding $G_{RPE}$, we obtain G':: B'↦E where B'=(B×K)' and G'=G'$_{RPE}$.

Thus G' is an encoded version of an RPE $G_{RPE}$ of the original G.

N.B.: The actual interlocked computation is R'. F,R,G,d,$d^{-1}$, r,$r^{-1}$ and states A,B do not exist in the final implementation; they are only used during construction of the interlock production computation F', which transitions the state from P, not modified by insertion of the interlock, to A', the state which sets up the interlock dependency, the interlocked computation R', based on the non-interlocked computation R, where R' is the computation which carries the interlock dependency from state A' to state B', and the interlock epilogue computation G', which transitions the state from B' back to E, the interlock epilogue state, which is not modified by the insertion of the interlock.

2.4.2. Computational Structure of an Interlock. Let W be either a program or a routine within a larger program, where W has the control-flow graph W=(N,T) with start node (i.e., start BB) $n_0$∈N, and where N is the set of BB s of W and T is the set of possible control-transfers in any execution of W from the end of one BB of W to the start of another BB of W.

The correspondence between elements of the relational and the computational views is shown in Table D.

TABLE D

Interlock Relational and Computational Views

| Phase | Relational View | Computational View |
|---|---|---|
| Original | G·R·F::P ↦ E | W = (N, T) |
| Interlocked | G'·R'·F'::P ↦ E | W' = (N', T') |
| Preproduction | F::P ↦ A where F = $f_1 \cup \ldots \cup f_m$ $f_i$::$P_i$ ↦ $A_i$ | BB set X = {$x_1, \ldots, x_m$} BB $x_i$ |
| Pretransfer | R::A ↦ B r::$A_i$ ↦ $B_j$ | V = BBs on paths between X and Y (if any) ($V_\alpha, \ldots, V_\omega$) path (if nonempty) between BB $x_i$ and BB $y_j$ |

TABLE D-continued

Interlock Relational and Computational Views

| Phase | Relational View | Computational View |
| --- | --- | --- |
| Preconsumption | $G::B \mapsto E$ where $G = g_1 \cup \ldots \cup g_n$ $g_i::B_j \mapsto E_j$ | BB set $Y = \{y_1, \ldots, y_n\}$ BB $y_j$ |
| Production | $F::P \mapsto A'$ where $F' = f_1 \cup \ldots \cup f_m$ $f_i::P_i \mapsto A'_i$ | BBset $X' = \{x'_1, \ldots, x'_m\}$ BB $x'_i$ |
| Transfer | $R'::A' \mapsto B'$ $r'::A'_i \mapsto B'_j$ | $V'$ = BBs on paths between $X'$ and $Y'$ (if any) $(v'_\alpha, \ldots, v'_\omega)$ path (if nonempty) between BB $x'_i$ and BB $y'_j$ |
| Consumption | $G'::B' \mapsto E$ where $G' = g'_1 \cup \ldots \cup g'_n$ $g'_j::B'_j \mapsto E_j$ | BB set $Y' = \{y'_1, \ldots, y'_n\}$ BB $y'_j$ |

Let BB set $X \subset N$ (the preproduction BBs) dominate BB set $Y \subset N$ (the preconsumption BBs), with $X \cap Y = \emptyset$, $X = \{x_1, \ldots, x_m\}$, and $Y = \{y_1, \ldots, y_n\}$, where no acyclic path in W which begins with $n_0$ has an element of X in more than one position, and no acyclic path in W which begins with $n_0$ has an element of Y in more than one position, so that the BBs in X are strict alternatives to one another, and the BBs in Y are strict alternatives to one another.

Let $x_i$ compute a relation $f_i:: P_i \mapsto A_i$ for $i=1,\ldots,m$ and let $y_i$ compute a relation $g_i:: B_i \mapsto E_i$ for $i=1,\ldots,n$. (In practical insertion of interlocks, we will often have $|X|=|Y|=1$, but there are cases where it is useful to create interlocks between larger sets of BBs.)

On paths between the preproduction BBs in X and the preconsumption BBs in Y lie the zero or more pretransfer BBs in $V = \{v_1, \ldots, v_k\}$. The intervening BB s in V compute the pretransfer mf $R:: A \mapsto B$ (and if V is empty, $A=B$ and $R=id_A$). For any given $x_i \in X$, $y_j \in Y$, there is a set of paths $p_1, \ldots, p_k \in V^+$, where each such path p has the form $(v_\alpha, v_\beta, v_\gamma, \ldots, v_\omega)$, and where $(x_i, v_\alpha, v_\beta, v_\gamma, \ldots, v_\omega, y_j)$ is a path in C, $(v_\alpha, v_\beta, v_\gamma, \ldots, v_\omega)$ computes an MF $r \subset R$ where $R:: A \mapsto B$, $r = r_\omega \circ \ldots \circ r_\gamma \circ r_\beta \circ r_\alpha$, and $v_i$ computes $r_i$, for $i = \alpha, \beta, \gamma, \ldots, \omega$, so that r is computed stepwise along the path $(v_\alpha, \ldots, v_\omega)$, as one would naturally expect.

Figure 3:
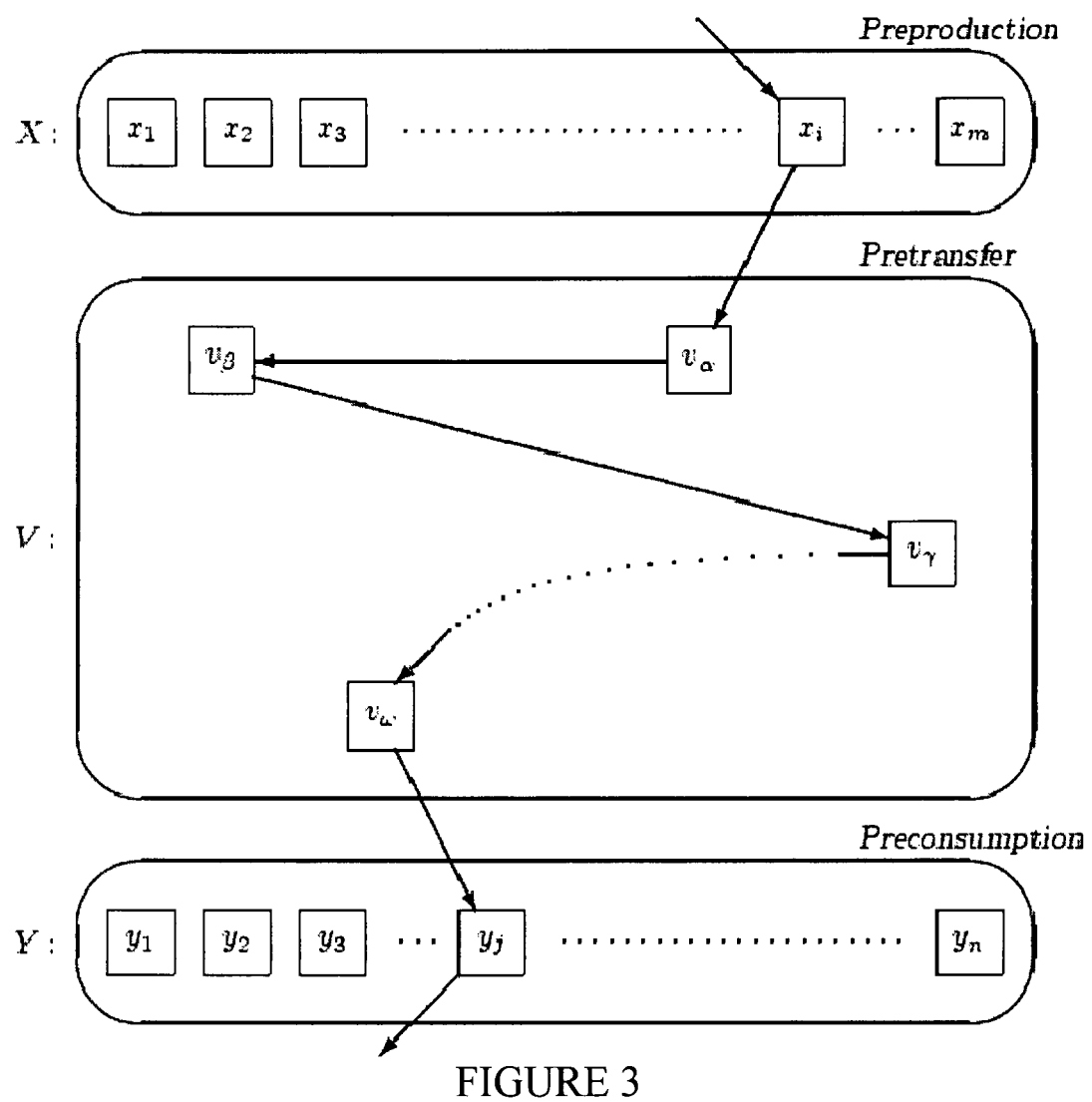
FIG. 3 shows a path through some Basic Block sets, providing an alternative view of a computation such as that in FIG. 2.

A possible path through these sets of BBs is shown in FIG. 3, which shows a path through the BB sets, pre-interlocking. (Post-interlocking, the path would be similar, but instead of $X, V, Y, x_1, x_2, x_3, \ldots, x_i, \ldots, x_m, v_\alpha, v_\beta, v_\gamma, \ldots, v_\omega, y_1, y_2, y_3, \ldots, y_j, \ldots, y_n$, the BB set and BB labels would be $X', V', Y', x'_1, x'_2, x'_3, \ldots, x'_i, \ldots, x'_m, v'_\alpha, v'_\beta, v'_\gamma, \ldots, v'_\omega, y'_1, y'_2, y'_3, \ldots, y'_j, \ldots, y'_n$.) FIG. 3 shows a path through some Basic Block sets, providing an alternative view of a computation such as that in FIG. 2, where control flows through an initial setup X (shown as the state P to the state A' path in FIG. 2), through an encoded or obfuscated computation V (shown as the state A' to state B' path in FIG. 2), and finally through a computation Y restoring normalcy (shown as the B' to E path in FIG. 2). In FIG. 3, we see control entering the interlock region at BB $x_i$, whence control transfers to $v_\alpha$, then $v_\beta$, then $v_\gamma$, then through some sequence of transfers not shown in the figure, eventually reaching $v_\omega$, whence control transfers to $y_j$, and then transfers out of the interlock region.

We assume here that state information, as in the prologue states $P_1, \ldots, P_m$, the preproduced states $A_1, \ldots, A_m$, the produced states $A'_1, \ldots, A'_m$, the pretransferred states $B_1, \ldots, B_n$, the transferred states $B'_1, \ldots, B'_n$, and the epilogue states $E_1, \ldots, E_n$, includes program counter information; i.e., the current execution position in the program is associated with the state. Then, in terms of FIG. 2, we have $P = P_1 \cup \ldots \cup P_m$, $A = A_1 \cup \ldots \cup A_m$, $F = f_1 \cup \ldots \cup f_m$, $B = B_1 \cup \ldots \cup B_n$, $G = g_1 \cup \ldots \cup g_n$, and $E = E_1 \cup \ldots \cup E_n$. The inclusion of program counter information in the state information ensures that, for reasonable mathematical interpretations of state information as sets of mappings from location- and register-identifier line-ups to their corresponding data contents (including a current program counter; i.e., the current execution position), the unions are unambiguous.

To create an interlock from BB set X to BB set Y, we modify program or routine W, creating a program (or routine) W', in which we modify the BBs of X, the BBs of V, and the BBs of Y as follows.

There will generally be computations (called pretransfer computations since transfer computations will be injected into these BBs) performed by BBs $V = \{v_1, \ldots, v_k\}$, forming the BB set V, which intervene on paths lying between X and Y. Corresponding to V, we create a set of transfer BBs V' replacing those of V, which carry the information of the output extension F' (the production) computed by X' (the production BBs) to the RPE G' (the consumption) computed by Y' (the consumption BBs). That is, the BBs in V perform the computation R in the unmodified program, and, with the interlock installed, the BBs in V's replacement set V' (the transfer BBs) perform the computation R' (the transfer).

For each BB $x_i \in X$ computing relation $f_i:: P_i \mapsto A_i$, modify it to become a BB $x'_i$ computing a relation $f'_i:: P_i \mapsto A'_i$ where $A'_i = (A_i \times J)'$, $f'_i = f_{OE,i}$, and $f_{OE,i}:: A_i \mapsto A_i \times J$ is an output extension of $f_i$.

For each BB path $(v_\alpha, \ldots, v_\omega)$ intervening between $x_i$ and $y_j$ in C (so that $(x_i, v_\alpha, \ldots v_\omega, y_j)$ is a path in C), where $(v_\alpha, \ldots, v_\omega)$ computes some $r \subset R$, modify the BBs in V so that path is replaced by a new path $(v_\alpha', \ldots, v_\omega')$ computing some $r' \subset R'$, where $r':: A_i' \mapsto B_j'$, where $A_i' = (A_i \times J)'$, $B_j' = (B_j \times K)$, $r' = r_{agg}'$, $r_{agg}:: A_i \times J \mapsto B_j \times K$, $r_{agg} = [r_{i,j}, s_{i,j}]$, where the union of the $r_{agg}$'s is $R_{agg}$, the union of the $r_{i,j}$'s is R, the union of the $s_{i,j}$'s is S, and $R_{agg} = [R, S]$ is the aggregation of the original R with mf S as described in §2.4.1 above. Also as noted above, $r_{i,j}$ and $s_{i,j}$ is computed stepwise along the path which is originally $(v_\alpha, \ldots, v_\omega)$ and finally is $(v'\alpha, \ldots, v'\omega)$.

For each BB $y_j \in Y_j$ computing relation $g_j:: B_j \mapsto E_j$, modify it to become a BB $y'_j$ computing a relation $g'_j:: B'_j \times K \mapsto E_j$ where $B'_j = B_j \times K$, $g'_j = g'_{RPE,j}$, and $g'_{RPE,j}:: B_j \times K \mapsto E_j$ is an output extension of $g_j$ with the property that, for every value $x \in J$ output by an $f_{OE,i}$, the corresponding $y \in K$ provided as the right input to a $g_{RPE,j}$ makes $g_{RPE,j}(\cdot, y)$ equivalent to $g_j(\cdot)$.

Let us call the replacements for the X BB s X', the replacements for the V BB s V', and the replacements for the Y BB s Y'. Then W' contains X', V', and Y', whereas W contains X, V, and Y. The above form of replacement of X by X', V by V', and Y by Y', converting W to W', is the installation of the interlock we have created from the functionality of X to the functionality of Y, which prevents tampering which would break the dependent data link between A' and B'.

In terms of FIG. 2, BBs X perform computation F, BB s Y perform computation G, BB s X' perform computation F', BB s Y' perform computation G', BB s V perform computation R, and BB s V' perform computation R'.

During execution of W', when any $y'_j \in Y'$ BB is encountered, control has reached $y'_j$ by passing through some $x'_i \in X'$ BB, since X' dominates Y'. When $x'_i$ was executed, it computed $f_i'$ instead of $f_i$, yielding some extra information $s \in J$ which is encoded into $A_i'$. Control reaches $y_j'$ which computes $g_j'$ via some path $(v_1', \ldots, v_z')$ computing $R'$, which has converted the extra information $s \in J$ to the extra information $t \in K$ which is encoded in $B_j'$. $y_j'$ is an RPE which correctly computes $g_j'$ only if this information reaches $y_j'$ without tampering occurring in either $X'$ or $V'$.

If the content of t is modified due to tampering with code or data by an attacker in $X'$ or between a BB in $X'$ and a BB in $Y'$, instead of computing an encoded version $g_{OE_j}(c,t)$, $y_j'$ computes an encoded version of $g_{OE_j}(c,u)$ for some value $u \neq t$. This causes the $G'$ computation to malfunction in one of a variety of ways as described hereinafter. While we have guaranteed in the original creation of the interlock that $g_j'(c,e)=g_j(c)$, modulo encoding and RPE, if we have constructed $X'$ and $Y'$ BBs wisely, we almost certainly have $g_j'(c,t') \neq g_j(c)$—in effect, we have caused execution of $y_j' \in Y'$ to cause W to malfunction as a result of tampering.

2.4.3. Interlock OEs, IAs, and RPEs Benefit From Diversity. In addition to the require forms of protections described below, code modified according to the instant invention to install an interlock benefits from diversity, either in the modified interlock code itself, or in code in the vicinity of code so modified, which makes the attacker's job much harder by rendering internal behavior less repeatable or by causing instances of an SBE to vary so that distinct instances require separate attacks.

Diversity occurs where
(1) internal computations in, or in the vicinity of, an interlock vary among their executions where, in the original SBE prior to modification according to the instant invention, the corresponding computations would not (dynamic diversity); or
(2) among instances of the SBE, code and data in, or in the vicinity of, an interlock, varies where, among instances of the original SBE prior to modification according to the instant invention, the corresponding pieces of code are identical (static diversity).

2.4.4. Interlock RPEs Must be Essential. In the above, we note that a modified $y_j'$ BB computes a modified function $g_j'(c,e)$. We require that e be essential in the evaluation of $g'$. That is, we require that, for with high probability, any change to the value e will cause $g_j'$ to compute a different result. If this is not the case, then tampering which modifies the value of extra information e produced by output extension into different information e' may well leave the result produced by $g_j'$ untouched.

We must ensure that such insensitivity to the output extension value is avoided, so that the $y_j'$ computation, $g_j'$, is highly sensitive to e, and, with respect to computing the normal output of $g_j$, the computation of $y_j$, $g_j'$ will malfunction with high probability whenever any tampering affecting the extra data input by $g_j'$ occurs.

2.4.5. Interlock OEs Must Be Integral. We can trivially output extend a routine implementing MF $f :: A \mapsto B$ into a routine implementing function $f' :: A \mapsto B \times E$ by having $f'$ compute the same result as $f$, but with a constant $k \in E$ tacked on as an argument which is simply ignored by the body of the routine. This is inappropriate for interlocking. Even if the constant k is substantially used by the body of the routine, the fact that it is a constant input constitutes a weakness: the run-time constant values are easily observed by an attacker, whose knowledge of such constants provides an easy point of attack.

Finding the constant is easy, since it is invariant, and including in arbitrary x" code the production of such a constant is also trivial. We want interlocks to be hard to remove, so such a trivial output extension is disastrously inappropriate for interlocking.

When we have a BB x which dominates a BB y, where x computes $f$ and y computes g, if we extend $f$ as $f'$ by adding another constant output unaffected by the input (i.e., if we modify the code of x into x', which produces, in addition to its usual output, some constant value), then an attacker can arbitrarily modify x' into any arbitrary BB x" whatsoever, so long as x" outputs the same constant as the original.

A similar problem arises if we output extend an implementation of MF $f :: A \mapsto B$ into a routine computing $f' :: A \mapsto B \times E$ by having $f'$ compute the same result as $f$, but with some result from an mf implementation $g(a) \mapsto e$ where $a \in A$ and $e \in E$, where g uses a very limited part of the information in a such as depending on the value of a single variable in the state a. This very limited dependence on the state $a \in A$ provides a means whereby the attacker may focus an attack on that very narrow portion of the computation, and by spoofing the very small portion of the input which affects the result in E, the attacker can remove the protection which would otherwise be provided by the interlock.

Thus the same problem stated above for a constant output extension applies similarly to a nonconstant output extension, whenever the computation of the extra output from the input is obvious. Anything obvious will be found by the attacker and bypassed: precisely what we seek to avoid.

Therefore, we must choose output extensions where the extra output value is produced by computations integral to the computation of the output extension $f'$ of $f$ computed by the modified BB x' which replaces x. The more deeply we embed the production of the extra value within the computations of $f'$ producing the original output of $f$, and the more subcomputations modified by the production of the extra value, the more integral to the computation of $f'$ the production of the extra output becomes, and the harder it is for the attacker to remove the interlock between x' and y'.

The same consideration applies to the case where x is replaced by a set of multiple BBs X and y is replaced by a set of multiple BBs Y, where X dominates Y. The output extensions must be integral to the computations of the modified BBs in X: the more deeply and widely integral they are to the computations in X, the better.

2.4.6. Interlock OEs and RPEs Must Be Obscure. Even if the RPE s are essential (see §2.4.4) and the output extensions are integral (see §2.4.5), an interlock may still be more susceptible to attack than we would wish unless the output extensions and RPEs are also obscure.

Software can be rendered obscure by a variety of techniques affecting various aspects of the code: see, for example, [2, 3, 4, 5, 7, 9, 17, 18, 19, 20, 27]. Use of some of these techniques can also be used to make computation of the extra output of an output extension integral to the original computation: see, for example, [2, 3, 4, 5, 19].

The employment of techniques such as the above in creating output extensions and RPEs for use in creation of interlocks is part of the preferred embodiment of the instant invention: especially, those techniques which, in addition, can be used to make output extension computations producing an extra value integral to the computation producing the original output.

2.4.7. Interlock OEs and RPEs Must Be Contextual. When we create interlocks using integral (§2.4.5), obscure (§2.4.6) output extensions and essential (§2.4.4), obscure (§2.4.6) RPE s, we should avoid a further possible point of attack.

If the code in such output extensions and RPE s is obviously distinct from the original code which surrounds it because different forms of computation, or unusual computational patterns, are employed in them, then such code is effectively marked for easy discovery by an attacker, in somewhat the same fashion that the vapor trail of a jet fighter advertises the presence of that aircraft—certainly not a desirable thing to do.

Therefore, it is important to choose methods of integrating and obscuring computations, and of rendering computations essential, which are contextual: that is, they must be chosen to resemble the computations which would otherwise occur in the context of such code sites if the interlocks were not added.

Suppose we want to hide a purple duck in a flock of white ducks. Three exemplary ways to make a purple duck resemble the white ducks making up the remainder of its flock are: (1) color the purple duck white; (2) color the white ducks purple; or (3) color all of the ducks green.

Analogously, when we obscure, integrate, or render essential, the output extensions and RPEs we introduce to create interlocks, we can make the resulting code less distinctive in three ways: (1) by choosing modifications which produce code patterns which look very much like the surrounding code; (2) by modifying other code to resemble the injected output extension or RPE code (e.g., if surrounding code is also obscured using similar techniques, then obscured output extensions and RPEs will not stand out); or (3) by modifying both the code in the original context into which we inject the output extension or RPE code, and the injected output extension or RPE code, to have the same code pattern. That is, we can inject code resembling code in the context in which it is injected, or we can modify the code in the context of the injection to resemble the injection, or we can modify both the context and the injection into some pattern not inherent to either the context or the injections.

Either one, or a mixture, of the above three techniques must be employed to hide interlock output extensions and RPEs. Such hiding by making such output extensions and RPEs contextual is part of the preferred embodiment of the instant invention. Our preferred embodiment uses method (3); i.e., our preference is to cause the original code at a site and any injected code for an OE, aggregation, or RPE, resemble one another by making them similar to one another, using the methods described below.

2.4.8. Interlock IAs Must Be Obscure and Contextual. An intervening aggregation $R_{agg}:: A \times J \mapsto B \times K$ should not compromise the security of the interlock. This can be achieved in two ways.

We may define J=K and $R_{agg}=[R, id_J]$, so that the code for $R_{agg}$ is identical to the code for R (since the extra information produced by output extension is left completely unmodified). In that case, the encoded output extension (OE) F' produces extra information ignored by R', the encoding of $R_{agg}$, and subsequently used, unmodified, by the encoded RPE G'.

This is often sufficient, and introduces no extra overhead for R'.

Or, we may define $R_{agg}=[R, S]$ for nontrivial MF S:: J↦K, where we need not have J=K. In that case, once $R_{agg}$ is encoded as R', the extra functionality of S must be introduced in a fashion which is obscure (i.e., difficult to reverse engineer) and contextual (i.e., resembling its surrounding code).

This introduces extra overhead for the added functionality of S and its encoding, but increases the difficulty for the attacker of reverse-engineering and disabling the interlock.

2.5. BA Algebras and MBA Identities. Generation of obscure and tamper-resistant software requires the use of algebraic identities, as seen to varying extents in all of [2, 4, 5, 7, 8, 9, 17, 18, 19, 20, 23, 24, 27].

However, the unusually stringent requirements which interlocking requires—namely, the need for essential RPEs (§2.4.4), integral OEs (§2.4.5), obscure OEs, IAs, and RPEs (§2.4.6 and §2.4.8), and contextual OEs, IAs, and RPEs (§2.4.7 and §2.4.8)—requires a more powerful method than naively searching for identities over particular algebraic structures and collecting a list of such identities. Identities of substantial complexity will be required in very large numbers, well beyond what can be provided by use of any or all of the identities found in the above-cited documents, however useful those identities may be in the context of use indicated in those documents.

The first requirement, then, for the generation of effective interlocks is that the process of identity-generation be automated and capable of producing an effectively unlimited supply of identities.

The second requirement is the following. Since interlocks are targeted at tying together very specific parts of the code, without a need for modifying large portions of a containing program, it is essential that use of the identities must generate code which is difficult to analyze. MBA expressions, which combine two very different algebraic structures, are ideal in this regard, because they are (1) compact in representation, since they are directly supported by hardware instructions provided on virtually all modern general-purpose binary digital computers, rather than requiring expansion into more elementary expressions or calls to a routine library, and (2) difficult to analyze using symbolic mathematics tools such as Mathematica™, Matlab™, or Maple™, due to the combination of two profoundly different domains (integer computer arithmetic modulo the machine-word modulus, typically $2^{32}$ or $2^{64}$, and the Boolean algebra of bitwise operations on Boolean vectors, typically 32 or 64 bits long).

In part, the reason that such expressions are hard to analyze is that simple expressions in one of the two algebraic structures become complex expressions in the other of the two algebraic structures. The table on page 4 of [20] shows that the form of an expression becomes considerably more complex for a $Z/(2^n)$ encoding of simple operations over $(B^n, \wedge, \vee, \neg)$. A consideration of the formula for the $Z/(2^n)$ "·" (multiply) operation in terms of elementary Boolean operations of $(B, \wedge, \vee, \neg)$ shows that what is elementary in $Z/(2^n)$ becomes highly complex in $(B, \wedge, \vee, \neg)$ and cannot be much further simplified by using $(B^n, \wedge, \vee, \neg)$ instead. The above-mentioned symbolic analysis packages deal with the usual case of a single domain quite well, but are not adequate to deobfuscate MBA expressions over BA[n] (i.e., to simplify expressions obfuscated using MBA expression identities into their original, unobfuscated forms).

We will now teach methods for obtaining an effectively unlimited supply of MBA identities. Aside from the many other benefits of such identities, they provide a powerful source for static diversity (see §2.4.3) when we vary the selections among such identities randomly among generated instances of SBEs.

2.5.1. Converting Bitwise Expressions to Linear MBAs. Suppose we have a bitwise expression—an expression E over $(B^n, \wedge, \vee, \neg)$—using t variables $x_0, x_1, \ldots, x_{t-1}$. (For the truth table shown in Table C, t=3 and variables $x_0, x_1, x_2$ are just variables x,y,z.) Then the truth table for any bit-position within the vectors is a truth table for the same expression, but taking $x_0, \ldots, x_{t-1}$ to be vectors of length one, since in bitwise operations, the bits are independent: the same truth table applies independently at each bit position, so we only need a truth table for single-bit variables. The truth table has $2^t$ distinct entries in its Conjunction column, $2^t$ distinct entries in its Binary column, and $2^t$ corresponding result-bits in its Results column (see Table C for an example). We can identify this column of result-bits with a $2^t \times 1$ matrix (a matrix with $2^t$ rows and 1 column; i.e., a column vector of length $2^t$).

We now provide a rather bizarre method, based on the peculiarities of computer arithmetic (i.e., based on the properties of BA[n] where n is the computer word size) for generating an alternative representation of bitwise expression E as an mba expression of the variables $x_0, \ldots, x_{t-1}$ over BA[n].

(1) Summarize E by a column vector P of $2^t$ entries (that is, a $2^t \times 1$ matrix) representing the contents of the Results column of E's truth table, and also by a column vector $S=[s_0, s_1, \ldots, s_{2^t-1}]^T$, where S stands for symbolic since it contains the symbolic expressions $s_0, s_1, \ldots, s_{2^t-1}$, and column vector S is precisely the contents of the Conjunction column of E's truth table.

(2) Obtain an arbitrary $2^t \times 2^t$ matrix A with entries chosen from B={0,1} which is invertible over the field Z/(2). (For example, generate zero-one matrices randomly until one is obtained which is invertible.)

(3) If there is any column C of A for which C=P, add a randomly-selected linear combination of the other columns of A (with at least one nonzero coefficient) to column C to obtain a new invertible matrix A in which column C≠P. We now have an invertible matrix A with no column equal to P.

(4) Since A is invertible over Z/(2), A is invertible over Z/($2^n$) (with the 'word length' of the elements increased as previously described in §2.3.2 under the sub-heading Presence and Absence of Multiplicative Inverses and Inverse Matrices). Therefore the matrix equation AV=P has a unique solution over Z/($2^n$) which can be found using Gaussian elimination or the like. Solve AV=P for V, obtaining a column vector of $2^t$ constants U over Z/($2^n$), where the solution is V=U and $U=[u_0, u_1, \ldots, u_{2^t-1}]^T$, say.

(5) Then, over BA[n], we have $$E = \sum_{i=0}^{2^t-1} u_i s_i,$$

so that we may substitute the MBA-expression sum on the right for the bitwise expression E on the left. Hence for any sequence of bitwise instructions computing E on a machine with word-length n, we may substitute a mixed sequence of bitwise and arithmetic instructions computing $$\sum_{i=0}^{2^t-1} u_i s_i.$$

(6) We can optionally make many additional derivations as follows.

From the equation of (5) in the foregoing paragraph, we may derive many other identities by the usual algebraic methods such as changing the sign of a term and moving it to the opposite side, or any other such method well-known in the art. Note also that if we derive, for any such sum, that $$E - \sum_{i=0}^{2^t-1} u_i s_i = 0$$

over BA[n], then if we derive a series of such sums, for the same or different sets of variables, then since the sums are equal to zero, so is the sum of any number of those independently derived sums.

This further leads to the conclusion that multiplying all of the coefficients (where E's coefficient is one and the remaining coefficients are the $u_i$'s) by a constant yields another zero sum, from which yet further valid identities can easily be derived.

For example, suppose $E = x \vee y$ so that t=2. E's truth table is $P=[0111]^T$; i.e., $x \vee y=0$ only for the case x=0, y=0. Let us take the word-length to be n=32 (which the algorithm largely ignores: the machine word-length plays almost no role in it).

A may be an arbitrary invertible matrix over Z/(2) with no column equal to P, so to keep the example simple, we choose $$A = \begin{bmatrix} 1 & 0 & 0 & 0 \\ 0 & 1 & 0 & 0 \\ 0 & 0 & 1 & 0 \\ 0 & 0 & 0 & 1 \end{bmatrix};$$

i.e., the 4×4 identity matrix over Z/(2). Taking A's elements as 32-bit binary numbers over Z/($2^{32}$), the equation AV=P has a unique solution U over Z/($2^{32}$), and since A is the identity matrix, the solution happens to be $U=[0111]^T$; i.e., in this very simple case, U=P.

We have $S=[\bar{x} \wedge \bar{y} \; \bar{x} \wedge y \; x \wedge \bar{y} \; x \wedge y]^T$, so over BA[32], we have $$E = x \vee y = \sum_{i=0}^{3} u_i s_i = (\bar{x} \wedge y) + (x \wedge \bar{y}) + (x \wedge y).$$

Therefore, for an instruction sequence (normally a single instruction) computing $x \vee y$, we may freely substitute an instruction sequence computing $(\bar{x} \wedge y) + (x \wedge \bar{y}) + (x \wedge y)$.

2.5.2. Deriving MBA Identities from Linearly Dependent Truth-Tables. In §2.5.1 above, for a bitwise expression E of t variables, we used a corresponding truth-table bit-vector P of length $2^t$.

Now suppose for a given set $X=\{x_0, x_1, \ldots, x_{t-1}\}$ of variables we have a series bitwise expressions $e_1, \ldots, e_k$, all employing the same set X of t variables, so that $e_i$ has truth-table zero-one vector $P_i$ for $i=1, \ldots, k$, and further suppose that $\{P_1, \ldots, P_k\}$ is a linearly dependent set of vectors over Z/($2^n$) for some k∈N; i.e., that there are coefficients $a_1, \ldots, a_k$ over Z/($2^n$):-not all of the coefficients are zero and $$\sum_{i=1}^{k} a_i P_i = [0 \; 0 \; \ldots \; 0]^T$$

over Z/($2^n$).

Then we also have $$\sum_{i=1}^{k} a_i e_i = 0$$

over BA[n]. From this equation, we may derive many other identities by the usual algebraic methods such as changing the sign of a term and moving it to the opposite side, or any other such method well-known in the art. Note also that if we derive, for any such sum, that $$\sum_{i=1}^{k} a_i e_i = 0$$

over BA[n], then if we derive a series of such sums, for the same or different sets of variables, then since the sums are equal to zero, so is the sum of any number of those independently derived sums.

This further leads to the conclusion that multiplying all of the $a_i$'s by a constant yields another zero sum; i.e., for any constant c in BA[n], if we have $$\sum_{i=1}^{k} a_i e_i = 0,$$

we also have $$c\sum_{i=1}^{k} a_i e_i = \sum_{i=1}^{k} (ca_i) e_i = 0,$$

so by means of multiplying all coefficients by a scalar, we can yet further extend the above derivations for identities.

As an example, consider the expressions $e_1 = x$, $e_2 = y$, $e_3 = x \vee y$, $e_4 = \neg(x \wedge y)$, $e_5 = \vec{1}$ where $\vec{1}$ denotes a constant in which every bit-position is a 1 (a constant expression, which could be expressed in C, C++, or Java™ as −1 or ~0). Their corresponding truth tables are, respectively, $P_1 = [0011]^T$, $P_2 = [0101]^T$, $P_3 = [0111]^T$, $P_4 = [1110]^T$, and $P_5 = [1111]^T$, k=5 is the number of expressions, and there are t=2 variables in these expressions so that the truth-table vectors have length $2^t = 4$.

If we choose coefficients $(a_1, \ldots, a_5) = (1, 1, -1, 1, -1)$, we find that $$\sum_{i=1}^{5} a_i P_i = P_1 + P_2 - P_3 + P_4 - P_5 = [0 \ 0 \ \ldots \ 0]^T,$$

so that $P_1, \ldots, P_5$ are linearly dependent.

Thus we derive that, over *BA*[*n*], $$\sum_{i=1}^{5} a_i e_i = x + y - (x \vee y) + (\neg(x \wedge y)) - \vec{1} = 0,$$

i.e., that $$x + y - (x \vee y) + (\neg(x \wedge y)) + 1 = 0,$$

since $\vec{1}$ is equivalent to −1 under a signed 2's complement interpretation. With trivial algebraic manipulation, we then easily derive, for example, that
$(x \vee y) - x - y - (\neg(x \wedge y)) = 1$, so that we may freely substitute a code sequence computing the left side expression above for a use of the constant 1. Or we can multiply any integral value by the left side expression above without changing it, no matter what the values of x and y are.

2.5.3. BA[n] 2's Complement and Unsigned Comparative Properties. Certain properties applying to 2's complement arithmetic and comparisons on signed and unsigned quantities with representation as elements of $B^n$ in the algebraic structure BA[n] of computer arithmetic on n-bit words are crucial for generating effective interlocks. We list them here.

(1) $-x = \bar{x} + 1$ (so that $\bar{x} = -x - 1$).

(2) 1 x=0 iff $(-(x \vee (-x))-1) < 0$ (using signed comparison). This converts a test on all the bits to a test which only needs the high-order bit in 2's complement computation.

Since, in BA[n], there is only one zero, whether we treat its elements as signed or unsigned, the above formula applies whether or not we are interpreting x itself as signed. (We can generally force signed computation; e.g., in C or C++ we can cast an unsigned quantity x into signed form. At the machine code level, operands have no types, and we can force signed computation by the choice of instructions used.)

Once we isolate the Boolean result in a single bit of the computed result r, we can easily manipulate it in other ways. e.g., r>>(n−1), where ">>" is the right-shift operator as in C or C++, replicates the Boolean result into all n bits of a word if the shift is signed and converts it to the value 1 for true or 0 for false, if the shift is unsigned.

Since $x \neq 0$ iff (x=0) is false, the above properties can be used to convert = and ≠ comparisons over BA[n] into any desired representation of their Boolean results.

Typically, we would choose either the representation true=00 . . . 01 and false=00 . . . 00 (where the Boolean value is in the low-order bit and the other bits are zero), or the representation true=11 . . . 11 and false=00 . . . 00 (where the Boolean value is represented in all of the bits).

Let us call the former the one-bit Boolean representation, and the latter the all-bit Boolean representation.

(3) 2 x=y (signed or unsigned) iff x−y=0—the difference can be tested using the identity of (2) above.

When x=y, then $x \vee y = x \wedge y = x = y$, $x - y = x \oplus y = 0$, $x \vee \bar{y} = x \oplus \bar{y} = \vec{1}$ (signed or unsigned)=−1 (signed), $x \vee \bar{y} + 1 = x \oplus \bar{y} + 1 = 0$ (signed or unsigned), $x \vee \bar{y} + 2 = x \oplus \bar{y} + 2 = 1$ (signed or unsigned), and similarly, for any k, $x \vee \bar{y} + k = x \oplus \bar{y} + k = k - 1$ (signed or unsigned).

(Many other such identities involving x and y are easily derived by simple algebraic manipulation, or by combination with the identities disclosed or quoted in §2.5.3 or those found by the methods given in §2.5.1 and §2.5.2, or disclosed in [2, 4, 5, 20], or found in the extension of [20] given in §2.7.7, or described below in §2.5.4, all evident to those skilled in the art of such derivations.)

(4) 3 From Hacker's Delight [28]: x<y (signed) iff $((x \wedge \bar{y}) \vee ((\neg(x \oplus y)) \wedge (x-y))) < 0$ (signed). As above, this isolates the Boolean 1 (true) or 0 (false) outcome in the high-order bit of the result of the right-side computation $(x \vee \bar{y}) \wedge ((\neg(x \oplus y)) \wedge (x-y))$ (call it r), from whence we can convert it into any desired Boolean representation. In addition, y>x (signed) iff x<y (signed),
x≧y (signed) iff x<y (signed) is false, and
y≦x (signed) iff x≧y (signed), so the above formula permits us to convert the full range of signed inequality operations over BA[n] into any desired representation of their Boolean results, as noted in (2) above.

(5) 4 From Hacker's Delight [28]: x<y (unsigned) iff $((\bar{x} \wedge y) \vee ((\bar{x} \vee y) \wedge (x-y))) < 0$ (signed). As above, this isolates the Boolean 1 (true) or 0 (false) outcome in the high-order bit of the result of the right-side computation $$(\bar{x} \vee y) \wedge ((\bar{x} \vee y) \wedge (x-y))$$

(call it r), from whence we can convert it into any desired Boolean representation. In addition, y>x (unsigned) iff x<y (unsigned),
x≧y (unsigned) iff x<y (unsigned) is false, and
y≦x (unsigned) iff x≧y (unsigned), so the above formula permits us to convert the full range of unsigned inequality operations over BA[n] into any desired representation of their Boolean results, as noted in (2) above.

2.5.4. Combining Boolean Conditions. As noted in §2.5.3 above, we can obtain the results of individual comparisons in Boolean form within BA[n], with false represented by a sequence of n 0-bits, and with true represented by either a sequence of n−1 0-bits followed by a single 1-bit (the one-bit Boolean representation) or by a sequence of n 1-bits (the all-bit Boolean representation).

We can convert the one-bit representation to the all-bits representation by signed arithmetic negation (since the 2's complement representations of 0 and −1 are 00 . . . 00 and 11 . . . 11, respectively), and we can convert the all-bits representation to the one-bit representation by unsigned right-shifting the value n−1 positions, where n is the word size.

TABLE E

Computing With Boolean Representations

| Logical Operator | One-Bit Representation | All-Bits Representation |
|---|---|---|
| ∧ (and) | bitwise ∧ | bitwise ∧ |
| ∨ (inclusive or) | bitwise ∨ | bitwise ∨ |
| ⊕ (exclusive or) | bitwise ⊕ | bitwise ⊕ |
| ¬ (not) | bitwise 0 . . . 01 ⊕ | bitwise ¬ |

We can combine such Boolean values to produce new Boolean values in the same representation, as shown in Table E above. Note that, except for one special case, the BA[n] representation of a logical operation is the corresponding bitwise operation. The single exception is that, in the one-bit Boolean representation, we compute $\bar{x} = \neg x$ as 00 . . . 01⊕x, which only inverts the low-order bit.

2.5.5. Finding Multiplicative Inverses in $Z/(2^n)$ and $GF(2^n)$. We often need to find the multiplicative inverse of an element of $Z/(2^n)$ or $GF(2^n)$ in order to build matrices, linear identities, encodings, and obfuscations, according to [17, 18, 20], and the like.

This can be done efficiently for a number in $Z/(2^n)$ in $O((\log n)^2)$ steps using a small, efficient algorithm: the extended Euclidean algorithm [10, 22].

Representing the function computed by this algorithm as E, we have, for a,b∈N with a≧b, that E(a,b)=(x,y,d) where d is the greatest common divisor of a and b and ax+by=d in ordinary integer arithmetic (rather than over some finite ring or other finite algebraic structure).

Therefore, to find the multiplicative inverse of some odd number b in $Z/(2^n)$, we compute $E(2^n,b)=(x,b^{-1},1)$. We ignore x. $b^{-1}$ is the desired multiplicative inverse of b in $Z/(2^n)$.

Of course, once we have $b^{-1}$, we know $b^{-k}$ for k>1 because $b^{-k}=(b^{-1})^k$.

Similarly, for an element of $GF(2^n)$, we can efficiently find a multiplicative inverse of an element of $GF(2^n)$ using the polynomial version of the extended Euclidean algorithm [11], whose computations are performed in the infinite ring of polynomials over GF(2) rather than in $GF(2^n)$, which finds an inverse in $O(n^2)$ steps. Representing the function computed by this algorithm as E', we have, for elements a,b∈$GF(2^n)$, with the degree of b greater than that of b, that E'(a,b)=(x,y,d) where d is the greatest common divisor of a and b and ax+by=d over $GF(2^n)$, where a,b,x,y,d are polynomials in $GF(2^n)$.

Then letting I be the irreducible polynomial over GF(2) used in the chosen representation of $GF(2^n)$, if b is the polynomial 1, its inverse is itself. Otherwise, b is a polynomial of degree one or more, and to find its inverse, we compute $E'(I,b)=(x,b^{-1},1)$. We discard x. $b^{-1}$ is the desired multiplicative inverse.

Of course, once we have $b^{-1}$, we know $b^{-k}$ for k>1 because $b^{-k}=(b^{-1})^k$, where the exponentiation is performed in $GF(2^n)$.

2.5.6. Generality of MBAs. Any expression built up from integer-valued variables by using integer addition, subtraction, multiplication, and exponentiation can be converted into an MBA expression.

This follows immediately from the fact that any variable can be represented as an additive equivalent; i.e., any value v can be represented as a sum of values $v_1 + \ldots + v_k$ for some choice of $v_1, \ldots, v_k$. Indeed, if we fix all but $v_i$ in the list $v_1, \ldots, v_k$, we can still produce the desired sum v by appropriately choosing the unfixed $v_i$ of $v_1, \ldots, v_k$, where k≧2.

Thus we can readily substitute MBA expressions for any of, or all of, the above-mentioned fixed values $v_1, \ldots, v_{i-1}, v_{i+1}, \ldots, v_k$, converting the variable into an MBA expression of its additive equivalent $v_1, \ldots, v_k$.

Then for an arbitrary expression of n≧1 variables a,b, . . . ,v, . . . ,z, built up from those variables by using addition, subtraction, multiplication, and exponentiation, by substituting the additive partitions of the variables for the original variables in the expression, we obtain an MBA expression whose value is the same as the original expression.

In addition to the above method, we can of course opportunistically substitute subexpressions by employing the unlimited supply of MBA identities generated according to the methods taught in §2.5.1 and §2.5.2. The combination of these methods provides a powerful method for converting arbitrary algebraic expressions of variables into MBA expressions.

2.6. Hiding Static and Dynamic Constant Values. A constant value may be a static constant (one having a value fixed at the time when the software employing it is compiled) or a dynamic (i.e., relative or temporary) constant (one which is not available when the software using it is compiled, but is not changed after it is first computed in the scope of the computational values it is intended to support, so that it is 'relatively constant', 'temporarily constant' or 'constant over a dynamically occurring temporary interval of time'). An example of a dynamic/relative/temporary constant might be a randomly chosen cryptographic session key, which is used for a particular set of communications over a limited period of time. Use of such session keys is typical in connection with public key cryptography, because public key cipher systems such as the RSA public key cryptosystem, or an elliptic curve public key cryptosystem, encrypt and decrypt slowly compared to symmetric key ciphers such as AES. Hence RSA is used to establish a session key, and then the session key is used to handle the rest of the information transfer occurring during the session.

We first consider the method of hiding static and dynamic constants in its most general form, and then relate that form to methods of obfuscation and tamper-proofing included by reference and their extensions disclosed herein, and to further methods of obfuscation and tamper-proofing disclosed herein. Finally, we consider a method in which the constants used in hiding constants are themselves dynamic constants, so that different executions of the same program, or successive executions of the same part of a program making use of transitory hidden constants, vary dynamically among one another.

The General Method. Suppose we have a system of equations (not necessarily linear) of the form $$y_1 = f_1(x_1, x_2, \ldots, x_m)$$
$$y_2 = f_2(x_1, x_2, \ldots, x_m)$$
$$\vdots$$
$$y_n = f_n(x_1, x_2, \ldots, x_m),$$

or equivalently, with $x=(x_1, \ldots, x_m)$, $y=(y_1, \ldots, y_n)$, and $f=\langle f_1, \ldots, f_n \rangle$, we have $y=f(x)$, where $f$ is an n×m vector function over BA[n] (typically, over BA[32] or BA[64]). Suppose that $f$ is efficiently computable on an ordinary digital computer.

If there is a specific index i, where $1 \leq i \geq m$, and a function g for which $x_i=g(y)=g(y_1, \ldots, y_n)$, where g is also efficiently computable on an ordinary digital computer, then we can use f as a means for hiding the static or dynamic constant $c=x_i$.

Our method is to choose constants—possibly dynamic/relative/temporary—, where $c=x_i$ is the constant to be hidden. Where feasible, we perform constant folding on the computations in $f$—a form of PE (see §2.3.3)—which causes the distinguished constant $c=x_i$, and the obfuscating constants $x_1, \ldots, x_{i-1}, x_{i+1}, \ldots, x_m$, to be replaced by a combination of computations and new constants. When we have need for c, instead of fetching c, we replace a fetch of c by a computation of $g(y)=g(y_1, \ldots, y_n)$.

Of course, when hiding a dynamic constant, little constant folding occurs because many subexpressions will have values unknown at the time when the constants are being hidden, so that the relationship among vector x, the dynamic constant y, function conglomeration $f$, and function g, is partly symbolic until runtime, which means that the formulas installed in the running program involve employing the actual dynamic values, provided to the computation by variables, rather than by static constants.

Protecting Code in the Neighborhood of Access to Hidden Constant. To complete the process, we then encode the code which uses the constant, and in the immediate vicinity of that code, by the methods of [2, 4, 5, 9, 17, 18, 19, 20], or the extensions of those methods provided herein (see §2.7 and §2.8), or by using the identities found using the methods of §2.5.1 or §2.5.2, or the identities disclosed or quoted in §2.5.3, or disclosed in §2.5.4, or by employing the methods of [20] extended with the new nonlinear forms of encoding described in §2.7.7, or by any combination of the above.

By means of the among-SBE-instances random variations among chosen identities taught at the end of the introduction of §2.5.1, we may add static diversity to such protections.

A Simple Example. If m=n and $y=f(x)$ is defined by an affine matrix-based function $y=Mx+d$ where M is an n×n matrix over $Z/(2^k)$, y is a column vector, x is a column vector, and d is a constant displacement column vector, and if M is invertible (i.e., has an odd determinant), then we can determine, for any choice of $x_1, \ldots, x_n$, a formula for any i in the range $1 \leq i \leq n$, by means of which we can determine x from y. Therefore, by eliminating any unneeded computations, we can derive a function $c=x_i=g(y_1, \ldots, y_n)$ which includes only those computations needed to find $c=x_i$, omitting any computations needed only to find $x_1, \ldots, x_{i-1}, x_{i+1}, \ldots, x_n$, by deriving g from the larger computation of the inverse function defined by $x=M^{-1}y-M^{-1}d$, which is itself an affine matrix-based function of the same form as the original function, but with a different matrix, $M^{-1}$, and a different constant displacement column vector, $-M^{-1}d$.

Many other kinds of n×m vector functions $f$ and constant extraction functions g can be found by using the identities disclosed in [2, 4, 5, 20], or disclosed or quoted in §2.5.3 or disclosed in §2.5.4, or identities found using the methods of §2.5.1 or §2.5.2, or identities found by applying the inverses provided by the mappings in [20] or their extension by means of the additional nonlinear mappings in §2.7.7, or by any combination of the above, as would be evident to persons versed in the art of algebraic manipulation. Only straightforward derivations, readily performed by beginning college-level students of modular integer rings, and therefore readily automatable as manipulations performed by computer programs, need be considered—this provides a huge variety of choices, more than sufficient to provide adequate obfuscation. N.B.: The mathematical domain of $f=\langle f_1, \ldots, f_n \rangle$ and of g is irrelevant to the intended mathematical domain of the constant c to be extracted by g. As an example, the matrix method given above could employ a matrix over the infinite ring of the integers, and nevertheless return a value interpreted as a bit-string representing a polynomial over GF(2), with the bits of the constant representing the coefficients of the polynomial. N.B.: Constant values of any size can be accommodated by generating the constants in segments, where each segment has a size convenient for the target platform of the software to be protected. For example, a matrix constant can be generated by using the above method separately, once per matrix element.

Greater Sophistication and Higher Security. In A Simple Example above, the functions $f$ and g are affine over $Z/(2^k)$. We note that a solution g of a system of equations given by $f$ is trivially found (by ignoring outputs) from $f^{-1}$, as would be obvious to those versed in college algebra.

Thus we may employ a deeply nonlinear function $f$ constructed according to the method disclosed in The Solution: Use Wide-Input Deeply Nonlinear Functions below construct both $f$ and an $f^{-1}$ derived according to the method disclosed in Inverting the Constructed Deeply Nonlinear Function; below; given $f^{-1}$, g is then found by ignoring some of $f^{-1}$'s outputs.

When this approach is used, we may wish to employ an $f$, and hence an $f^{-1}$ and a g, with encoded input and output elements. If so, we recommend that they be encoded employing the approach proposed in An Alternative to Substitution Boxes below.

Adding Dynamic Randomness. The constants $x=(x_1, \ldots, x_m)$ of The General Method can be dynamic constants. That means that the solution function g for retrieving $c=x_i$ given $y=(y_1, \ldots, y_n)$ will use symbolic, general solutions which are applied in a concrete, specific case by substituting the concrete values of $x_1, \ldots, x_{i-1}, x_{i+1}, \ldots, x_n$ for the variables holding those dynamic constants. As a result, constant folding will achieve less optimization. However, the method remains valid.

To obtain the dynamic constants $x_1, \ldots, x_{i-1}, x_{i+1}, \ldots, x_n$, we employ the method disclosed in §2.10.7, thereby adding dynamic diversity (see §2.4.3).

2.7. Methods and Systems Incorporated by Reference and Extended Herein. We hereby incorporate by reference in this application the methods and systems [all assigned to the same assignee as the subject application, Cloakware Corporation, Ottawa, Canada, as of Jul. 18, 2006] of U.S. Pat. No. 6,594, 761 [2], U.S. Pat. No. 6,779,114 [3], U.S. Pat. No. 6,842,862 [4], US Patent publication no. 2004/0236955 A1 (application Ser. No. 10/478,678) [5], US Patent publication no. 2003/ 0163718 A1 (application Ser. No. 10/257,333) [16], US Patent publication nos. 2004/0139340 A1 (application Ser. No. 10/433,966) [17] and 2006/0140401 A1 (application Ser. No. 11/020,313) [18], and US Patent publication no. 2005/ 0166191 A1 (application Ser. No. 11/039,817) [20], in their entirety.

For use in interlocking, we recommend fortifying the methods and systems of the above, since the focused, targeted usages of these methods in interlocking require a maximum of protective power. Accordingly, we disclose below methods for strengthening the above-included methods and systems.

Among other things, we employ the above forms of protection, and their extensions taught below, in establishing the required properties of obscurity and contextuality in interlock components, as taught in §2.9.2.

The methods and systems of [2, 3, 4, 5, 16, 17, 18, 20] all depend on provided entropy (effectively random information input seeding a stream of pseudo-random values on which encoding and protection decisions made in applying these methods and systems are based). Hence they all provide high degrees of static diversity: each new use of these methods and systems normally produces distinct results, thereby making the attacker's job more difficult since the attacks on instances of a given original unprotected SBE modified into a protected SBE using the above methods and systems must vary on a per-generated-instance basis.

In addition, wherever the extensions taught in the following subsections employ MBA identities discoverable by the means taught in §2.5, we can add static diversity to their protections by variations in the identities employed among SBE instances, as noted at the end of the introduction of §2.5.

2.7.1. Adding New Encodings to U.S. Pat. Nos. 6,594,761 and 6,842,862. U.S. Pat. No. 6,594,761 [2] contemplates data encodings of many different kinds including one-dimensional (one scalar variable at a time) and multi-dimensional (more than one variable at a time) linear and polynomial encodings over the integer ring or approximated over the floating point numbers, residue encodings based on the modular decomposition of integers according to the Chinese remainder theorem, bit-exploded encodings, and table-lookup encodings. U.S. divisional Pat. No. 6,842,862 [4] and U.S. patent application Ser. No. 10/478,678 [5] add to these encodings in which one variable's encoding depends on another's, or in which several variables are encoded so that the representation of each varies with the representation of the others, and the organization of many such encodings into related systems of equations in order to coordinate the encodings of many different pieces of data, thereby inducing aggressive fragility under tampering attacks. In general, the combination of these patents and applications provides a system by means of which we can take much of the computation in a program, and, with respect to FIG. 1, restricting all of d,$d^{-1}$,c,$c^{-1}$,R,R' to be functions, we replace plain computations over a region of a program with encoded ones such that each datum is encoded, whether stored, consumed as an input, or produced as an output, and computations are also encoded, computing from encoded inputs to encoded outputs without ever producing a plain value at any point, excepting only the boundary of the region, where data entering the boundary are consumed in plain form and plain results are produced. That is, everywhere within a region except at its periphery, computation corresponds to the bottom line of FIG. 1, where only encoded data and values are visible to the attacker. Moreover, due to the coordinated systems of encoding disclosed in [4], such computations are interdependent and aggressively fragile under tampering, so that any goal-directed purpose motivating an attacker to tamper with the software so protected is most unlikely to be achieved.

The residue, bit-exploded, bit-imploded, custom-base, and bit-tabulated encodings of [2] and [4] can have significant overheads. By adding encodings based on the finite ring $Z/(2^n)$, where n is the target computer word size in bits, we can reduce the overhead and strengthen the security by employing the linear ring encodings of [20] and their polynomial extension to quadratic, cubic, and quartic polynomials with quadratic, cubic, and quartic polynomial inverses, as disclosed herein in §2.7.7.

Moreover, we can further strengthen the existing encodings of patents [2] and [4] by pre- and/or post-modifying the encodings employing substitutions according to the identities disclosed or quoted herein in §2.5.3, or disclosed in §2.5.4, or discovered by employing the methods given herein in §2.5.1 and §2.5.2, thereby rendering these encodings incapable of analysis using tools such as Mathematica™, Matlab™, or Maple™, due to the simultaneous use of multiple, profoundly different mathematical domains within computations.

2.7.2. Adding New Cell and Address Codings to Ser. No. 10/257,333. The method of U.S. patent application Ser. No. 10/257,333 [16], which describes a method and system for the protection of mass data (arrays, I/O buffers and message buffers, sizable data structures, and the like), requires the use memory divided into cells, where the cells are addressed by transformed cell numbers rather than the indices or offsets which would have been used to access the data prior to encoding according to [16], and requires that data be fetched from, and stored into, the cells in a transformed form.

As a result, it makes considerable use of transformations. One of the kinds of transformations suggested in [16] is the point-wise linear partitioned bijection (PLPB) described therein. We note that the encoding of [20] is a special case of a high-speed, compactly implementable PLPB. ([20] discloses much additional inventive material, such as methods for employing such encodings without any use of the auxiliary tables contemplated for PLPBs in [16].)

To maximize the protection afforded by the methods of [16], we therefore recommend their augmentation by the use of the encodings of [20], as extended herein in §2.7.7, for use as the encodings of some or all of the cells and addresses contemplated in [16]. We further recommend that some or all of the fetches from cells, stores into cells, and re-codings of data contemplated by [16] be further protected by applying identities disclosed or quoted in §2.5.3, those disclosed in §2.5.4, or discovered by the means disclosed in §2.5.1, in §2.5.2, and in §2.5.4, to render it impossible for automated algebraic analysis tools not to penetrate such encodings efficiently.

2.7.3. Protecting Dispatch Constants and Tables in U.S. Pat. No. 6,779,114. A method and system are disclosed in U.S. Pat. No. 6,779,114 [3] whereby the control flow of a program may be restructured into a form in which local transfers of control are realized by means of multi-way branches with indexed control (as in the switch statement of FIG. 4(b). Indexed control is performed by data values, and the information needed to store all the requisite data values is stored in a master table, or split into multiple tables, as disclosed in [3] column 32, starting at line 15.

This table, or these tables, will be far more secure if both their contents and the indices used to address them are encoded. We recommend the employment of the mass data methods of [16] for this purpose, with each cell being a table element, with the addition of the proposed extensions to [16] disclosed above in §2.7.2 to render such encodings profoundly difficult to analyze by the employment of algebraic analysis tools. Alternatively, the tables can employ the array protections of [9] with the improvements disclosed herein in §2.8.1, or, if the program to be protected is rich in looping—express or implied—the array protections of [27].

Moreover, software code protected according to the method and system of [3] makes considerable use of constants in dispatching. Such constants, as they appear subsequent to encoding, can be hidden by means of the method disclosed herein in §2.6, further protecting the software against deobfuscation or effective tampering by an attacker.

Finally, determination of dispatch constants used in branching via dispatch tables will often be conditional due to conditional branches in the original program. These conditions should be computed using code on which have been performed the kinds of substitutions disclosed or quoted in §2.5.3, or disclosed in §2.5.4, or those discovered by the methods disclosed in §2.5.1 or §2.5.2, or those disclosed in [2, 4, 5, 20] or in the extension of [20] given in §2.7.7, and preferably by a combination of some or all of these. Alternatively, the conditions may be rendered opaque using the opaque predicate method of [9] with the improvements thereto disclosed herein in §2.8.1.

The above techniques can be yet further strengthened by performing condition-dependent interlocking (as disclosed in §2.10.4) to protect branches prior to applying U.S. Pat. No. 6,779,114 [3] together with the improvements listed above.

It would be virtually impossible for the form of attack described in [25] to succeed against software protected according to U.S. Pat. No. 6,779,114 [3] with the improvements and additional protections which we just disclosed above, since the critical assumptions on which this attack is based fail for software so protected.

2.7.4. Reducing Overhead in U.S. Pat. No. 6,779,114. In §2.7.3 we disclosed a method for increasing the security of the control-flow protection afforded by the method and system of U.S. Pat. No. 6,779,114 [3].

The overhead of [3], or of [3] extended according to §2.7.3, can be substantial, since a lump (see column 16, item 5 in [3]) generally contains at least two pieces (see column 16, item 4 in [3]), and each piece is typically included in more than one lump, in order to achieve the m-to-n mapping (with m>1 and n>1) of functionality to locations in the code. That is, each individual computation in the code to be protected typically appears two or more times in the modified code in which the protections of [3] have been applied.

Since we have a number of other means for providing control-flow protection, such as those disclosed in §2.10, in §2.10.5, and in §2.11.1, we may employ these and dispense with those protections in [3] or its extension in §2.7.3 which require code duplication. The effect of this is that each lump contains only one piece, which eliminates the need to group routines into 'very large routines' (VLRs) or to provide the code resulting from a lump with multiple entry points or multiple exit points to perform virtual register (VR) switching. Thus every piece is executed emulatively (i.e., to perform useful computation), in contrast to the normal behavior of code protected according to [3], in which some executions of a given occurrence of a piece in a given lump are emulative, while others are merely connective (i.e., carrying entropy around for randomization purposes, but not performing computations of the original program).

Of course, we retain the dispatch tables, but they are significantly smaller, and 1-dimensional instead of 2-dimensional, since they need merely address code on a per tag basis, rather than on a per tag-role-pair basis, where a tag identifies a particular lump in a dispatch table.

We can apply the above overhead-reductions to a small, medium, or large proportion of the code to be protected, or to all of the code to be protected.

2.7.5. Adding Deep Nonlinearity to Ser. Nos. 10/433,966 and 11/020,313. Methods for creating cryptographic building blocks which resist key-extraction, even when they are deployed in the white box attack context (that is, even where the attacker has full access to the execution of the application) are disclosed in U.S. patent application Ser. No. 10/433,966 [17] and Ser. No. 11/020,313 [18].

An Alternative to Substitution Boxes. [17] makes use of substitution boxes (SBs), i.e., lookup tables, for arbitrary encodings. We note that such tables can be large, and a valuable alternative for such encodings is to employ arbitrary choices among the encodings of [20] with the enhancements thereto disclosed in §2.7.7; i.e., instead of strictly random functions, employ permutation polynomials of orders 1 through 4 inclusive. For such functions, only the coefficients are needed rather than the entire tables, which may provide a very great space saving, and polynomials and their inverses according to the above methods are easily composed.

The Problem. These methods are valuable, but by themselves, they are subject to a certain published form of attack and its allies. For example, the AES-128 implementation described in [7], built using the methods of [17], has been penetrated using the attack in [1]. While this attack succeeded, the attack is quite complex, and would require significant human labor to apply to any particular software implementation, so even without modifications, the methods of [17] are quite useful. It would be extremely difficult to make the attack of [1] succeed against an attack on an implementation according to [17] fortified according to [18]. However, in connection with interlocks, we seek extremely strong protection, and so it behooves us to find ways to further bulwark the methods of [17, 18] in order to render attacks such as those in [1] entirely infeasible.

Much use is made in implementations according to [17, 18] of wide-input linear transformations (§4.0 in [17]) and the matrix blocking method described in §4.1 on pp. 9-10 (paragraphs [0195]-[0209] in [17]). It is true that the methods of [17] produce non-linear encoded implementations of such linear transformation matrices. However, the implementations are shallowly nonlinear. That is, such a matrix is converted into a network of substitution boxes (lookup tables) which necessarily have a limited number of elements due to space limitations. The nonlinear encodings (arbitrary 1-to-1 functions, themselves representable as substitution boxes; i.e., as lookup tables) on values used to index such boxes and on element values retrieved from such boxes are likewise restricted to limited ranges due to space limitations.

Thus any data transformation computed by an input-output-encoded implementation of such a blocked matrix representation, which is implemented as a network of substitution boxes, or a similar devices for representing essentially arbitrary random functions, is linear up to I/O encoding; that is, any such transformation can be converted to a linear function by individually recoding each input vector element and individually recoding each output vector element.

The attack method in [1] is a particular instance of a class of attacks based on homomorphic mapping. The attack takes advantage of the known properties of linear functions, in this case over $GF(2^8)$ since that is the algebraic basis of the computations in the AES. In particular, addition in $GF(2^n)$ is performed using bitwise $\oplus$ (exclusive or), and this function defines a Latin square of precisely known form. Thus it is possible to search for a homomorphism from an encoded table-lookup version of $\oplus$ to an unencoded one, and it is possible in the case of any function $f=Q \circ \oplus \circ Q^{-1}$ where $\oplus$ is bitwise, to find an approximate solution $\hat{Q}=Q \circ A$ for a particular affine A (i.e., an approximation $\hat{Q}$ which is within an affine mapping A of the real Q) with reasonable efficiency. These facts are exploited in the attack of [1], and there are other attacks which could similarly exploit the fact that the blocked matrix function implementations of [17, 18] are linear up to I/O encoding. While such attacks yield only partial information, they may narrow the search for exact information to the point where the remaining possibilities can be explored by exhaustive search. For example, a white-box implementation of encryption or decryption using the building blocks provided by [17, 18] may be vulnerable to key-extraction attacks such as that in [1], or related attacks based on homomorphic mapping.

The Solution: Use Wide-Input Deeply Nonlinear Functions. The solution is to replace such matrix functions with functions which are (1) wide-input; that is, the number of bits comprising a single input is large, so that the set of possible input values is extremely large, and (2) deeply nonlinear; that is, functions which cannot possibly be converted into linear functions by i/o encoding (i.e., by individually recoding individual inputs and individual outputs).

Making the inputs wide makes brute force inversion by tabulating the function over all inputs consume infeasibly vast amounts of memory, and deep nonlinearity prevents homomorphic mapping attacks such as that in [1].

For example, we could replace the MixColumns and Inv-MixColumns transformations in AES, which input and output 32-bit (4-byte) values, with deeply nonlinear MDS transforms which input and output 64-bit (8-byte) values, rendering brute-force inversion of either of these impossible. Call these variants $MixColumns_{64}$ and $InvMixColumns_{64}$. (Since encryption of a message is done at the sender and decryption at the recipient, these would not normally be present on the same network node, so an attacker normally has access only to one of them.).

Suppose, for example, that we want to construct such a deeply nonlinear vector-to-vector function over $GF(2^n)$ (where n is the polynomial—i.e., the bit-string—size for the implementation) or, respectively, over $Z/(2^n)$ (where n is the desired element width). Let $u+v=n$, where u and v are positive nonzero integers. Let G=our chosen representation of $GF(2^n)$ (respectively, of $Z/(2^n)$) $G_u$=our chosen representation of $GF(2^u)$ (respectively, of $Z/(2^u)$), and $G_v$=our chosen representation of $GF(2^v)$ (respectively, of $Z/(2^v)$).

Suppose we need to implement a deeply nonlinear function $f: G^p \mapsto G^q$, with $p \geq 3$ and $q \geq 2$; i.e., one mapping p-vectors to q-vectors over our chosen representation G of $GF(2^n)$.

If we wanted a linear function, we could construct one using a q×p matrix over G, and if we wanted one which was nonlinear, but linear up to i/o encoding, we could use a blocked encoded implementation of such a matrix according to [17, 18]. These methods do not suffice to obtain deep nonlinearity, however.

We note that elements of G, $G_u$, $G_v$ are all bit-strings (of lengths n,u,v, respectively). E.g., if n=8 and u=v=4, then elements of G are 8-bit bytes and elements of $G_u$ and $G_v$ are 4-bit nybbles (half-bytes).

We introduce operations $extract[r,s](\cdot)$ and $interleave(\cdot,\cdot)$ which are readily implementable on virtually any modern computer, as would be evident to those versed in code generation by compiler. For a bit-string $S=(b_0,b_1,\ldots,b_t)$, we define $extract[r,s](S)=(b_r,b_{r+1},\ldots,b_s)$;

i.e., $extract[r,s]$ returns bits r to s, inclusive. For a vector of bit-strings $V=(S_1,S_2,\ldots,S_z)$, we define $extract[r,s](V)=(extract[r,s](S_1),extract[r,s](S_2),\ldots,extract[r,s](S_z))$.

i.e., $extract[r,s]$ returns a new vector containing bits r to s, inclusive, of each of the old vector elements. For two vectors of bit-strings of the same length, say $V=(S_1,\ldots,S_z)$ and $W=(T_1,\ldots,T_z)$, we define $interleave(V,W)=(S_1\|T_1,S_2\|T_2,\ldots,S_z\|T_z)$;

i.e., each element of $interleave(V,W)$ is the concatenation of the corresponding element of V with the corresponding element of W.

To obtain our deeply nonlinear function $f: G^p \mapsto G^q$ above, we proceed as follows.

(1) 1 Select a linear function $L: G_u^p \mapsto G_u^q$, or equivalently, select a q×p matrix over $G_u$. (Since singular square sub-matrices can create vulnerabilities to homomorphic mapping, it is preferred that most square submatrices of the matrix representation of L be nonsingular. If L is MDS, no square sub-matrix of L is singular, so this preference is certainly satisfied.)

(2) Select $k \geq 2$ linear functions $R_i: G_v^p \mapsto G_v^q$, for $i=0,\ldots,k-1$, or equivalently, select $k \geq 2$ q×p matrices over $G_v$. (Since singular square submatrices can create vulnerabilities to homomorphic mapping, it is preferred that most square submatrices of the matrix representation of $R_0,\ldots,R_{k-1}$ be nonsingular. If $R_0,\ldots,R_{k-1}$ are MDS, no square sub-matrix of any $R_i$ is singular, so this preference is certainly satisfied.)

(3) Select a function $s: G_u^p \mapsto \{0,1,\ldots,k-1\}$ for which $s\{G_u^p\}=\{0,1,\ldots,k-1\}$ (i.e., choose an s that is 'onto' or 'surjective').

Other than the requirement that s be onto, we could choose s at random. However, even simple constructions suffice for obtaining s. As an example, we give our preferred construction for s, as follows.

If $k \leq u$, we choose a linear function $s_1: G_u^p \mapsto G_u$ (or equivalently, a 1×p matrix over $G_u$) and a function $s_2: G_u \mapsto \{0,1,\ldots,k-1\}$.

Similarly, if $u < k \leq 2u$, we can choose a linear function $s_1: G_u^p \mapsto G_u^2$ and a function $s_2: G_u^2 \mapsto \{0,1,\ldots,k-1\}$, and so on. Then let $s=s_2 \circ s_1$. In the preferred embodiment, k is 2, 4, 8, or some other power of two.

Suppose k=2. Then $s_2$ could return the low-order bit of the bit-string representation of an element of $G_u$; if k=4, $s_2$ could return the low-order 2 bits, and in general if $k \leq u$, $s_2$ could return the value of the bit-string modulo k, which for our preferred choice of $k=2^m$, say, is obtained by extracting the m low-order bits of the $s_1$ output.

The above preferred method permits us to use a blocked matrix implementation for $s_1$, so that the methods of [17, 18] apply to it. Moreover, we can straightforwardly obtain an implementation of $f^{-1}$ when $f$ is invertible, using this preferred construction, by the method disclosed below, which generates an $f^{-1}$ function whose construction is similar to that of $f$.

(4) For any $V \in G^p$, let
$V_u$=extract[0,u−1](V),
$V_v$=extract[u,n−1](V), and
$f(V)$=interleave($L(V_u), R_j(V_v)$)
    where $j=s(V_u)$.

(5) The function $f$ defined in step (4) above may or may not be deeply nonlinear. The next step, then, is to check for deep nonlinearity. We determine this using the following test.

If $f$ is deeply nonlinear, then if we freeze all of its inputs but one to constant values, and ignore all of its outputs but one, we obtain a 1×1 projection $f'$. If we choose different values for the frozen inputs, we may obtain different $f'$ functions. For a linear function, or a function linear up to i/o encoding, the number of distinct $f'$ functions obtainable by choosing different values for the frozen inputs is easily computed. For example, if p=q and $f$ is 1-to-1 (i.e., if $L, R_0, \ldots, R_{k-1}$ are 1-to-1) then there are exactly |G| such functions. $f$ can only be 1-to-1 in this construction if q≧p.

We simply count such $f'$ functions, represented as |G|-vectors over G (e.g., by using a hash table to store the number of occurrences of each vector as the p−1 frozen-input constants are varied over all possibilities). If the number of distinct $f'$ functions could not be obtained by replacing $f$ with a p×q matrix, then $f$ is deeply nonlinear.

We can accelerate this test by noticing that we may perform the above test, not on $f$, but on arbitrary 1×3 projections g of $f$, where g is obtained by freezing all but three of the inputs to constant values and ignoring all but one of the outputs. This reduces the number of function instances to count for a given unfrozen input and a given unignored output from $|G|^{p-1}$ to $|G|^2$, which may provide a substantial speedup. Moreover, if $f$ is deeply nonlinear, we generally discover this fairly soon during testing: the very first time we find a projection function count not obtainable from a matrix, we know that g is deeply nonlinear, and therefore $f$ is deeply nonlinear.

If we use the acceleration using g with a random selection of three inputs and one output, and we do not succeed in demonstrating deep nonlinearity of $f$, then $f$ is probably linear up to I/O encoding.

(Note that it is possible that the projection instance counts are obtainable by matrix but that $f$ is still deeply nonlinear. However, this is unlikely to occur by chance and we may ignore it. In any case, if the above test indicates that $f$ is deeply nonlinear, then it certainly is deeply nonlinear. That is, in testing for deep nonlinearity, the above test may generate a false negative, but never a false positive.)

(6) If the test in step (5) does not show that $f$ is deeply nonlinear (or, for the variant immediately following this list, sufficiently deeply nonlinear), we return to step (1) and try again.

Otherwise, we terminate the construction, having obtained the desired deeply nonlinear function $f$.

As a variant of the above, we may wish to obtain a function $f$ which is deeply nonlinear, and not only that, but that its projections are also deeply nonlinear. In that case, in step (5) above, we may increase the number of g functions with randomly selected distinct groups of three inputs and one output, for which we must show that the $f'$ instance count is not obtainable by matrix. The more of these we test, the more we ensure that $f$ is not only deeply nonlinear, but is deeply nonlinear over all parts of its domain. We must balance the cost of such testing against the importance of obtaining a deeply nonlinear function which is guaranteed to be deeply nonlinear over more and more of its domain.

Experimental Verification. 1,000 pseudo-random trials of the preferred embodiment of the method for constructing deeply nonlinear functions $f$ were tried with pseudo-randomly generated MDS matrices L and $R_0, R_1$ (k=2) where $f: G^3 \mapsto G^3$, $G=GF(2^8)$, and $G_u=G_v=GF(2^4)$. The MDS matrices were generated using the Vandermonde matrix method with pseudo-randomly selected distinct coefficients. Of the resulting 1,000 functions, 804 were deeply nonlinear; i.e., in 804 of the executions of the construction method, step (5) indicated that the method had produced a deeply nonlinear function on its first try.

A similar experiment was performed in which, instead of using the selector function $s=s_2 \circ s_1$ according to the preferred embodiment, function $s_2$ was implemented as a table of 16 1-bit elements with each element chosen pseudo-randomly from the set {0,1}. Of 1,000 such functions, 784 were deeply nonlinear; i.e., in 784 of the constructions, step (5) indicated that the construction method's first try had produced a deeply nonlinear function.

Finally, a similar experiment was performed in which s was created as a table mapping from $G_u^3$ to pseudo-randomly selected elements of {0,1}. In 1,000 pseudo-random trials, this produced 997 deeply nonlinear functions. Thus this method produces the highest proportion of deeply nonlinear functions. However, it requires a sizable table (512 bytes for this small experiment, and 2,048 bytes for a similar function $f: G^4 \mapsto G^4$ with the same I/O dimensions as the MixColumns matrix of AES) to store s.

We see, then, that the construction method given above for creating deeply nonlinear functions over finite fields and rings, and in particular, its preferred embodiment, are quite efficient. Moreover, creating inverses of the generated deeply nonlinear functions is straightforward, as we will see below.

Properties of the Above Construction. A deeply nonlinear function $f: G^p \mapsto G^q$ constructed as described above has the following properties:

(1) if L and $R_1, \ldots, R_k$ are 1-to-1, then $f$ is 1-to-1;
(2) if L and $R_1, \ldots, R_k$ are bijective (i.e., if they are 1-to-1 and onto, so that p=q), then $f$ is bijective; and
(3) if L and $R_1, \ldots, R_k$ are all maximum distance separable (MDS; see below), then $f$ is MDS.

The Hamming distance between two k-vectors, say $u=(u_1, \ldots, u_k)$ and $v=(v_1, \ldots, v_k)$, is the number of element positions at which u and v differ; i.e., it is
$\Delta(u,v) = |\{i \in N | i \leq k \text{ and } u_i \neq v_i\}|$.

A maximum distance separable (MDS) function $f: S^p \mapsto S^q$ where S is a finite set and $|S| \geq 2$, is a function for which for any $x,y \in S^p$, if $\Delta(x,y)=d>0$, then $\Delta(f(x), f(y)) \geq q-d+1$. If p=q, such an MDS function is always bijective. Any projection $f'$ of an MDS function $f: S^p \mapsto S^q$ obtained by freezing m<p of the inputs to constant values and ignoring all but n<q of the outputs, with n≧1 (so that $f': S^m \mapsto S^n$) is also an MDS function. If S is a finite field or finite ring and $f$ is a function computed by a q×p matrix (an MDS matrix, since the vector transform it computes is MDS), say M, then any z×z matrix M' obtained by deleting all but z of the rows of M and then deleting all but z of the columns (where z≧1), is nonsingular; i.e., every square sub-matrix of M is nonsingular.

Such MDS functions are important in cryptography: they are used to perform a kind of 'ideal mixing'. For example, the AES cipher [15] employs an MDS function as one of the two state-element mixing functions in each of its rounds except the last.

Inverting the Constructed Deeply Nonlinear Function. When we employ a 1-to-1 deeply nonlinear function $f: G^p \mapsto G^q$ for some finite field or finite ring G, we often need an inverse, or at least a relative inverse, of $f$ as well. (In terms of [17,18], the corresponding situation is that we have a 1-to-1 linear function $f: G^p \mapsto G^q$, which will be shallowly nonlinear after I/O encoding, whose inverse or relative inverse we require. However, we can strengthen [17, 18] significantly by using deeply nonlinear functions and (relative) inverses instead.)

We now give a method by means of which such an inverse (if p=q) or relative inverse (if p<q) is obtained for a 1-to-1 deeply nonlinear function $f$ created according to our method.

For any bijective function $f: S^m \mapsto S^n$, there is a unique function $f^{-1}: S^n \mapsto S^m: f \circ f^{-1} = f^{-1} \circ f = \mathrm{id}_{S^n}$. If $f: S^m \mapsto S^n$ and m<n, $f$ cannot be bijective. However, $f$ may still be 1-to-1, in which case there is a unique relative inverse $f^{-1}: f\{S^n\} \mapsto S^m$:- $f^{-1} \circ f = \mathrm{id}_{S^m}$. That is, if we ignore vectors in $S^n$ which cannot be produced by calling $f$, then $f^{-1}$ acts like an inverse for vectors which can be produced by calling $f$.

We now disclose a method for constructing such a relative inverse for the deeply nonlinear functions $f$ which we construct, whenever L and all of $R_0, \ldots, R_{k-1}$ are 1-to-1 (in which case $q \geq p$). If p=q, then L and all of $R_0, \ldots, R_{k-1}$ are bijective, and such a relative inverse of $f$ is also the (ordinary) inverse of $f$.

This method can be employed when function s (see step (3) of the construction) is constructed from a linear function $s_1$ and a final function $s_2$ is employed to map the output of $s_1$ onto $\{0, \ldots, k-1\}$, where $s_2$ is computed as the remainder from dividing the $s_1$ result by k. (If k is a power of two, we may compute $s_2$ by taking the $\log_2 k$ low-order bits of the $s_1$ result, which is a convenience, but is not actually required for our current purpose).

We define linear functions $L^{-1}$ and $R_0^{-1}, \ldots, R_{k-1}^{-1}$ to be the relative inverses of L and $R_0, \ldots, R_{k-1}$, respectively. (Since these functions are computed by a matrices, their relative inverses can be obtained easily and efficiently by solving simultaneous linear equations by Gaussian elimination or the like—i.e., by methods well known in the art of linear algebra over finite fields and finite rings.)

We have $s = s_2 \circ s_1$ from the construction of $f$. We define $s_1' = s_1 \circ L^{-1}$, where $L^{-1}$ is the relative inverse of L. (Thus $s_1'$ is computed by a 1×q matrix over $G_u$ easily discovered by methods well known in the art of linear algebra over finite fields and finite rings.) We define $s' = s_2 \circ s_1'$. We now have an onto function $s': G_u^q \mapsto \{0, \ldots, k-1\}$.

The desired relative inverse—or ordinary inverse if p=q—is the function $f^{-1}: G^q \mapsto G^p$ defined as follows.

For any $W \in G^q$, let
$W_u = \mathrm{extract}[0, u-1](W)$,
$W_v = \mathrm{extract}[u, n-1](W)$, and
$f^{-1}(W) = \mathrm{interleave}(L^{-1}(W_u), R_j^{-1}(W_v))$
where $j = s'(W_u)$.

When p=q, this is just the ordinary inverse of $f$. When p<q, the function behaves like an inverse only for vectors in $f\{G^p\} \subseteq G^q$.

If we have an unrestricted form for s, i.e., if it is not constructed as in the preferred embodiment above, we can still invert or relatively invert a bijective or 1-to-1 $f$. For example, if s is simply a table over elements of $G_u^p$, then if we define a new table $s' = s \circ L^{-1}$, then the formula above for $f^{-1}$, but using this different s', remains correct. This new table s' can be obtained by traversing all elements e of $G_u^p$, determining L(e), and filling in element L(e) element of s' with the contents of element e of s.

Using Deeply Nonlinear Functions to Strengthen Ser. No. 10/433,966. When we incorporate the methods disclosed above into the methods and system of [17, 18], we need to disguise these functions, since their components are linear. That is, we need to employ the encoding methods disclosed in [17, 18], which is straightforward, since those encoding methods apply easily to the matrix-blocked L, $R_1, \ldots, R_k$, and $s_1$ implementations constructed according to the above method for created deeply nonlinear functions. Note that, for the above method of creating deeply nonlinear functions, one of the effects will be to encode the output of the selection function, s, so that the index, say i, used to select the appropriate encoded $R_i$ implementation, is likewise encoded.

There are three major uses of blocked matrix implementations in connection in [17, 18].

Two of them are analogous to cryptographic 'whitening', but aimed at increasing ambiguity for the white box attacker rather than the gray box (side channel) attacker or the black box (known plain- and/or ciphertext, adaptive known plain- and/or ciphertext) attacker as in ordinary cryptography. They resemble the kinds of protections applied in the gray box context to protect smart card cipher implementations against differential power analysis, analysis of EM radiations, and the like, but, since they are designed to protect against attackers operating in the white box context, they involve more profound transformations.

The other usage is simply to implement a linear step in a cipher—such linear steps are quite common in block and stream ciphers of many kinds.

To summarize, such blocked matrix implementations are employed in [17, 18] for the following purposes.

(1) They are used for 'pre- and post-whitening'; i.e., for mixing inputs and outputs to move the boundary of encoding outward, thereby rendering attacks on the internals of an implementation according to [17, 18] more ambiguous to the attacker.

(2) They are used for 'mid-whitening', where an internal computation is rendered more complex and is typically made to distribute information more evenly during its computation. This kind of 'mid-whitening' is used, for example, in the proposed DES implementation in §5.2.2, paragraphs [0249]-[0267] of [17, 18].

(3) They are used to implement linear parts of the function to be obfuscated, and rendered tamper-resistant (in the sense that tampering produces chaotic results which are highly unlikely to satisfy any goal that an attacker might have), which are linear, such as the MixColumns and ShiftRows steps in AES, or any of the 'bit permutations' of DES. In particular, MixColumns is computed on 4-vectors over $GF(2^8)$ (i.e., 4-byte vectors) using a 4×4 MDS matrix. ShiftRows, like the 'bit permutations' of DES, simply repositions information in vectors without further modifications.

We may instead employ deeply nonlinear functions created according to the extension of [17, 18] disclosed above as follows.

(1) Since pre- and post-whitening are simply encodings of the inputs and outputs of a cryptographic implementation, we can directly apply constructions of wide-input deeply nonlinear functions according to the above extension to [17, 18], with matrices blocked and all parts of these implementations encoded according to [17, 18]. Such pre- and post-whitenings certainly render far more arduous attacks on initial and final parts of a cryptographic implementation (e.g., initial and final rounds of a cipher) using known plain- or cipher-text attacks on its white box implementation.

(2) Use of deeply nonlinear functions created as disclosed above may improve security. However, since such uses of a deeply nonlinear function also involve its inverse, the composition of the function and its inverse, even when disguised by composition with another linear function, results in a function linear up to I/O encoding, and thus opens the door to homomorphic mapping attacks. Therefore, it is recommended that (3) below be used instead wherever possible.

(3) Where possible, we should replace the linear step with a step which is similar, but deeply nonlinear. For example, we may replace the MixColumns MDS matrix of AES with a deeply nonlinear MDS function. It is recommended that when this is done, the cipher (not AES but an AES variant) be implemented so that implementations of encryption and decryption do not occur in proximity to one another, since this would permit homomorphic mapping attacks. If only encryption, or only decryption, is available at a given site, this method provides strong protection against homomorphic mapping attacks.

(4) In addition, where feasible, we should use very wide inputs. For example, the MixColumns matrix of AES maps 32-bit vectors to 32-bit vectors. Brute force inversion of a function over a space of $2^{32}$≈four billion inputs requires sorting about four billion elements. This is large, but not utterly infeasible in the current state of the art with current equipment. If it were twice as wide, however, such a sort would be infeasible using current methods and equipment, since it would require sorting a list of over 16 billion ($1.6\times10^{19}$) entries.

2.7.6. Strengthening Ser. No. 10/478,678 while Preserving the Value of its Metrics. The system and method of U.S. patent application Ser. No. 10/478,678 [5] are related to those of U.S. Pat. No. 6,594,761 [2] and U.S. Pat. No. 6,842,862 [4], but [5] adds some very highly secure data encodings, and in addition, provides a series of distinct data encodings together with the protective power of those encodings, measured by methods distinct from those in [9].

[9] proposes to measure security by means of metrics which, while varying positively with the security of an implementation, do not provide a security metric measuring how much work an attacker must perform to penetrate the security. [5], in contrast, provides a work-related metric: the metric is the number of distinct original computations, prior to encoding, which could map to exactly the same encoded computation. (This possibility arises because the meaning of an encoded computation depends on the context in which it occurs. For example, if, according to [20], an encoded value could be encoded according to y=ax+b, then so could y'=a'x'+b, where a'=3a and x'=$3^{-1}$ x and $3^{-1}$ is the finite ring inverse of 3 in the particular finite ring corresponding to the word size of the target machine for the protected code.) The metric of [5] therefore directly measures the size of the search-space faced by an attacker attempting to deobfuscate a computational operation on protected data using a computation protected according to the encodings of [5].

We note that performing substitutions according to the identities listed in §2.5.3 and §2.5.4 or discovered according to the methods disclosed in §2.5.1, §2.5.2, or [2, 4, 5, 20], or in the extension of [20] given in §2.7.7, or any combination of the above, after protecting the data according to [5], cannot invalidate the metric formulas provided in [5]. At most, the result will be that the degree of protection afforded, in terms of the work load faced by an attacker attempting to deöbfuscate such encodings, will exceed the figure given by the formulas in [5].

Such substitutions are therefore recommended as a means of increasing the security provided by the methods of [5]. [5] already provides certain methods of encoding, such as multinomials in residual representation, which are extremely secure by the above-mentioned metric. The expectation is that, by extending the methods of [5] as described immediately above, data and computational encodings of well-nigh cryptographic strength can be constructed.

2.7.7. Adding Polynomial Encodings and MBA Identities to Ser. No. 11/039,817. We incorporated the method of U.S. patent application Ser. No. 11/039,817 [20] by reference in §2.7. We now provide formulas by means of which the linear mappings over the modular ring $Z/(2^n)$ of [20] can be extended to polynomials of higher degree.

Polynomials can be multiplied, added, and subtracted, as linear mappings can, and if we have inverses, we can—after solving the high degree problem as described below—proceed as in [20], but with polynomial inverses of degree 2 or more replacing linear inverses, where the inverse of the linear L(x)=sx+b (if invertible; i.e., if s is odd) is $L^{-1}$(y)= $s^{-1}$(y−b)=$s^{-1}$y−$s^{-1}$b. (We find $s^{-1}$ as described in §2.5.5.). As degree rises, so do security and computational overhead.

An invertible polynomial mapping P is called a permutation polynomial because it maps the elements of $Z/(2^n)$ to the elements of $Z/(2^n)$:-P(x)=P(y) iff x=y; i.e., it defines a permutation of the elements of $Z/(2^n)$.

The high degree problem is this: the compositional inverse of a permutation polynomial of low degree is typically a permutation polynomial of very high degree—usually close to the size of the ring (i.e., close to the number of elements it contains, which for rings of size $2^{32}$ or $2^{64}$ is a very high degree indeed). As a result, use of the polynomial inverses in the quadratic (degree 2) or higher analogues of the method of [20] is prohibitively expensive due to the massive exponentiations needed to compute inverses.

However, there are a few special forms of low-degree (namely, 2, 3, or 4) permutation polynomials in which the degree of the inverse does not exceed the degree of the polynomial itself. To form the quadratic (degree 2), cubic (degree 3), or quartic (degree 4) analogues of the linear (degree 1) encodings of [20], we may therefore use permutation polynomials of the special forms listed below.

Despite the restrictions on the forms of such polynomials, the number of choices of such polynomials over typical modular integer rings based on machine word size (typically $Z/(2^{32})$ or $Z/(2^{64})$) is still very large—more than adequate to render such encodings secure. Moreover, by use of such higher-order analogues of the system of [20], we eliminate the possibility of attacks using forms of analysis, such as solving simultaneous linear equations by Gaussian elimination, which can be used to subvert or undo the encodings provided by [20] due to their linearity.

In the following, all computations are performed over the appropriate integer modular ring—typically, over $Z/(2^{32})$ or $Z/(2^{64})$.

Quadratic Polynomials and Inverses. If P(x)=$ax^2$+bx+c where $a^2$=0 and b is odd, then P is invertible, and $$P^{-1}(x)=dx^2+ex+f,$$

where the constant coefficients are defined by $$d = -\frac{a}{b^3},$$

$$e = 2\frac{ac}{b^3} + \frac{1}{b}, \text{ and}$$

$$f = -\frac{c}{b} - \frac{ac^2}{b^3}.$$

Cubic Polynomials and Inverses. If P(x)=$ax^3$+$bx^2$+cx+d where $a^2$=$b^2$=0 and c is odd, then P is invertible, and $$P^{-1}(x)=ex^3+fx^2+gx+h,$$

where the constant coefficients are defined by $$e = -\frac{a}{c^4},$$

$$f = 3\frac{ad}{c^4} - \frac{b}{c^3},$$

$$g = \frac{1}{c} - 6\frac{ad^2}{c^4} + 3\frac{ad^2}{c^4} + 2\frac{bd}{c^4}, \text{ and}$$

$$h = -ed^3 - \left(3\frac{ad}{c^4} - \frac{b}{c^3}\right)d^2 - \left(\frac{1}{c} - 6\frac{ad^2}{c^4} - 3d^2e + 2\frac{bd}{c^3}\right)d.$$

Quartic Polynomials and Inverses. If $P(x)=ax^4+bx^3+cx^2+dx+e$ where $a^2=b^2=c^2=0$ and d is odd, then P is invertible, and $$P^{-1}(x)=fx^4+gx^3+hx^2+ix+j,$$

where the constant coefficients are defined by $$f = -\frac{a}{d^5},$$

$$g = \frac{4ae}{d^5} - \frac{b}{d^4},$$

$$h = -6\frac{ae^2}{d^5} + 3\frac{be}{d^4} - \frac{c}{d^3},$$

$$i = \frac{4ae^3}{d^5} - 3\frac{be^2}{d^4} + 2\frac{ec}{d^3} + \frac{1}{d^3}, \text{ and}$$

$$j = -\frac{ae^4}{d^5} + \frac{be^3}{d^4} - \frac{ce^2}{d^3} - \frac{e}{d}.$$

Further Obfuscating the Polynomials and Inverses. The above polynomial encodings can be made yet more obscure by post-modifying them, employing substitutions according to the identities disclosed herein in §2.5.3 and §2.5.4 or discovered by employing the methods given herein in §2.5.1 and §2.5.2, which provided access to an effectively unlimited, and hence unsearchably large, set of identities, or some combination of two or more of the above, thereby rendering these encodings incapable of analysis using tools such as Mathematica™, Matlab™, or Maple™, due to the simultaneous use of multiple, profoundly different mathematical domains within computations.

2.8. Other Systems and Methods Extended Herein. Software obfuscation and tamper-resistance methods alternative to those incorporated by reference in §2.7 are provided in U.S. Pat. No. 6,668,325 [9], U.S. Pat. No. 6,088,452 [19], and U.S. Pat. No. 6,192,475 [27]. We will now disclose methods whereby their protections may be strengthened for the purpose of making them useful lower-level building blocks for the higher-level construction of interlocks.

The methods and systems of [9,19] depend on provided entropy (effectively random information input seeding a stream of pseudo-random values on which encoding and protection decisions made in applying these methods and systems are based). Hence they provide high degrees of static diversity: each new use of these methods and systems normally produces distinct results, thereby making the attacker's job more difficult since the attacks on instances of a given original unprotected SBE modified into a protected SBE using the above methods and systems must vary on a per-generated-instance basis.

2.8.1. Strengthening the Obfuscations of U.S. Pat. No. 6,668,325. U.S. Pat. No. 6,668,325 [9] lists a wide variety of obfuscation techniques covering various aspects of software; namely, control flow, data flow, data structures, and object code. In addition, it proposes applying obfuscations from a library of such obfuscations until a desired level of protection is achieved as measured by various metrics. In effect, in software engineering, clarity of programs is a goal; [9] applies metrics but with merit lying with the opposite of clarity, i.e., with obscurity, so that [9] provides a mechanized method for aggressively avoiding and/or reversing the readability and perspicuity mandated by software engineering, while preserving functionality. [9] divides the quality of an obscuring transformation into three aspects: potency, which is the 'badness' of a protected software in terms of perspicuity, estimated by typical software engineering metrics such as cyclomatic complexity, resilience, which is the difficulty of deobfuscating the transform by means of a deobfuscating program such as Mocha, and cost, which is the amount of added overhead due to applying the transform (in terms of slower execution and/or bulkier code).

As in §2.7.6, the strengthening methods we now provide for [9] do not affect its preferred embodiments for the metric aspects of that invention, but do provide greater obscurity and tamper-resistance by rendering protected code more difficult to analyze, even using analytic tools such as Mathematica™, Matlab™, or Maple™, and more aggressively fragile, and hence resistant to goal-directed tampering, due to the simultaneous use of profoundly different algebraic domains, and/or to the other protections disclosed below.

[9] proposes opaque computational values, and especially opaque predicates (see [9] §6.1 column 15, §8 column 26) for protecting control flow by making conditional branch (if) conditions obscure. After showing a method of creating opaque predicates which the patent itself indicates is too weak, it proposes two stronger methods in [9] §8.1 column 26 (use of aliasing, since alias analysis is costly) and §8.2 column 26 (using computation in multiple threads, since parallel program analysis is costly). Both of these incur heavy costs in terms of bulkier code and slower execution.

A much better method is to transform predicates using substitutions according to the identities disclosed or quoted herein in §2.5.3, or disclosed in §2.5.4, or discovered by employing the methods given herein in §2.5.1 and §2.5.2, which provide virtually unlimited, and hence unsearchably large, sets of usable identities, or preferably a combination of two or more the above, thereby rendering these encodings incapable of analysis using tools such as Mathematica™, Matlab™, or Maple™, due to the simultaneous use of multiple, profoundly different mathematical domains within computations, while incurring substantially less overhead in code bulk and permitting much faster execution.

[9] §7.1.1 column 21 suggests linearly encoding variables in the program, and the first paragraph in column 22 reads "Obviously, overflow . . . issues need to be addressed. We could either determine that because of the range of the variable . . . in question no overflow will occur, or we could change to a larger type." Thus it is evident that linear encoding over the integers is intended (or over the floating point numbers, but this incurs accuracy problems which severely limit the applicability of such a naively linear floating point encoding). We recommend that the far superior integer encodings of [20], with the extensions in §2.7.7, be employed. This avoids the overflow problems noted in [9] (they become a legitimate part of the implementation which maintains the modulus, rather than a difficult problem to be solved), they preserve variable size, and, with the use of MBA-based substitutions as noted in §2.7.7, they are highly resistant to algebraic analysis and reverse engineering.

[9] §7.1.3 column 23 proposes splitting a variable x into multiple variables, say $x_1, x_2$, so that some function $x=f(x_1,$ $x_2$) can be used to retrieve the value of x. We note that so retrieving x causes the code to reveal the encoding of x, which is undesirable. An encoding which permits computations in encoded form is better; e.g., the residual number system (RNS) encoding of [5] based on the Chinese remainder theorem, with the extensions thereto in §2.7.6. This also splits the variable, but does not generally require decoding for use.

[9] §7.2.1 column 24 proposes merging scalar variables into one wider variable (e.g., packing two 16-bit variables in the low- and high-order halves of a 32-bit variable). This is not very secure, since any accessing code reveals the trick. A better approach is to use the vector encodings of [2, 4, 5] as extended in §2.7.1 and §2.7.6, which provide many-to-many rather than one-to-many mappings, and of very much higher obscurity, while also supporting computations on encoded data rather than requiring decoding for use.

[9] §7.2.2 column 24 proposes that we obfuscate arrays by restructuring them: that we merge multiple arrays into one, split single arrays into multiple arrays, increase the number of dimensions, or decrease the number of dimensions. We note that only limited obfuscation can be achieved by altering the number of dimensions, since typically an array is represented by a contiguous strip of memory cells; i.e., at the object code level, arrays in compiled code are already unidimensional irrespective of the number of dimensions they might have in the corresponding high-level source code.

Merging arrays can provide effective obfuscation if combined with scrambling of element addresses. We therefore recommend providing stronger obfuscation than that provided by the methods of [9] §7.2.2 by merging arrays and addressing them using permutation polynomials. A permutation polynomial is an invertible polynomial, such as the degree-1 (affine) polynomials used for encoding in [20] or the degree-2 (quadratic), degree-3 (cubic), and degree-4 (quartic) polynomials added thereto in §2.7.7. Such permutation polynomials map elements to locations in a quasi-random, hashtable-like manner, and applying pre- and/or post-modifications of the indexing code employing substitutions according to the identities disclosed or quoted herein in §2.5.3, or disclosed in §2.5.4, or discovered by employing the methods given herein in §2.5.1 and §2.5.2, which provided access to an effectively unlimited, and hence unsearchably large, set of identities, or some combination of two or more of the above, will render such indexing computations incapable of analysis using tools such as Mathematica™, Matlab™, or Maple™, due to the simultaneous use of multiple, profoundly different mathematical domains within computations, and will thus provide very much stronger obfuscation than that provided by the teachings of [9] §7.2.2 without the enhancements disclosed here.

Alternatively, we can merge arrays into memory arrays protected according to [16], strengthened according to §2.72, thereby achieving all of the benefits of the above with the additional obfuscation benefits of encoded data. Moreover, such a form of protection applies, not only to arrays, but to arbitrary data records and even linked data structures connected by pointers.

2.8.2. Reducing U.S. Pat. No. 6,088,452 Overheads while Increasing Security. U.S. Pat. No. 6,088,452 [19] obfuscates software (or hardware expressible programmatically in languages such as VHDL) by introducing cascades which cover all regions to be protected. A cascade according to [19] is a data-flow graph in which every output depends on every input. Each BB of the program has such a cascade. The computations in the cascades are essentially arbitrary; their purpose is to transmit entropy without achieving useful work.

The computations in the original program are then intertwined with the cascades and one another, creating an extremely dense data flow graph with extremely high levels of interdependency, thereby establishing a condition of proximity inversion: any small change in the protected program, which duplicates the behavior of the original program but with much larger and quite different code, causes a large and chaotic change in the protected program's behavior.

The examples in [19] intertwine operations using multilinear (matrix) operations over the integers—[19] is primarily concerned with protecting programs whose data items are integers. (This is in fact the case for many low-level programs—entire operating systems can be built without floating-point code.)

The problem with integer computations, however, including those employed in cascades and intertwining according to [19], is that they can exceed the range limitations of the data types they employ on the chosen target platform. As a result, practical deployment of programs protected according to [19] require larger integer representations than those used in the original programs, prior to their protection according to [19].

We therefore prefer that all such computations, whether in intertwining or in cascades, be performed over BA[n], where n is the target platform's preferred word size in bits, so that arithmetic is performed over $Z/(2^n)$—see §2.3.2. The intertwining matrices chosen should be invertible matrices (ones with odd determinants) over $Z/(2^n)$. Thus overflow ceases to be a concern, larger data representations are unnecessary, added code to handle multiple precision is avoided, and the code is smaller and faster than would be the case following the teachings of [19] without the enhancements here disclosed. (Nevertheless, the full range of computation in the original program remains supported, as shown by the support of such computations in programs protected according to [20].)

The level of protection afforded by [19] can be further improved by post-modifying the intertwined computations and cascades employing substitutions according to the identities disclosed or quoted herein in §2.5.3, or disclosed in §2.5.4, or discovered by employing the methods given herein in §2.5.1 and §2.5.2, which provided access to an effectively unlimited, and hence unsearchably large, set of identities, or some combination of two or more of the above, thereby rendering the intertwined computations and cascades incapable of analysis using tools such as Mathematica™, Matlab™, or Maple™, due to the simultaneous use of multiple, profoundly different mathematical domains within computations.

2.8.3. Increasing U.S. Pat. No. 6,192,475 Security by Augmented Indexing Complexity. The system and method of U.S. Pat. No. 6,192,475 [27] protects the variables and arrays of a software-based entity by changing and augmenting the addressing of its variables and arrays so that (A) their indexing is more complex than the original indexing (possibly because originally there was no indexing), and (B) variables and elements no longer have fixed locations in the protected program. [27] depends for its most effective operation on the nature of the software to be protected: it works best for programs performing many array operations in loops, whether the loops are express or merely implied.

[27] contemplates array operations with indices which are merely integers—the natural understanding of array indices in most programming languages. Its protections can be rendered more powerful by two extensions.

Use indices over modular rings of the form $Z/(2^n)$ for values k with properties as disclosed below.

Secondarily encode indices by permutation polynomials permuting their ranges, so that an array indexing $A[i_1, \ldots, i_m]$ becomes an array indexing $A[p_1(i_1), \ldots, p_m(i_m)]$ where $p_1, \ldots, p_m$ are permutation polynomials, with properties as disclosed below.

The former extension is useless in itself. In combination with the second, it causes the array indices to become thoroughly scrambled.

For each dimension of an array, we choose k to be either a prime number, preferably the smallest prime at least as large as that dimension, or a number of the form $2^n$, preferably choosing the smallest n for which $2^n$ is at least as large as that dimension. In the former case $Z/(k)=GF(k)$, so that we may use essentially ordinary matrix computations over that field: a matrix is invertible precisely if its determinant is nonzero. In the latter case, $Z/(2^n)$ is a modular ring with a modulus typically having fewer bits that the platform's preferred computational word has, so that (unlike the other contexts in which the instant disclosure employs such rings) the modulus operation must be performed explicitly by a bitwise ∧ (and) operation which ands the results of computations with a mask containing all zeros except for n low-order 1-bits. In that case, the linear algebra must be adjusted since a matrix is only invertible if its determinant is odd.

The permutation polynomials above should be of low degree (for example, of degrees 1, 2, 3, or 4), but with inverses of high degrees, since there is no need in this use of permutation polynomials for inverting the polynomials. This makes computation of the polynomials inexpensive and computation of their inverses expensive, which is just what we want: it gives us substantial obscurity at low cost. Finding such permutation polynomials is easy: most permutation polynomials of low degree have inverses of high degree.

Neither of these extensions, with their variants, invalidates the essential aspects of the mathematics or methods (mutatis mutandis) of [27]. Their combination, however, thoroughly scrambles the memory positions of variables, elements, and successive positions thereof during looping (express or implied), rendering analysis of the system not only NP-hard in the worst case, as in the unextended version of [27], but extremely difficult to analyze in virtually every case.

These extensions greatly enhance the security of [27] at the cost of greater space and time overheads for the executable form of portions of programs so obfuscated and rendered fragile under tampering.

2.9. Establishing the Required Properties. In this section, we teach how to establish the requirements of instant method and system for installing interlocks in SBEs: that is, we teach how to generate integral, obscure, and contextual OEs, obscure and contextual IAs, and essential, obscure, and contextual RPEs.

2.9.1. Generating Integral OEs, Essential RPEs, and Transfer IAs. As previously noted in §2.4.5, output extensions (OEs) added to the computation of the preproduction F computed in the preproduction BB set X when converting them into the production computation F' computed by the production BB set X' must be integral; that is, the extensions must be tied as much as possible into the normal computation prior to installation of the interlock.

As noted in §2.4.4, RPEs added to the computation of the preconsumption G computed in the preconsumption BB set Y when converting them into the consumption computation G' computed by the consumption BB set Y' must be essential; that is, the RPEs must be so combined with the normal computation which was present prior to installation of the interlock that the normal functionality can only occur, barring some extremely improbable coincidence, if the inputs expected by the rpe s on the basis of the production F' and the transfer R' have not suffered tampering.

If we consider the preproduction MF F computed by the preproduction BB set X, there may be values produced by computing F in X which are consumed by the preconsumption MF G computed by the preconsumption BB set Y, possibly after further modification by the pretransfer MF R computed by the pretransfer BB set V. Computation of these values is integral to the computation F by X, and normally, possibly after further modification by computation of R by V, they are essential to the computation of G by Y.

Case 1: Absent or Weak X→Y Data Dependency. If there are no such values, or insufficiently many such values computed in the preproduction BB set X and subsequently employed in the preconsumption BB set Y, possibly after further modifications in the pretransfer BB set V, we must add or increase the number of such dependencies. After this has been done to a sufficient degree, we have established strong X→Y data dependency, and can proceed as indicated in Case 2: Strong X→Y Data Dependency below.

To increase the X→Y data dependency, we may employ the encoding system of [20], or the extension thereof taught in §2.7.7, in the specialized manner described below.

In the encoding system of [20], for an integer value x in BA[n] where n is the normal word size of the target execution environment, we encode x as $x'=sx+b$, where s is the scale and b is the bias. b is arbitrary, but s should be odd, so as to preserve all of the bits of information in x. [20] teaches how we may compute with values so encoded without decoding them, where different values have different scales and biases, so as to incorporate all of the normal built-in arithmetic, shift, and bitwise operations of C or C++. §2.7.7 discloses methods to extend the encodings in [20] to polynomials of nonlinear degree.

In order to increase X→Y data dependency, we make use of values computed in the X BB set as bias values (in terms of polynomials with variable x, the coefficients of $x^0$) in the original version of [20] or its extension to quadratic, cubic, or quartic polynomials as disclosed in §2.7.7, since this avoids the need to compute inverses dynamically. We then encode computations in Y using the biases obtained from X, by means of which, by using sufficiently many values computed in X, or values derived from them as described above, as biases for encodings according to [20] of values used and computations performed in Y, we can create arbitrarily strong X→Y data dependence, and can therefore meet the precondition for use of the Case 2: Strong X→Y Data Dependency method below, with which we then proceed.

A similar method, using values in the preproduction BB set X, or values simply derived from them, to provide coefficients of encodings, can be used instead or in addition where, instead of employing the encodings of [20], we employ those of one or more of [2, 4, 5, 17, 18]. By doing this for sufficiently many values computed in X, or additional values simply derived from values computed in X, and employing them as coefficients to encode values and computations in Y, we can create arbitrarily strong X→Y data dependence, and can therefore meet the precondition for use of the method below under the heading Case 2: Strong X→Y Data Dependency, with which we then proceed.

Any or all of the above methods may be further augmented by employing encodings obtained by further modifying those encodings listed in [2, 4, 5, 17, 18, 20] by employing the identities we disclose or quote in §2.5.3, or disclose in §2.5.4, or by means of identities created using the methods taught herein in §2.5.1 or §2.5.2, or identities found in the extension of [20] given in §2.7.7. By such means for sufficiently many computations in X and Y we can create arbitrarily strong X→Y data dependence, and can therefore meet the precondition for use of the method below under the heading Case 2: Strong X→Y Data Dependency, with which we then proceed.

Finally, we may take computations in X, and create additional versions of those same computations using different expressions, by making use of the identities we disclose or quote in §2.5.3, or disclose in §2.5.4, or identities created using the methods taught herein in §2.5.1 and §2.5.2, or identities disclosed in [2, 4, 5, 20], or found in the extension of [20] given in §2.7.7. Such additional versions are as integral as the originals: there is no way that the originals and the additional versions can be distinguished by inspecting the code. At this point, these computations produce identical results, but we should place them in new, separate values.

We can then easily augment expressions in Y to make use of these values in such a fashion that no net change takes place, by using the original and alternates of pairs of values, one produced in X originally, and one added as described above by making use of the above-mentioned MBA identities. After further steps of obfuscation described hereinafter, these usages will well hidden. Moreover, since the augmentations which have no net effect employ both original and added values in X, we have the additional advantage that tampering with the computations will cause the computation in Y to fail by causing differences between the original and identity-added values, thereby causing the expression augmentations in Y to have a net effect, thereby haphazardly modifying the original computation in Y to compute different, haphazard results.

By creating sufficiently such augmentations, we can create any desired level of X→Y data dependence, thereby meeting the conditions for employing the methods of Case 2 below, with which we then proceed.

Plainly, we may also employ any combination of the above methods to achieve a state of strong X→Y data dependence, and then proceed according to Case 2 below.

Case 2: Strong X→Y Data Dependency. If there are enough such values computed in X and employed in Y, possibly after further modifications in V, then we may define J to be the state space of copies of these values, K to be the state space of these copies after being modified as their originals are modified by R, and G to make use of the copies as described hereinafter.

Then we have $F_{OE}$:: P↦A×J:-$F_{OE}$(x)=(x,x$_+$) where x$_+$∈K is obtained by performing the computation of the selected values again so as to produce the copied results in K. Of course, at this point, the output extension is insecure, because the computations to produce x+are copied from existing subcomputations of F by X. We will address this problem in further steps as described hereinafter. (Note that x$_+$ may include the values of many variables, since it is a copy of some portion of a state space of the program.)

Duplicated values are the preferred embodiment, but other information-preserving alternatives exist, such as x$_+$=-x, x$_+$=¬x, x$_+$=x+k, or x$_+$=x⊕k, where k is a constant, ¬and ⊕ denote bitwise operations, and + is performed in the natural two's complement modular ring of the target hardware. Many such information-preserving alternatives would be obvious to those skilled in the art—so many, in fact, that it would be easy to choose them algorithmically on the basis of a random input during interlock installation.

We have mentioned copying values by copying computations above. For any copied value c, it is evident that, instead of copying c, we may instead copy the values, say $i_1, \ldots, i_k$, which are the inputs by means of which c is computed, even if some of these inputs are copies of computations which precede the code in X. This permits us many more choices of what to copy, thereby increasing the obscurity of the output extension $F_{OE}$ which we choose when installing the interlock.

The purpose of choosing copied values, which are at least initially identical to original values (or at least information preserving alternate values), is to reduce the probability of accidental matches. Alternatives to this approach would be to choose related values: instead of creating a copy, c, of a value, v, we could create a value, r, related to the value of v—e.g., we could ensure that r<v, or r>v, or r≠v, or vmodr=5, or the like. These are legitimate and viable choices, but in the preferred embodiment, we select identical values (or at the very least, equivalent information) according to the following reasoning. If we consider a value, v', in some way related to v, then the likelihood of achieving the relationship accidentally by tampering decreases as the relationship becomes more restrictive. A randomly chosen member of BA[32] will match v on average only once in $2^{32}$≈4.29×10$^9$ random trials. However, a randomly chosen member of BA[32] will be typically be greater than, or less than, v, very much more often: i.e., these relations are not preferred because they are not very restrictive. A randomly chosen member of BA[32] may make vmodr=5 quite often: namely, once in |r| random trials which is typically much more often than one in $2^{32}$ random trials. For this reason, the preferred embodiment is to use copied values (or information-preserving alternate values), so that tampering is virtually certain to cause a mismatch with the expected copied values or expected alternate values.

Let us call the state x, as modified by computation of R by the BBs in V, state v. Then continuing our extended data state, since R(x)=v, we have $R_{agg}$(x,x$_+$)=(v,v$_+$), where v$_+$ is the result of treating the copied variables in x$_+$ as their originals are treated by R—again, we just copy those computations, but applying them to the copies instead of the originals. (If R never affects them, then v$_+$=x$_+$ in each case, so that K=J.)

At this point, we must convert the preconsumption computation G by the BB set Y into a consumption computation $G_{RPE}$:: B×K↦E. We seek to do this in such a way that disturbance of the relationship between x and x$_+$ or the relationship between v and v$_+$ will cause the computation $G_{RPE}$ to fail.

Our preferred method for doing this is to take advantage of the fact that the contents of the variables whose states are captured in v$_+$ are identical (at this point) to the states of the corresponding variables captured in v, where the v$_+$ variables are a subset of the v variables.

Of course, as noted above in discussing the generation of the $F_{OE}$ output extension, we could have employed a relationship or relationships other than equality, in which case we would adjust the generation of the RPE to operate normally only if those alternative relationship or relationships hold, instead of only if the equality relationship holds. Or, if we preserve information in an alternate form, instead of using x and x$_+$ interchangeably, if we have an equation x$_+$=f(x), then we substitute $f^{-1}$(x$_+$) freely for x. E.g., if x$_+$=x+k, we substitute the computation (x$_+$-k) freely for value x.

Now, as noted in item (3) in §2.5.3 above, when for two variables $v_1$, $v_2$, we have $v_1$=$v_2$, we also have $v_1 \vee v_2$= $v_1 \wedge v_2$=$v_1$=$v_2$, $v_1$-$v_2$=$v_1 \oplus v_2$=0, $v_1 \vee \overline{v}_2$=$v_1 \oplus \overline{v}_2$=$\overrightarrow{1}$=-1 (signed), and many other identities easily derivable by simple algebraic manipulation, or by combination with the identities disclosed or quoted in §2.5.3, or disclosed in §2.5.4, or identities discovered by the methods disclosed in §2.5.1 or §2.5.2, or the identities disclosed in [2, 4, 5, 20], or found in the extension of [20] given in §2.7.7.

Suppose $v_1$ is part of v and $v_2$ is part of v$_+$. We can then generate many expressions which are identical only if the equality of $v_1$ and $v_2$ is maintained. By freely substituting in such expressions using a random choice of $v_1$ and $v_2$ or a mixture of both occurrences of $v_1$ and $v_2$ in G, which originally uses only $v_1$, say, and doing this for a number of different $v_1$, $v_2$ pairs, so that many of the variables used in G are affected, we produce a variant $G_{RPE}$ of G which functions normally only if, for each $v_1$, $v_2$ pair, $v_1=v_2$—otherwise, it will almost certainly fail. Note that tampering either with $G_{OE}$ or with $R_{agg}$ can produce a pair $v_1$, $v_2$ for which $v_1 \neq v_2$. We thus create our required essential RPE, $G_{RPE}$.

N.B.: Above, we speak of using the original values and their duplicates. (More generally, this may be replaced with the original values and their related values, or the inputs to the computation of the original values and the duplicates or values related to those inputs.) Instead of using the original values and their duplicates, we may also employ values and duplicates which are computed by means of these values; i.e., using these values as inputs, even if these values are computed after execution of the code in Y. That is, we may use the duplicates from X' to create more duplicates in Y', and then employ those duplicates (or perhaps other forms of related values) in computations so as to induce highly probable failure when tampering occurs. This permits us many more choices of what copies to employ in generating code failing under tampering, thereby increasing the obscurity of the RPE $G_{RPE}$ which we choose when installing the interlock.

Generating IAs. We have briefly mentioned that, in converting the pretransfer computation R:: A$\mapsto$B performed by BB set V to the computation $R_{agg}$:: A×J$\mapsto$B×K, we may do any of the following.

(1) If R already modifies values computed in X, and those modifications are employed in Y, then if those values are replicated to create the integral OE $F_{OE}$ from F, we may replicate the related computations in R to obtain $R_{agg}$, and those replicates from $R_{agg}$ may then be employed in $G_{RPE}$, with randomly selected use of original and duplicate values, so as to render the RPE $G_{RPE}$ essential to the preservation of G's functionality. This method applies irrespective of the complexity of the computations and flow of control through the pretransfer BB set V.

(2) If R modifies no values computed in X which we wish to duplicate to create the integral OE $F_{OE}$ from F, then we may simply leave the computations in BB set V which computes R unmodified. This implies that K=J and $R_{agg}$=[R,$id_J$], where J contains the duplicated values. This alternative (doing nothing) applies irrespective of the complexity of the computations and flow of control through the pretransfer BB set V.

(3) If R modifies no values computed in X which we wish to duplicate to create the integral OE $F_{OE}$ from F, then we may add computations to V so that, for any given pair $v_1$, $v_2$ where $v_1$ is an original result of computation F, and $v_2$ is an added duplicate, and we may add a pair of computations to R so that $v_1$ is used in a number of computations which, however, in the end still produce $v_1$, and $v_2$ is used in a different group of computations which, again, in the end still produce $v_2$. That is, we perform distinct computations on $v_1$ and $v_2$ which have no net effect. Then we still have K=J and $R_{agg}$=[R,$id_J$], where J contains the duplicated values, but after further obfuscating steps described hereinafter, this may either not be the case—although overall functionality is still preserved—or, if still true, it is far from obvious. This alternative requires that we be able to analyze the net effect of computations added to V on the $v_1$, $v_2$ pairs. Such analysis may be very difficult if the data- and control-flow through V are sufficiently complex. Therefore, this method is only applicable where it can be restricted to modifications of a portion of the BBs in the BB set V which is sufficiently simple with respect to control- and data-flow to permit such computations with no net effect to be added reliably. (The permissible level of complexity will thus depend on the sophistication of the available compiler data-flow analysis and control-flow analysis facilities.) The method is not always applicable, unlike alternatives (1) and (2) above.

(4) If R modifies no values computed in X which we wish to duplicate to create the integral OE $F_{OE}$ from F, then we may add computations to V so that, for any given pair $v_1$, $v_2$ where $v_1$ is an original result of computation F, and $v_2$ is an added duplicate, and we may add a pair of computations to R so that $v_1$ is used in a number of computations which in the end produce $w_1$, where normally $w_1 \neq v_1$, and $v_2$ is used in a different group of computations which in the end produce $w_2$, where normally $w_2 \neq v_2$, and where $v_1$ is easily computed from $w_1$ and $v_2$ is easily computed from $w_2$. That is, we perform distinct computations on $v_1$ and $v_2$ which have net effects, but still preserve the values of $v_1$ and $v_2$ in the disguised forms $w_1$ and $w_2$ which $v_1$ and $v_2$ may be computed.

We then modify code when producing $G_{RPE}$ so that the code replaces uses of $v_1$ duplicated uses of $v_2$ with uses of the expression for $v_1$ in terms of $w_1$ and uses of the expression for $v_2$ in terms of $w_2$, respectively.

Then we may well have K$\neq$J, and $R_{agg}$=[R,S], where S performs the above-mentioned computations of $w_1$, $w_2$ from $v_1$, $v_2$. Of course, this is true, not for one $v_1$, $v_2$ pair and its corresponding $w_1$, $w_2$ pair, but for all $v_1$, $v_2$ pairs we have determined, and for all of their corresponding $w_1$, $w_2$ pairs.

After the obfuscation steps described hereinafter, these computations may no longer yield the same values for $v_1$ and $v_2$ from the values $w_1$ and $w_2$ in the various pairs—although overall functionality is still preserved—or, if it does, that fact will be inobvious.

As with alternative (3) above, this alternative requires that we be able to analyze the net effect of computations added to V on the $v_1$, $v_2$ pairs, in this case, to produce $w_1$, $w_2$ pairs. Such analysis may be very difficult if the data- and control-flow through V are sufficiently complex. Therefore, this method is only applicable where it can be restricted to modifications of a portion of the BBs in the bb set V which is sufficiently simple with respect to control- and data-flow to permit such computations with a specific net effect—the computation of the $w_1$, $w_2$ pairs according to known, value-preserving formulas—to be added reliably. (The permissible level of complexity will thus depend on the sophistication of the available compiler data-flow analysis and control-flow analysis facilities.) The method is not always applicable, unlike alternatives (1) and (2) above.

Approaches (3) and (4) above suffer from the limitation that they can only be employed only where data- and control-flow complexity in the pretransfer BB set V is low enough to permit predictable addition of computations without net effect on output-extension duplicate pairs produced by $F_{OE}$ or with a known net effect preserving the values $v_1$, $v_2$ of output-extension duplicate pairs in disguised form $w_1$, $w_2$, respectively.

This limitation can be overcome using the method described in §2.10.2.

2.9.2. Making OEs, IAs, and RPEs Obscure and Contextual. Having installed the basic structures of our interlocks according to §2.9.1, we must now obscure the interlock code, making it difficult to analyze and obscuring its functionality, and further adding to its resistance to tampering, and we must make the interlock code contextual, making it resemble the surrounding code.

For All Interlock Components. Our preferred method of achieving this is to apply the same method or methods of injecting tamper-resistance to both the code added to create the interlocks and to the other code in the vicinity of that code, with the intensity of tamper-resistance varied from a high level for the interlock code itself and code in its immediate vicinity, to decreasing intensities for code increasingly remote from the interlock code, until finally we reach the greater bulk of the SBE's code, which may remain unchanged, since it is sufficiently remote from the interlock code so that no special protection is required to protect the installed interlocks.

For the tamper-resistance methods in all of [2, 4, 5, 9, 19, 20], or their extensions in §2.7 and §2.8, the intensity of the protection can be varied from high to low by transforming a greater or lesser number of computations, a greater or lesser number of values, and by choosing transformations with higher or lower overheads and correspondingly higher or lower security. Analysis of such choices is provided by [5]. Such methods are applicable to all interlock components.

Additional tamper-resistance methods applicable to all interlock components can be obtained by combining any or all of [2, 4, 5, 9, 19, 20] or their extensions in §2.7 and §2.8 above with additional data and computation obfuscations obtained by adding any number of the identities disclosed or quoted in §2.5.3, or disclosed in §2.5.4, or generated by the methods in §2.5.1 or §2.5.2 to the identities employed to create the data and computation encodings of [2, 4, 5, 9, 19, 20], or the identities provided in the extension of [20] given in §2.7.7.

Alternatively, obfuscation of greater or lesser intensity can be obtained by performing larger or smaller numbers of substitutions of expressions in the code to be obfuscated, where the substitutions replace expressions by equivalent expressions according to the identities disclosed or quoted in §2.5.3, or disclosed in §2.5.5, or generated by the methods in §2.5.1 or §2.5.2 to the identities employed to create the data and computation encodings of [2, 4, 5, 9, 19, 20], or their extensions in §2.7 and §2.8. The number of such identities discoverable by such means grows so rapidly with the size of expressions that the supply of identities is virtually unlimited. Again, such obfuscation is applicable to all interlock components.

Tamper-resistance is preferred to mere obfuscation, however, since tamper-resistance implies obscurity but also chaotic behavior under fault-injection attacks and other code-modification attacks.

Such forms of obfuscation can be easily manipulated and extended by those familiar with the arts of compiler code transformation and of algebraic manipulations and derivations.

For Transfer IAs. If an attacker understands the control flow of a transfer IA, attacks on it are facilitated. Accordingly, we prefer to both obscure and render tamper-resistant such control flow among the BBs comprising a transfer IA, or in the BBs in their vicinity, using the method and system of [3], extended according to §2.7.3, possibly with overhead reduction according to §2.7.4, where resource constraints require such reduction, or applying the control-flow protections of [9], preferably with the improvements disclosed in §2.8.1.

2.10. Variations on the Interlocking Method. There are a number of variations on the basic system and method of interlocking taught above which greatly increase its utility and breadth of applicability by broadening the number of security properties which can be constructed in the form of interlocks. We provide a number of such variations below.

2.10.1. Merged Interlocks. Suppose we have interlocked preproduction BB set X via the intervening pretransfer BB set V to the preconsumption BB set Y, thereby converting X into the production BB set X', V into the transfer BB set V', and Y into the consumption BB set Y'.

Note that there is absolutely nothing preventing us from choosing a new preproduction BB set X, and taking Y' as a new preconsumption BB set Y=Y', and choosing an appropriate new pretransfer BB set V intervening between X and Y, and then interlocking X to Y, thereby converting X to production BB set X', V to transfer BB set V', and Y=Y' to consumption BB set Y'=Y''.

This extends from re-interlocking to Y twice to re-interlocking to Y repeatedly any number of times, so that we can interlock $X_1$ to Y, and then $X_2$ to Y', and then $X_3$ to Y'', and so on.

We call such successive interlocks interlocking repeatedly to the same part of the program merged interlocks.

2.10.2. Linked Interlocks and Interlock Chaining. The interlock chaining method we teach here is useful in any situation where it is useful to tie together by interlocking a chain of BB sets, where tampering at any point will cause subsequent failures throughout the chain, thereby frustrating any intentions which a hacker may have had for attempting to subvert purposes of the original code.

In addition, it can be used to circumvent the limitation of approaches (3) and (4) for the generation of IAs, which can only be employed only where data- and control-flow complexity in the pretransfer BB set V is low enough to permit predictable addition of computations without net effect on output-extension duplicate pairs produced by $F_{OE}$ or with a known net effect preserving the values $v_1, v_2$ of output-extension duplicate pairs in disguised form $w_1, w_2$, respectively.

When interlocks are chained by the method we teach below, we prefer to protect their chained control flow by rendering the control flow of all components of the chained interlocks (not just the BBs in the transfer IAs), and BBs in their immediate vicinity, both obscure and tamper-resistant, using the method and system of [3], extended according to §2.7.3, possibly with overhead reduction according to §2.7.4, where resource constraints require such reduction, or the control flow protection of the method and system of [9], preferably with the improvements disclosed in §2.8.1.

To chain interlocks together, we note that the relation of being interlocked may be rendered transitive, so that if X is interlocked to Y, and Y is interlocked to Z in a linked fashion described below, then X is effectively interlocked to Z.

To link of an interlock of X computing F to Y computing G and an interlock of Y computing G to Z computing H, we note that X is basically interlocked to Y by identities concerning pairs of values initially computed in an OE of F and then employed in an RPE of G computed by Z in such a fashion that tampering which causes the members of these pairs to differ will cause $G_{RPE}$ to fail to preserve the functionality of G; i.e., it will cause computation of $G_{RPE}$ to fail. To ensure transitivity of the interlock, then, we must duplicate pairs of values from $G_{RPE}$ to create a $G_{RPE:OE}$ such that the new duplicate pairs computed in $G_{RPE:OE}$ depend on the computations which fail in $G_{RPE}$ if the above-mentioned pairs differ—i.e., the new duplicate pairs are computed using both members of a pair received by the computation in such a fashion that, in the new $G_{RPE:OE}$ computation, the new outgoing pair will differ with high probability if the incoming pair differs. When this is done, failure in G' will trigger failure in H' once both interlocks—the X to Y and the Y to Z interlocks—are installed.

Thus to effect an interlock between X and Z, we may instead forge an interlock between X and Y and then interlock the resulting modified Y to Z by a linked interlock which is linked to the preceding X to Y interlock. This can be applied to any chain of interlocks: if in a sequence of BB sets $X_1, \ldots, X_k$, we can interlock $X_1$ to $X_k$ if we can create a linked interlock $X_i$ to $X_{i+1}$, for $i=1, \ldots, k-1$. There is nothing in the methods we describe for installing interlocks which prevents us from chaining linked interlocks in this fashion.

For example, if the BB set V between X and Y is too complex to be analyzed, we may instead break down the complex paths through V by interlocking intermediate stages in the paths from BB set X to BB set Y by linked interlocks, thereby bringing the level of data- and control-flow complexity of the pretransfer BB set down to a level where approaches (3) and (4) above become applicable.

2.10.3. Multiple Consumptions and Interlock Trees. Normally, in constructing a basic interlock as described in §2.4 through §2.9 above, there is one preconsumption BB set Y which will be modified to create the consumption BB set Y', where the preproduction BB set X, which will be modified to create the production BB set X', is a dominating set for BB set Y in the containing program. Hence there is one pretransfer BB set V containing the zero or more BBs on the paths between BBs in X and those in Y, which may or may not need to be modified into the transfer BB set V' during the installation of the interlock.

However, there is nothing forcing us to have only one such preconsumption BB set Y. We can have any number k of such BB sets $Y_1, \ldots, Y_k$, with any number of (possibly overlapping, possibly empty) corresponding pretransfer BB sets $V_1, \ldots, V_k$, so long as the conditions given at the beginning of §2.4.2 are met and the BB sets $Y_1, \ldots, Y_k$ do not overlap.

When interlock trees are created by the method we teach below, we prefer to protect their chained control flow by rendering the control flow of all components of the interlocks in the interlock tree (not just the BBs in the transfer IAs), and BBs in their immediate vicinity, both obscure and tamper-resistant, using the method and system of [3], extended according to §2.7.3, possibly with overhead reduction according to §2.7.4, where resource constraints require such reduction, or using the control flow protection afforded by the method and system of [9], preferably with the improvements disclosed in §2.8.1.

To install interlocks between X and each of $Y_1, \ldots, Y_k$, we create the OE $F_{OE}$ of F, the computation of X, in the normal fashion. Each of the RPEs $G_{RPE,1}, \ldots, G_{RPE,k}$ is also created in the normal fashion based on the duplicate values produced in $F_{OE}$.

One complication is that paths from X to $Y_i$ may overlap with the paths from X to $Y_j$ where $i \neq j$. In that case, it may be that the code in the overlapping BB sets and $V_i$ and $V_j$ has sufficiently simple control- and data-flow that approach (4) given above to the generation of the $R_{agg,i}$ computation in the modified $V_i$ and the generation of the $R_{agg,j}$ computation in the modified $V_j$ is straightforward. Otherwise, chaining can be applied to reduce the complexity, as described in §2.10.2, or approach (3) in which we construct the interlock without modifications to $V_i$ and $V_j$, can be used. When this approach is used, complexity of the pretransfer computation is permitted to be arbitrarily high, since its complexity has no effect on the difficulty of installing the interlock.

By combining this variant with the interlock chaining taught in §2.10.2, we can create trees of interlocked BB sets, allowing us to tie numerous program execution points together in an interlocked fashion.

2.10.4. Condition-Dependent Interlocking. There are a number of constructs in typical programming languages in which a conditional value is used to direct the flow of control during computation.

For example, using C- or C++-like code, in FIG. 4(a), control flows from U to V if c is true, and from U to W if c is false. In FIG. 4(b), control flows from U to $V_1$ if $i=v_1$, from U to $V_2$ if $i=v_2$, ..., from U to $V_k$ if $i=v_k$, and from U to W if $i \neq v_j$ for $j=1, \ldots, k$.

We can modify the interlocking variant in §2.10.3 to take advantage of such conditional control-flow and the associated condition as follows.

Using the identities of [2, 4, 5, 9, 19, 20], or those disclosed or quoted in §2.5.3, or those disclosed in §2.5.4, or those computable using the methods of §2.5.1 or §2.5.2, or the identities disclosed in §2.7.7, or any combination of these, we can easily create an OE for the computation F of a preproduction BB which computes a condition in such a fashion that there are duplicate pairs which are equal only if the condition is true, and other pairs which are equal only if the condition is false (e.g., so that $p=q$ and $q \neq r$ if c is true, and $p \neq q$ and $q=r$ if c is false). Suppose that control flows to BB set $Y_1$ when c is true and to $Y_2$ when c is false.

It is best not to do this starting with the conditions themselves, but rather to examine the data used to compute the values used to compute the conditions (or the values used to compute the values used to compute the conditions, and so on—the more levels of indirectness we add, the more secure, but the higher the overhead). For example, if the condition is "x<y" where we have prior assignments "x=4*a+(b & 1)" and "y=b+9-(a|0xFF)", then we could use the condition $$(4*a+(b\ \&\ 1)) < (b+9-(a|0xFF))$$

instead. (We call this process of moving the operands back towards prior computations while maintaining equivalence origin lifting, since we are 'lifting' the origin of the operands of a condition to an earlier computation, typically appearing higher on a page in a code listing.)

Then, in the preconsumption BB sets $Y_1$ and $Y_2$, we create an RPE for $Y_1$ which depends on the pairs such as p, q which match when c is true, and we create an RPE for $Y_2$ which depends on the pairs such as q, r which match when c is false. As a result, any attempt to interfere with the flow from X to $Y_1$ or $Y_2$ by subverting the normal effect of the condition c will fail with high probability.

Similarly, using the identities of [2, 4, 5, 9, 19, 20] or those disclosed or quoted in §2.5.3, or disclosed in §2.5.4, or those computable using the methods of §2.5.1 or §2.5.2, or the identities given in the extension of [20] given in §2.7.7, or any combination of these, we can easily create an OE for the computation F of a preproduction BB which computes an indexed condition such as i in FIG. 4a in such a fashion that there are duplicate pairs which are equal only when the index value is a particular constant, or only when it is not any of the particular constant, and use these to interlock U (see FIG. 4(b)) to $V_i$ so that, if $V_i$ is executed, it uses pairs dependent on having $i=v_i$, for $i=1, \ldots, k$, and interlocking U to Z so that it uses pairs dependent on having $i \neq v_j$ for $j=1, \ldots, k$. As a result, any attempt to interfere with the flow from U to $V_1, \ldots, V_k$ or W by subverting the normal effect of the index condition i will fail.

2.10.5. Condition-Dependent Merging. In §2.10.4 above, we disclosed a method for protecting a branch against attacks such as branch jamming or other methods of subverting the normal flow of control by tampering. In that disclosed method, the branch continues to exist, but execution will fail with high probability if its control-flow is subjected to tampering.

We now disclose a variant of this approach in which the branch is removed, and the code present at the possible destinations of the branch are merged together.

In the method of §2.10.4 above, we create code at the various destinations which functions properly only when the value-matches created by the original condition reach the code in the branch destinations without being altered by tampering. (Matching, i.e., equality, is preferred, but other relationships may also be used.)

When a conditional binary branch occurs, as in the if-statement of FIG. 4(a), the condition c, typically computed using values provided in U, controls which of V or W is executed. This in turn affects values which are used in Z and thereafter. Thus the effect of the if-statement is ultimately to determine an effect on the state of the variables of the program as seen by Z and its sequel. If we can produce that same conditional effect without making V and W strictly alternative to one another, we can produce the effect of the if-statement without the conditional branch controlled by c.

When conditional indexed multi-way branching occurs as in FIG. 4(b), the conditional index i, typically computed using values provided in U, controls which of $V_1$ or $V_2$ or ... or $V_k$ or W is executed. This in turn affects values which are used in Z and thereafter. Thus the effect of the switch-statement is ultimately to determine an effect on the state of the variables of the program as seen by Z and its sequel. If we can produce that same conditional effect without making $V_1, \ldots, V_k$, W strictly alternative to one another, we can produce the effect of the switch-statement without the conditional indexed branch controlled by i.

Two Occupied Alternatives. First, we describe the method the case of two alternatives, as in an if-statement in C or C++ in which both alternatives contain computations, as in FIG. 4(a).

In §2.5.3 we disclose certain methods, and quote others, for converting conditions into the value 1 for true and the value 0 for false, or alternatively, into the value 1 (all 1-bits, signed or unsigned)=−1 (signed) for true and the value 0 for false.

Once this is achieved, we can easily combine computations so that, in effect, computations to be performed if a condition holds are retained by multiplying with 1 when the condition is true, or suppressed (zeroed) by multiplying with 0 when the condition is false, or alternatively, are retained by ∧ with $\vec{1}$ (all 1-bits) when the condition is true and are suppressed (zeroed) by ∧ with $\vec{0}$ (all 0-bits) when the condition is false. At the end of the computation, we select the retained results by taking the two alternative results, one of which has is normal value when the above method is applied, and one of which has been zeroed by applying the above method, and combining them using +, ∨, or ⊕, so that we end up with a single result which is correct for the state of the condition choosing which alternative set of results should be produced.

Three or More Occupied Alternatives. We now describe the method the case of more than two alternatives, each of which contains code, as in a switch-statement in C or C++ in which each alternative contains computations, as in FIG. 4(b).

In §2.5.3 we disclose some methods, and quote others, for converting conditions into the value 1 for true and the value 0 for false, or alternatively, into the value $\vec{1}$(all 1-bits, signed or unsigned)=−1 (signed) for true and the value 0 for false.

In the method given above, we either retain computations corresponding to truth of the controlling condition c and suppress those corresponding to falsity of c, or we suppress computations corresponding to truth of the controlling condition c and retain those corresponding to the falsity of c. Plainly, this is equivalent to having two condition, $c_1$ and $c_2$, where we have $c_1$ iff c=true and $c_2$ iff c=false. Then we retain the computations of V if $c_1$ is true and suppress the computations of V if $c_1$ is false, and we retain the computations of W if $c_2$ is true and suppress the computations of W if $c_2$ is false. Add the end, we combine the corresponding values using ∨, ⊕, or +, with the result that only the retained computations are seen in Z and thereafter.

To handle three or more alternatives, we proceed according to the method in the above paragraph, but with the following change: we have as many conditions as are needed to handle the multi-way choice which would, prior to our merging operation, be performed by branching. That is, we have $c_j$ iff $i=v_j$ for j=1, ..., k, and we have $C_{k+1}$ iff ($i \neq v_1$) and ... and ($i \neq v_k$). The one-bit or all-bits representation of any such condition can be computed as discussed in §2.5.3 and §2.5.4. We note that exactly one of $c_1, \ldots, c_{k+1}$ is true and all the rest are false. We can thus retain one of the computation results of one of $V_1, \ldots, V_k$, W, and suppress all of the computation results of the remainder of $V_1, \ldots, V_k$, W. Then we need only take each group of corresponding results for a particular value (say, $r_1, \ldots, r_{k+1}$) and combine them using ∨, ⊕, or +; i.e., by computing $r_1 \vee \ldots \vee r_{k+1}$ or $r_1 \oplus \ldots \oplus r_{k+1}$ or $r_1 + \ldots + r_{k+1}$, and since there is only one of the $r_i$'s, say $r_j$, which is retained, the result is to produce the result of the single retained set of computations while eliminating any results from the k suppressed sets of computations.

In C or C++, alternative conditions may take a more complex form than shown in FIG. 4(b). It is permitted to have multiple case-labels, one after another, so that for a particular $V_j$, the condition selecting execution of $V_j$ is $(i=v_{j,1}) \vee (i=v_{j,2}) \vee \ldots \vee (i=v_{j,m})$, say. Such a condition is easily handled by replacing the computation for the condition $i=v_j$ with the computation for that more complex condition, employing the methods disclosed or quoted in §2.5.3 or disclosed in §2.5.4. Once this is done, retaining and suppressing by means of the condition are handled just as for the simpler conditions previously discussed.

Two Alternatives: One Empty. We may also have an if-statement such as that in FIG. 5(a), which is similar to that in FIG. 4(a) except that the else alternative is empty. In FIG. 5A, there is illustrated pseudo-code for a conditional if statement with no else-code (i.e. an if statement which either executes the then-code or executes no code).

As for two occupied alternatives, discussed above, we make use of methods disclosed or quoted in §2.5.3 for converting conditions into the value 1 for true and the value 0 for false, or alternatively, into the value $\vec{1}$ (all 1-bits, signed or unsigned)=−1 (signed) for true and the value $\vec{0}$(all 0-bits) for false.

We proceed much as we did for two occupied alternatives above, but with this difference: for two occupied alternatives, we retain values from V and suppress values from W when c is true, and we suppress values from V and retain values from W when c is false, whereas for only one occupied alternative, we retain new values computed in V and suppress the old values imported from U (whether computed in U itself or prior to execution of U) when c is true, and we suppress the new values computed in V and retain the old values imported from U when c is false.

Three or More Alternatives: Some Empty. This situation, illustrated in FIG. 5(b), is similar to that illustrated in FIG. 4(b), except that not all alternatives are occupied. FIG. 5B shows pseudo-code for a statement analogous to that in FIG. 5A but where the choice among alternatives which have code and those which have no code is made by indexed selection (i.e. by the use of a switch statement with multiple alternatives) rather than by a boolean (true or false) choice as was the case with the if statement in FIG. 5A.

Again, the way we handle this, is to convert the controlling conditions for the occupied alternatives into Boolean form, and to find an one-bit or all-bits Boolean representation for the value of the condition. At most one of these conditions can be true for a given execution of the multi-way conditional. Unlike the situation when all alternatives are occupied, however, some of the alternatives are unoccupied, which implies that in the case that such an alternative would be selected, instead of having a value computed by one of the occupied alternative code choices, we would have values computed in or before the execution of U.

To handle this situation, we create one further condition, which is true precisely when all of the conditions for the occupied alternatives are false. When this condition is true, we retain the results of the computations imported from U (either computed in U or computed before U).

Since, including this further condition, exactly one of the above-mentioned conditions is true, and all of the rest are false, we retain the results corresponding to the selection of the alternative in the original program, and suppress those which, in the original program, would never have been evaluated. The result is that when Z is reached after execution of the multi-way choice merged as described herein, the state of the values seen by Z is precisely as if the original computation had been performed, whether the selection corresponded to an occupied or an unoccupied alternative of the multi-way choice.

2.10.6. Distributed and Segmented Interlocking. In some cases, a pretransfer computation may perform a computation which consumes considerable computing time or computing space, and we may wish to distribute the work among computers in a network. In that situation, we may perform the pretransfer computation on a server, with jobs packaged and transmitted to the server by the preproduction computation on a client, and the results of the pretransfer computation received and unpackaged by a the same client or a different client performing the preconsumption computation.

In that case, we could create an interlock to convert the preproduction computation into aproduction computation which packages a job for the server transfer computation, with the results received, unpackaged, and interpreted by a consumption computation on the same or a different client. The interlock is structured almost in the normal way, but a buffer containing many values is transmitted by the production client to the transfer server, and a buffer containing many values is transmitted by the transfer server to the consumption client. That is, what would be transmitted by being part of the state of a process in the normal, single-site form of an interlock, is instead employed as an image of the relevant part of the production state occupying a buffer, which then is received by a transfer server, which uses the buffer as an image of part of the starting transfer state, performs its transfer computation, places an image of the relevant part of the final transfer state in a buffer, which is then transmitted to the consumption client, which interprets the image in the buffer as part of the initial consumption state.

Such an interlock from a production client to a transfer server to a consumption client—possibly on the same computer in the network as the production client—is a distributed interlock.

The transfer portion of the interlock is an interlock segment with the relational structure shown in FIG. 1. Similarly, the production and consumption portions of such a distributed interlock are interlock segments.

There are other situations where distribution may be useful. For example, it may be that there is no pretransfer computation, and all of the activity is in the preproduction and preconsumption portions of the computation. An example would be the code implementing the sending and receiving portions of a messaging mechanism on computers in a network, where for any given message, one computer does the sending and another does the receiving. To protect this messaging mechanism, we interlock the sender (preproduction) computation and the receiver (preconsumption), with an empty (identity-function—makes no data changes) pretransfer computation. This protects the messages by encoding them and ensures that tampering with the sending or receiving mechanisms will almost certainly fail due to tampering in a fashion which will frustrate any stealthy hopes that an attacker had for the results of such tampering. Such interlocking installs in the two ends of the communication a stealthy and tamper-resistant built-in authentication mechanism which is very difficult for an attacker to subvert by message spoofing, or (with appropriate message contents) by replay or other communications-based attacks, and at the same time protects message contents by transmitting them in encoded form due to the application of transforms inherent to the process of installing such an interlock.

Making Image Messages Among Segments Tamper-Resistant. When the segments of a computation are part of a distributed interlock, the communications among the network nodes holding the segments are typically exposed on the network (e.g., on an Ethernet or a local radio network). It is therefore important to provide effective protection for the data images transferred among segments.

In addition to, or in place of, the protections which we would normally apply for non-distributed computations, we prefer to protect such inter-segment data image messages by encoding them as memory arrays according to [16], with the improvements thereto taught in §2.7.2, so that an image of the memory array is transmitted from the sender to the recipient, the sender prepares the data in mass-data-encoded form, and the recipient employs the data in mass-data-encoded form. If the memory images are arrays, we could alternatively employ the array protections of [9] with the improvements thereto disclosed herein in §2.8.1, or, if the code accessing the arrays is rich in loops (express or implied), we could employ the array protections of [27].

In addition to, or in place of, the above mass-data-encoded communication, the image (mass-data-encoded or otherwise) of the transmitted data may be encrypted by the sender and decrypted by the recipient using white box cryptographic methods according to [17, 18], with the improvements taught in §2.7.5, which provides a cryptographic level of protection for the transmission of data images among distributed segments.

Both the mass-data-encoding and encryption protections above have the desirable property of tamper-resistance, rather than mere obscurity, since any modifications to mass-data-encoded data, or the code accessing such data, or encrypted data, or white-box encryption or decryption code, produces chaotic, rather than purposeful, results with high probability, thus frustrating any goals an attacker might have for such tampering.

2.10.7. Ensuring Dynamic Randomness. In §2.9.1, the section entitled Case 1: Absent or Weak X→Y Data Dependency describes a method by which, in an interlock, the data dependency of Y on results produced in X can be increased by encoding data values in Y using values produced in X as coefficients.

Suppose we want to cause the behavior of Y to vary in an apparently random, unrepeatable fashion, so that an attacker's ability to repeatedly observe behaviors mediated by Y are compromised by apparently chaotic variations in the computations at Y.

We choose an X BB set which is a source of entropy, either because it has access to the program's inputs, from which we can compute a strong—perhaps cryptographically strong—hash, so that every small variation in the input drastically modifies the hash, or because it reads one or more effectively random sources such as the low-order bits of a high-speed hardware real-time clock or a randomness generation device which uses an unstable electronic process to produce 'noise' and convert it to a (genuinely) random bit stream.

We then interlock X to Y so that Y', the resulting modified Y, is dependent on the values produced in X, including those depending on their entropy source, and create a data dependency from X' to Y' so that executions of Y' vary randomly according to the entropy obtained in X', using the method disclosed for creating such data dependencies in Case 1: Absent or Weak X→Y Data Dependency.

Due to the method disclosed in §2.10.1, we can, if we wish, do this quite independently of any other interlocking in the program; i.e., we can add dynamic randomness to the execution of any part of the program where it is desired, irrespective of any other interlocking present in the program.

2.10.8. Ensuring Variable-Dependence. We can ensure variable-dependence (the dependence of the data in the computations of the consumption BB set on the values of variables in the production BB using the method given in §2.10.7 with the modification that the X BB set need not be an entropy source, so that none of the values from them need carry entropy.

2.10.9. Interlocks with Hardware Components. In the section above entitled Software Entities and Components, and Circuits as Software, we noted that a circuit may be a software entity because it is expressible as a program written in a circuit-description programming language such as VHDL.

It follows that we may install an interlock between a preproduction BB set comprising one or more hardware circuits having a high-level description in VHDL or some similar programming language, and a preconsumption BB set also comprising one or more hardware circuits with a high-level description in VHDL or a VHDL-like language.

Installing the interlock will change the preproduction set into the production set by modifying its VHDL or VHDL-like description much as it would be modified in the case of an ordinary programming language, thereby modifying the corresponding circuit created from the VHDL or VHDL-like description.

Similarly, installing the interlock will change the preconsumption set into the consumption set by modifying its VHDL or VHDL-like description much as it would be modified in the case of an ordinary programming language, thereby modifying the corresponding circuit created from the VHDL or VHDL-like description.

Along similar lines, we may interlock a circuit or circuits as a preproduction BB set to software or firmware code as a preconsumption BB set, or interlock software of firmware code as a preproduction BB set to a circuit or circuits as a preconsumption BB set. In addition, the pretransfer software may be, or may include, a circuit or circuits describable in VHDL or a VHDL-like language.

In each case, the process of interlocking affects the hardware circuit by modifying it via modifications to its descriptive software in VHDL or a VHDL-like language. Specifically, a circuit or circuits comprising a preproduction BB set is transformed into an encoded output extension (OE) of its original functionality; a circuit or circuits comprising a pretransfer BB set is transformed into an encoded intervening aggregation (IA) of its original functionality with some bijection transferring extended information from its inputs to its outputs; and a circuit or circuits comprising a preconsumption BB set is transformed into an encoded reverse partial evaluation (RPE) of its original functionality.

2.11. Exemplary Applications of Interlocking to Meet Specific Needs. We now turn our attention to ways of applying the above teachings to particular applications of interlocking which secure specific behaviors within an sbe, or to meet specific security requirements.

2.11.1. History Dependence. Suppose BBs $y_1, \ldots, y_n$ in a program is reached only via branches from BBs $x_1, \ldots, x_m$. An attacker might modify the program so that some other BBs, say $w_1, \ldots, w_k$, distinct from $x_1, \ldots, x_m$, can branch to some or all of $y_1, \ldots, y_n$—let us call such attacker-added branches foreign branches.

If we wish to ensure that foreign branches to $y_1, \ldots, y_n$ cannot succeed, we choose $X=\{x_1, \ldots, x_m\}$ as our preproduction BB set, $Y=\{y_1, \ldots, y_n\}$ as our preconsumption BB set, and Ø (the empty set) as our pretransfer BB set, and install an interlock from X to Y according to the general method of the instant invention.

As a consequence of this, the foreign branches will induce chaotic behavior or failure.

Thus installing such an interlock renders execution history dependent: the affected software refuses to execute normally unless, in its execution history, execution of a member of X immediately precedes execution of a member of Y.

2.11.2. Integrity Verification by Checksumming. A common technique to prevent software tampering is some variant of code checksumming: we treat the code as data, and treating parts of the code as arrays of integer words (or bytes), we compute a checksum of the arrays, with either a single checksum or a combined checksum, or both individual and combined checksums. This can be done initially, to verify that the loaded image matches what was in the load file, or subsequently at periodic intervals, to verify that the code of the program is not being modified by tampering.

The most secure kinds of such checksums are computed using a cryptographically strong hash: a hash function which has the property that, given a value for the checksum, it is very difficult to find an array of integers, or modifications to an array of integers, which will cause the checksum to have that value. Examples of algorithms for computing such checksums are MD5 [13] and SHA-1 [14].

Unfortunately, this kind of defense against software modifications suffers from two very serious weaknesses.

(1) An attacker can modify the code without triggering a failure due to checksum mismatch if the attacker can modify the code so that checksum mismatch does not trigger failure. That is, rather than trying to solve the potentially difficult problem of how to modify the code while preserving the checksum, the attacker may simply subvert the result of the mismatch by performing a small change, such as 'jamming' the branch taken on a failure condition (i.e., replacing that conditional branch with an unconditional branch) so that the failure branch never occurs irrespective of whether the checksum matches or not.

The attacker is aided in locating such checksum-verifying code, and hence the code site at which branch 'jamming' will prevent a failure response, by the fact that checksum algorithms, whether simple ones of low security, or more secure ones such as MD5 [13] and SHA-1 [14], are well known and hence recognizable.

(2) When executing modern software on modern operating systems, it is unusual for a program to be modified once it has been loaded: a program typically performs its entire job with a single, static body of code, residing in memory whose access control-bits are set by the operating system to a read-only state.

This code stability makes possible the form of attack described in [29]. In this attack, the software image is simply duplicated. Many modern processors distinguish code accesses from data accesses. (In part, this is done to allow an increased addressing capability without lengthening the address fields in instructions, since it permits the same address to refer to different locations, depending on whether it is fetched/stored as data—data access—or fetched as an instruction—execute access.) One of the duplicates is the modification code, with which the attacker may tamper, and the other is the original code, which is accessed by the software for checksumming purposes. Thus the intent of the software's authors that self-checksumming of the software by the software should prevent tampering, is entirely defeated, since the fact that the original code—which is not executed—is unmodified in no way protects the modification code—which is executed—with which the attacker may tamper at will.

This attack has surprisingly low overhead and is quite easy for an operating system expert to perform.

Weakness (Error! Reference source not found.) above can be addressed by the method given in §2.10.4. The preproduction BB set (normally just one BB) computes and checks the checksum; the check of the checksum controls a conditional branch to the checksum-success or checksum-failure destination; the BB sets (normally just one BB each) at the destination of the conditional branch are preconsumption BBs, and the condition is checksum matching or failure to match. Installing such a condition-dependent interlock causes execution to fail if an attacker modifies the checksum checking code (e.g., by jamming the branch).

Weakness (Error! Reference source not found.) is more difficult to manage. Recent commercial operating system releases make it increasingly awkward to modify code in a program. Under this trend, an attacker performing the kind of code-image attack described in [29] would generally have the computer under complete control running an operating system under the control of the attacker. For example, this would certainly be feasible with open-source operating systems such as Linux, Hurd, or Open-BSD.

One approach is to divide the program to be protected into regions. Code in the current region (the region into which the program counter points) must be executable, but code in other regions need not be. We can take advantage of this fact to modify the image of the program prior to region-to-region transfers. Just before control transfers from region M to region N, the exit-code for region M modifies the code of M into an unexecutable state (except for the exit-code itself) and modifies the code of N into an executable state. This modification need not be large: a few bytes here and there are quite sufficient, if they are located strategically (e.g., if they form part of the code in the production BB set of an interlock, so that any small change causes failure). The program code has at least one state per region, in which that region is executable and others are not, and hence at least one checksum per state and hence per region. Checksum code executed in a given region uses the checksum appropriate for that region.

This shuts down the attack noted in (Error! Reference source not found.) above, since the changes performed in the code must be performed on the code image which is actually executed: if it is not, then transferring into a new region will enter code which is in a non-executable state, and execution will fail, thus preventing any further progress by the attacker.

A refinement is to employ multiple non-executable states and choose among them randomly (e.g., by selecting among them using the low-order bits of a real-time clock or process identifier or the like) or pseudo-randomly (e.g., by employing entropy from the inputs of the program to produce a hash and then employing the low-order bits of that hash to select among them). This increases the difficulty for the attacker in attempting to determine how to defeat such protections.

However, code which performs the code-state change during region transfer is likely to be obvious since it will use special instructions or system calls to achieve the change. In order to prevent the removal of protections, the final step is to interlock the computations which perform the state change with those which perform the next checksum check, and to perform interlock chaining among such code-state changes and checks. Then modifications to either the code-state changes or the code-state checks will cause chaotic behavior with high probability, thus frustrating any specific goals the attacker may have for behavioral changes to the code.

2.11.3. Hiding Information in Complex Data Structures. Suppose we wish to hide a secret datum (piece of information) from an attacker. We review the previously discussed methods for hiding it, and then disclose an alternative, powerful method which handles static and dynamic constants (a dynamic constant being computed at run-time but does not change after it is computed), whether small or large, and also non-constant pieces of data, whether small or large.

Previously Disclosed Data Hiding Methods. If the datum is relatively small and a static or dynamic constant, we may use the method taught in §2.6, or the methods of [2, 4, 5, 19, 20] or their extensions disclosed herein in §2.7 and §2.8, or we may substitute expressions using the datum, and expressions in the vicinity of those uses, according to identities disclosed or quoted in §2.5.3, or disclosed in §2.5.4, or discovered by the methods disclosed in §2.5.1 or §2.5.2.

If the datum is large and a static or dynamic constant, we may use the method in §2.6 where we produce the large constant in segments, each treated as a separate small constant.

If the datum is not necessarily constant, but is small, we may hide it by employing the methods of [2, 4, 5, 9, 19, 20] or their extensions listed in §2.7 and §2.8, or we may substitute expressions using the values, and expressions in the vicinity of those uses, according to identities disclosed or quoted in §2.5.3, or disclosed in §2.5.4, or discovered by the methods disclosed in §2.5.1 or §2.5.2.

If the datum is not necessarily constant, and is large, we could use the same methods as in the previous paragraph, but applied to small values as 'segments' of the entire value. Alternatively, we could employ the method of [16], or its extension as disclosed in §2.7.2, or, if it takes the form of an array, the array protections of [9], with the improvements disclosed herein in §2.8.1, or, if the datum is an array and the code accessing it is rich in looping—express or implied—it could be protected using the method of [27].

The Complex Data Structures Method. There is a powerful alternative which can hide a static or dynamic constant datum, whether large or small, and also a dynamically varying datum (a variable or particular collection of variables), whether large or small.

Consider a complex data structure, consisting of a series of data-segments, where each data-segment contains some combination of scalar variables, arrays of scalar variables, pointers to other such data-segments, and arrays of pointers to other data-segments, in which the data-segments are linked together so that, regarding each segment as a node, and pointers as defining arcs, the structure is a directed graph, most nodes have an out-degree greater than one, most nodes have an in-degree greater than one, and for most pairs of nodes, there is more than one path from that node to another node. We choose one of the nodes (data segments) to be the distinguished start node.

Such a data structure can be implemented in the C or C++ programming languages or their allies as a series of structures (i.e., each is a structure in C or C++), containing scalar variables, arrays of scalar variables, pointer variables, and arrays of pointer variables), where the pointers are initialized either at program startup or at some subsequent time prior to their use as noted above for hiding a datum of some size. Alternatively, the structures can be dynamically allocated using the malloc( ) function or one of its allies in C or using the new operator in C++. Finally, we could employ an array of struct variables, whether declared as an array or allocated using malloc( ) or calloc( ) in C or the new[ ] operator in C++, and replace the pointer variables with array indices (which would restrict the data segments all to the same internal layout), or we could combine the array method with the multi-linked, pointer-based forms above.

We regard the above multi-linked (whether by pointers or by indices or by both) data structure, whether statically allocated, or declared in the body of a routine, or allocated dynamically using malloc( ) in C, or new and/or new[ ] in C++, as a repository—where each scalar variable in the repository stores a scalar value.

Then we hide information in the repository by using two methods, both based on the data-hiding method of §2.6. The first method determines how we address a particular piece of data which is, or is an element of, the datum we are hiding. The second determines how that particular piece of data is stored (i.e., how it is encoded).

A path in the repository comprises a sequence of values, where the values signify a series of scalar or pointer accesses. For example, we might assign numbers $1, \ldots, 64$ to denote the first through $64^{th}$ scalar data fields in a struct (or elements, in an array), $65, \ldots, 128$ to denote the first through $64^{th}$ pointer fields (or elements, in an array), $129, \ldots, 192$ to denote the first through $64^{th}$ scalar array fields, $193, \ldots, 255$ to denote the first through $63^{rd}$ pointer array fields, and 0 to denote the end of the path. All of these values can be stored in an (unsigned) eight-bit byte. Thus a path from the root data structure can be indicated by a string of bytes ending in a zero byte—just as a string is normally represented in C.

For example, suppose to find a particular scalar value, we begin at the root struct, follow the pointer in the $3^{rd}$ pointer field, which leads to another struct, select the $2^{nd}$ pointer array, index to the $9^{th}$ pointer in the array, follow that pointer to another struct, and then select the $8^{th}$ scalar data field. Then its path is represented by the byte-vector (67,194,73,8,0).

Many other forms of path-encodings are possible, as will be obvious from the above to anyone skilled in the art of compiler-construction and the implementation of data-structure accesses of various kinds for compiled languages such as C or C++. Moreover, construction of code which interprets such an encoded path so as to access the target value of the path is likewise straightforward for anyone skilled in the art of compiler-construction.

Such a path is eminently suitable for concealment according to the constant-hiding method of §2.6. Moreover, §2.6 also discloses a method for ensuring that the constant path is a dynamic constant (see the section above entitled Adding Dynamic Randomness); i.e., it is not predictable, at program startup—or at repository startup if the repository is transient—exactly which path will apply to a particular scalar stored in the repository: its path will vary among program runs, and among instantiations of the repository within a program run if the repository is transitory.

Normally the path ends at a scalar or a scalar array. The instant complex data structure method is not much help in concealing pointers, because a pointer must be in unencoded form to be used. However, using the data-encoding methods of [2, 4, 5, 9, 20] or their extensions disclosed herein in §2.7 and §2.8, by encoding both values and the code using them, we can employ encoded values without decoding them, so the instant complex data structure method is well-suited to the protection of scalar data.

We can protect pointers as well as values if we store the linked data structures in an encoded software memory array according to the method and system of [16] or its extension taught in §2.7.2. Pointers according to [16] or its extension are encoded integer values which are both fetched and stored without immediate decoding, so pointers, thus treated as special values, are fully protected. In addition, the protections of [16] or its extension taught in §2.7.2 permit us to reduce the complexity of the concealing storage structures stored in the software memory array since the encoded software memory array itself provides substantial protection.

Alternatively, if the code accessing the data structures is rich in loops—express or implied—we may represent pointers as obscure and time-varying vectors of indices as taught in [27], thereby concealing them.

In order to protect the scalar data when it is being stored, or fetched, or fetched and used immediately in computations, we store data in encoded forms and use the above-mentioned data and computation encoding methods to conceal the values stored, fetched, or fetched and immediately used in computation as disclosed in [2, 4, 5, 9, 19, 20] or in the extensions of these disclosed herein in §2.7 and §2.8.

These above-mentioned methods employ (static or dynamic) constant coefficients to distinguish among the various members of a family of encodings. For example, using the encodings of [20], any particular encoding is determined by its two coefficients: its scale, which should be odd, and its bias, which is unrestricted.

Again, we can represent all of the encodings for all scalar locations in the repository by their coefficients. We could also go one step further, and use further constant values to identify the family of encodings to which particular coefficients belong. If we do not take this further step, then each repository datum is identified with a specific family of encodings, and we only need its coefficients to disambiguate it.

We hide the constant vector of coefficients, or of family identifiers and coefficients, using the method of §2.6. These constants can either be static or can be made dynamic using the method given in §2.6 in the part entitled Adding Dynamic Randomness and detailed in §2.10.7; their representations can be made dependent on data from other parts or the program using the method taught in §2.10.8. The dynamically random or variable-dependent representations incur greater overheads but provide more security, and are therefore recommended where resource considerations permit.

Use of either or both of the methods of §2.10.7 or §2.10.8 converts this data concealment method into an interlock, which we recommend for security reasons where feasible.

2.11.4. Binding Applications to Shared Libraries. When an application is linked together from various object code files, it often will import code for library routines which implement functionality common to many different applications.

Interlocking within library code, where all components are within the library code itself, is just ordinary interlocking. There are variations, however, when some interlock components are in the library and others are in applications to which library code may be subsequently linked.

It may be that the functionality obtained by linking to library code requires behavioral protection via interlocking—e.g., to ensure that the correct library routine is called, rather than having its call omitted or diverted to some other routine, or to ensure that, on exit from the library routine, control is returned to the code following the call at the expected call site, rather than being diverted elsewhere.

The difficulty is that library code, in a fixed and often simultaneously sharable piece of code usable by multiple processes on a given platform, such as a dynamically-accessed* shared object (a .so—shared object—file for Unix™ or Linux platforms; a .dll—dynamically linked library—file for Windows™ platforms) cannot be modified in order to install an interlock. [*For example, on Windows™ platforms, a given group of library routines may be mapped into an application's address space at some time by a call to LoadLibrary( . . . ), routines in it may be accessed using GetProcAddress( . . . ), and after the application is finished with the group of routines, the group may be removed from the address space by calling FreeLibrary( . . . ).]

Interlocking from Library Code to Caller Code. Interlocking from a set X of BBs in the library code to the variable set Y of BBs in the application using the library code is straightforward: we convert the preproduction code into production code computing an integral OE in the usual way, we let the IA be the identity IA—no modifications or transfer code required—and we modify the preconsumption code receiving information from the library into the consumption RPE in the usual way. Encoding is applied to form X' and Y' in the usual way. The only difference is that information about X's OE and the X' encoding must be saved so that it can be used in preparing the code for Y's RPE and the Y' encoding for each of the calling application using the library code.

Interlocking from Caller Code to Library Code. It is the reverse form of interlocking, from a set X of preproduction BBs in the application employing the library code to a set Y of preconsumption BBs in the called library code which presents the problem, since the library code is created in advance without detailed knowledge of the calling application.

When the code for a library routine is generated, we cannot know details of the context in which the call is made. What we do know, however, are details of the arguments passed to the library routine's API—not the values of the arguments, but their types, their formats, and any constraints which they must obey to be legitimate arguments to the library callee. Thus we are equipped with certain pieces of information about every possible calling context: those specifically concerned with the above-mentioned aspects of argument-passing.

We are thus in a position to symbolically generate code for a generic caller—the code in the generic preproducer BB set X, say—prior to establishing the interlock to the Y preconsumption BB set in the library callee.

We then interlock the generic caller BB set X to the actual library callee BB set Y, creating X's OE and Y's RPE, and encoding these into X' and Y' and establishing an interlock from the generic caller to the actual library callee. As above in interlocking from library code to caller code, we let the IA be the identity IA—no modifications or transfer code required.

Then to interlock from an actual caller's X BB set performing a call to the library Y BB set (where the library actually contains code for the encoded post-interlock BB set Y'), we simply line up the OE of BB set X with that of X—which is always possible since X contains only the generic code common to all callers—and encode X and its OE into X' exactly as X' was encoded—again, always possible, since only generic code common to all callers is involved.

It is possible that insufficient dependency would exist from caller to called library code as a result of the above approach, due to a small number of simple arguments. In that case, the solution is, prior to establishing the generic interlock above, to add more arguments and/or make the arguments more complex, thereby creating a situation that, despite the generic nature of the interlocking code in this case, the dependencies from caller to library callee will be sufficient to create a secure interlock.

Thus separating functionality into sharable libraries is no barrier to interlocking, even where interlocking must cross library boundaries, whether dynamic or otherwise, and whether from library callee to caller or from caller to library callee.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Figure 6:
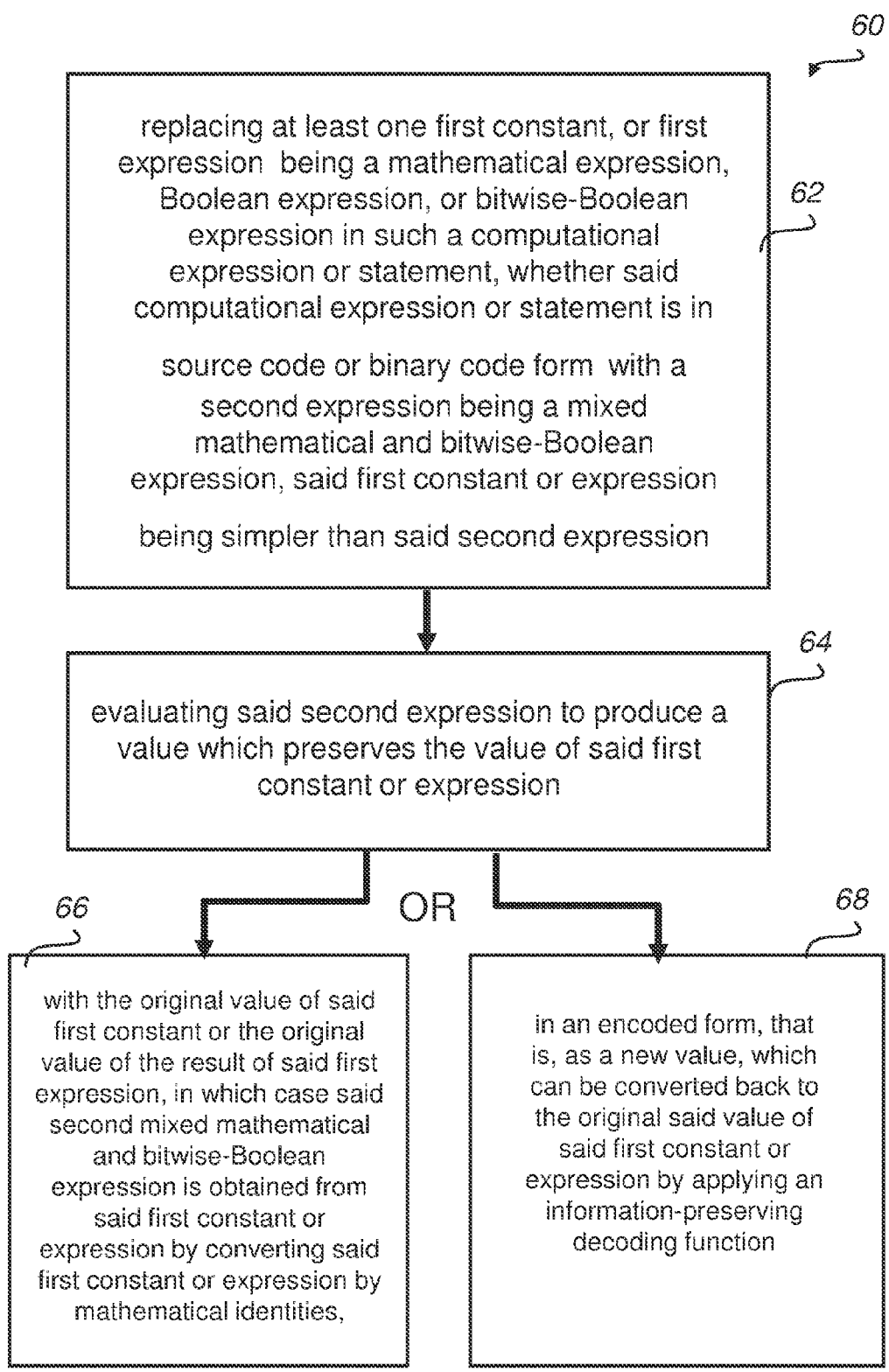
FIG. 6 illustrates in a flow chart a method in accordance with an embodiment of the present invention.

Referring to FIG. 6, there is illustrated, in a flow chart, a method in accordance with an embodiment of the present invention. The method 60 provides for rendering a software program resistant to reverse engineering analysis, whereby existing methods are based on substituting, modifying, or encoding computational expressions or statements, whether the computational expressions or statements themselves are to be protected, or the computational expressions or statements are used to render control flow obscure or tamper-resistant, or the computational expressions or statements are used to render data addressing obscure or tamper-resistant, or the computational expressions or statements are used to render accesses to large bodies of data obscure or tamper-resistant, or the computational expressions or statements are used for some combination of the previously-listed purposes (computation protection, control-flow protection, data-addressing-protection, or protection of accesses to large bodies of data). The method comprises the steps of:

a) replacing 62 at least one first constant, mathematical expression, Boolean expression, or bitwise-Boolean expression in such a computational expression or statement, whether said computational expression or statement is in source code or binary code form, of said software program, with a second mixed mathematical and bitwise-Boolean expression, said first constant or expression being simpler than said second expression and said second expression being based on the value or the variables found in said first expression, wherein b) evaluating 64 said second mixed mathematical and bitwise-Boolean expression produces a value which preserves the value of said first constant or expression, either:

c) with the original value 66 of said first constant or the original value of the result of said first expression, in which case said second mixed mathematical and bitwise-Boolean expression is obtained from said first constant or expression by converting said first constant or expression by mathematical identities, or, d) in an encoded form 68, that is, as a new value, which can be converted back to the original said value of said first constant or expression by applying an information-preserving (that is, bijective) decoding function, in which case said second mixed mathematical and bitwise-Boolean expression is obtained from said first constant or expression by modifying said first constant expression by a combination of conversion according to mathematical identities and transformation according to an information preserving (that is, bijective) encoding function.

A person understanding this invention may now conceive of alternative structures and embodiments or variations of the above all of which are intended to fall within the scope of the invention as defined in the claims that follow.

What is claimed is:

1. An automated method for rendering a software program resistant to reverse engineering analysis, whereby existing methods are based on substituting, modifying, or encoding computational expressions or statements, in any one of the following application: the computational expressions or statements themselves to be protected, the computational expressions or statements being used to render control flow obscure or tamper-resistant, the computational expressions or statements being used to render data addressing obscure or tamper-resistant, the computational expressions or statements being used to render accesses to large bodies of data obscure or tamper-resistant, or the computational expressions or statements being used for some combination computation protection, control-flow protection, data-addressing-protection, or protection of accesses to large bodies of data, the method comprising:

replacing at least one first constant or first expression in such a computational expression or statement, whether said computational expression or statement is in source code or binary code form, of said software program, with a second expression, said first expression being a mathematical expression, a Boolean expression, or a bitwise-Boolean expression, said second expression being a mixed mathematical and bitwise-Boolean expression, said first constant or said first expression being simpler than said second expression and said second expression being based on the value or the variables found in said first constant or said first expression, wherein evaluation of said second mixed mathematical and bitwise-Boolean expression produces a value which preserves the value of said first constant or said first expression, either:

with the original value of said first constant or the original value of the result of said first expression, in which case said second mixed mathematical and bitwise-Boolean expression is obtained from said first constant or said first expression by converting said first constant or said first expression by mathematical identities, or, in an encoded form, that is, as a new value, which can be converted back to the original said value of said first constant or said first expression by applying an information-preserving decoding function, in which case said second expression is obtained from said first constant or said first expression by modifying said first constant or said first expression by a combination of conversion according to mathematical identities and transformation according to an information preserving encoding function corresponding to the information preserving decoding function, wherein conversion of said original constant or expression is performed according to a mathematical identity of the form $$\sum_{i=1}^{k} a_i e_i = E$$

where $a_i$ are coefficients, $e_i$ are bitwise expressions, whether simple or complex, and E is said original constant or expression.

2. A method according to claim 1 wherein conversion of said original constant or expression is performed according to one or more mathematical identities derived by ordinary algebraic manipulation of an identity of the form $\Sigma_{i=1}^{k} a_i e_i = E$ where $a_i$ are coefficients, $e_i$ are bitwise expressions, and E is said original constant or expression.

3. A method according to claim 1 wherein conversion of said original constant or expression is preceded by conversion according to the mathematical identity $-x=\bar{x}+1$ wherein x is a variable, thereby further obfuscating and complicating the resulting code.

4. A method according to claim 1 wherein said first expression is a conditional comparison Boolean expression and said second expression is preceded by conversion according to the Boolean identity that x=0 iff $(-(x \wedge (-x))-1) <0$ wherein x is a variable, thereby further obfuscating and complicating the resulting code.

5. A method according to claim 1 wherein said second expression is preceded by conversion according to the Boolean identity that x=y iff x−y=0 wherein x and y are variables, thereby further obfuscating and complicating the resulting code.

6. A method according to claim 1 wherein said first expression is a Boolean inequality comparison expression and said second expression is preceded by conversion according to the Boolean identity that $x<y$ iff $((x \wedge \bar{y}) \vee ((\neg (x \oplus y)) \wedge (x-y))) < 0$ wherein x and y are variables, thereby further obfuscating and complicating the resulting code.

7. A method according to claim 1 wherein said first expression is a Boolean inequality comparison expression and said second expression is preceded by conversion according to the Boolean identity that $x<y$ iff $((\bar{x} \wedge y) \vee ((\bar{x} \vee y) \wedge (x-y)))) < 0$ wherein x and y are variables, thereby further obfuscating and complicating the resulting code.

8. A method according to claim 1 wherein said first constant or said first expression is a bitwise-Boolean constant or expression, and said mathematical identity is of the form $\sum_{i=1}^{k} a_i e_i = E$ where $a_i$, are coefficients, $e_i$, are bitwise expressions, whether simple or complex, and E is an expression yielding said first constant, or E is said first expression, and said mathematical identity is derived by a method comprising:

(a) summarizing said first expression, or an expression yielding said first constant, being an expression of t variables, as a truth table of two columns, with left column S and right column P, the left column S of which is a list of $2^t$ conjunctions, each conjunction being the logical and of each of said variables or a conjunction obtained from the logical and of each of said variables by complementing (i.e., logical not-ing) of some or all of those variables, such that each possible such conjunction appears exactly once, and the right column P of which is a list of $2^t$ Boolean (0 for false or 1 for true) values, where the pair in any given row of said table comprises a conjunction (in the left column S) and its Boolean value when said expression E is true (in the right column P);

(b) randomly choosing an invertible $2^t \times 2^t$ matrix A over Z/(2), and, if any column C of A is the same as the right (Boolean value) column P of said truth table, adding a randomly chosen nontrivial linear combination of other columns of A to said column C of A so that said column C of A differs from the right column P of said truth table, so that A is or becomes a randomly chosen invertible matrix with no column equal to P, said matrix thus being invertible, not only over Z/(2), but over Z/($2^n$) for any n>1 as well;

(c) solving the linear matrix equation AV=P over Z/($2^n$), where $2^n$ is the natural modulus of computations on the target execution platform for the code modified according to the instant invention, each element $v_i$ of V being a variable of said matrix equation for the solution column vector U of length $2^t$, where V=U, or equivalently, $v_i = u_i$ for i=1, . . . , $2^t$, is the solution to the linear matrix equation, each element $u_i$ of U being a $2^n$-bit constant; and (d) deriving the resulting mathematical identity $u_0 s_0 + u_1 s_1 + \ldots + u_k s_k = E$, where $k = 2^t - 1$.

9. An automated method according to claim 1 in which said identities are obtained and stored in an initial setup phase and in which said replacement of said first constant or first expression by said second expression is performed in a second, subsequent phase by matching said first expression or an expression for said first constant with said identities obtained in the initial phase and performing said replacement by selecting a randomly chosen matching identity, with or without encoding by a bijective function.

10. An automated method according to claim 9 in which said initial phase is not performed whenever the method is applied, but rather is performed once, or is performed only infrequently, whereas said second phase of matching and replacement is performed whenever said method is applied, so that the initial phase, which is computationally intensive, is performed rarely, whereas said second phase, which is less computationally demanding, is performed frequently.

11. An automated method according to claim 10 in which said initial phase is performed once during the construction of a compiler or compiler-like program translation tool, and in which said second phase is performed by said compiler or compiler-like translation tool acting on software to be protected according to the instant invention.

12. An automated method according to claim 11 in which said compiler or compiler-like program is an obfuscating compiler or a compiler which adds tamper-resistance to software or which adds a combination of obfuscation and tamper-resistance to the programs which it processes, and which said addition of obfuscation and tamper-resistance is augmented by taking as said first constant or expression, a constant or expression installed by said obfuscating or tamper-resistance-adding compiler for the purpose of adding obfuscation or tamper resistance, and strengthening said obfuscation or tamper-resistance by replacing an expression for said first constant or said first expression according to stored identities obtained and stored in said first phase, and applied during the operation of said obfuscating, tamper-resistance-adding compiler in said second phase.

13. An automated method for rendering a software program resistant to reverse engineering analysis, whereby existing methods are based on substituting, modifying, or encoding computational expressions or statements, in any one of the following application: the computational expressions or statements themselves to be protected, the computational expressions or statements being used to render control flow obscure or tamper-resistant, the computational expressions or statements being used to render data addressing obscure or tamper-resistant, the computational expressions or statements being used to render accesses to large bodies of data obscure or tamper-resistant, or the computational expressions or statements being used for some combination computation protection, control-flow protection, data-addressing-protection, or protection of accesses to large bodies of data, the method comprising:

replacing at least one first constant or first expression in such a computational expression or statement, whether said computational expression or statement is in source code or binary code form, of said software program, with a second expression, said first expression being a mathematical expression, a Boolean expression, or a bitwise-Boolean expression, said second expression being a mixed mathematical and bitwise-Boolean expression, said first constant or said first expression being simpler than said second expression and said second expression being based on the value or the variables found in said first constant or said first expression, wherein evaluation of said second mixed mathematical and bitwise-Boolean expression produces a value which preserves the value of said first constant or said first expression, either:

with the original value of said first constant or the original value of the result of said first expression, in which case said second mixed mathematical and bitwise-Boolean expression is obtained from said first constant or said first expression by converting said first constant or said first expression by mathematical identities, or, in an encoded form, that is, as a new value, which can be converted back to the original said value of said first constant or said first expression by applying an information-preserving decoding function, in which case said second expression is obtained from said first constant or said first expression by modifying said first constant or said first expression by a combination of conversion according to mathematical identities and transformation according to an information preserving encoding function corresponding to the information preserving decoding function, wherein conversion of said original constant or expression is performed according to a mathematical identity of the form $$\sum_{i=1}^{k} a_i e_i = 0$$

where $a_i$ are coefficients and $e_i$ are bitwise expressions, whether simple or complex.

14. A method according to claim 13 wherein conversion of said original constant or expression is performed according to one or more mathematical identities derived by ordinary algebraic manipulation of an identity of the form $\sum_{i=1}^{k} a_i e_i = 0$ where $a_i$ are coefficients and $e_i$ are bitwise expressions, whether simple or complex.

15. A method according to claim 13 wherein said mathematical identity is of the form $$\sum_{i=1}^{k} a_i e_i = 0$$

where $a_i$, are coefficients and $e_i$ are bitwise expressions, whether simple or complex, and said mathematical identity is derived by a method comprising:

(a) for a set of t variables, choosing a set of k bitwise Boolean expressions $e_1, \ldots, e_k$ of those t variables, such that, when we construct the k truth tables of said k bitwise Boolean expressions, where the ith truth table is the truth table for bitwise Boolean expression $e_i$, and contains two columns, with left column $S_i$ and right column $P_i$, the left column $S_i$ of which is a list of $2^t$ conjunctions, each conjunction being the logical and of each of said t variables or a conjunction obtained from the logical and of each of said t variables by complementing (i.e., logical not-ing) of some or all of said t variables, such that each possible such conjunction appears exactly once, and the right column $P_i$, of which is a list of $2^t$ Boolean (0 for false or 1 for true) values, where the pair in any given row of said table comprises a conjunction (in the left column $S_i$) and its Boolean value when said expression $e_i$ is true (in the right column $P_i$), then the k value columns of the k truth tables, $P_1, \ldots, P_k$, are linearly dependent over $Z/(2^n)$; that is, there are k nonzero coefficients $a_1, \ldots, a_k$ chosen from the ring $Z/(2^n)$ such that the vector $a_1 P_1 + a_2 P_2 + \ldots + a_k P_k$ is the all-zeroes vector; and, (b) deriving as a consequence of this fact the identity $$\sum_{i=1}^{k} a_i e_i = 0$$

where $a_i, \ldots, a_k$ are said k nonzero coefficients and $e_1, \ldots, e_k$ are said k bitwise Boolean expressions.

16. An automated method for rendering a software program resistant to reverse engineering analysis, whereby existing methods are based on substituting, modifying, or encoding computational expressions or statements, in any one of the following application: the computational expressions or statements themselves to be protected, the computational expressions or statements being used to render control flow obscure or tamper-resistant, the computational expressions or statements being used to render data addressing obscure or tamper-resistant, the computational expressions or statements being used to render accesses to large bodies of data obscure or tamper-resistant, or the computational expressions or statements being used for some combination computation protection, control-flow protection, data-addressing-protection, or protection of accesses to large bodies of data, the method comprising:

replacing at least one first constant or first expression in such a computational expression or statement, whether said computational expression or statement is in source code or binary code form, of said software program, with a second expression, said first expression being a mathematical expression, a Boolean expression, or a bitwise-Boolean expression, said second expression being a mixed mathematical and bitwise-Boolean expression, said first constant or said first expression being simpler than said second expression and said second expression being based on the value or the variables found in said first constant or said first expression, wherein evaluation of said second mixed mathematical and bitwise-Boolean expression produces a value which preserves the value of said first constant or said first expression, either:

with the original value of said first constant or the original value of the result of said first expression, in which case said second mixed mathematical and bitwise-Boolean expression is obtained from said first constant or said first expression by converting said first constant or said first expression by mathematical identities, or, in an encoded form, that is, as a new value, which can be converted back to the original said value of said first constant or said first expression by applying an information-preserving decoding function, in which case said second expression is obtained from said first constant or said first expression by modifying said first constant or said first expression by a combination of conversion according to mathematical identities and transformation according to an information preserving encoding function corresponding to the information preserving decoding function, said at least one first constant, mathematical expression, Boolean expression in source code is an expression producing a vector-valued result, the constants or variables of which include a vector-valued variable or variables, and in which the value of said second mixed mathematical and bitwise-Boolean expression preserves the value of the said at least one first constant, mathematical expression, Boolean expression or bitwise-Boolean expression in source code in encoded form, where the encoding employed in said encoded form is obtained by computing a function of the result of said first constant, mathematical expression, Boolean expression, or bit-wise-Boolean expression, said function being a deeply nonlinear function $f$ constructed by a method comprising:

(a) selecting numbers n, u, and v, such that n=u+v;
(b) selecting finite fields which are specific representations N, U, and V of finite fields $GF(2^n)$, $GF(2^u)$, and $GF(2^v)$, respectively;
(c) selecting p and q with q not less than p and with each of p and q not less than 3;
(d) randomly selecting 1-to-1 linear functions $L: U^p \rightarrow U^q$ and $G_0, G_1, \ldots, G_{k-1}: V^p \rightarrow V^q$, where each of p, q, and k is at least 2 and k is a power of 2 and k is not greater than $2^u$;
(e) randomly selecting a linear function $z: U^p \rightarrow U$ and obtaining from z a function $s: U^p \rightarrow \{0, 1, \ldots, k-1\}$ by selecting, by a bitwise-Boolean operation, the low order m bits of z's output, where $k=2^m$; or alternatively, directly choosing a random onto function $s: U^p \rightarrow \{0, 1, \ldots, k-1\}$;
(f) building the function $f$ from the above-constructed components, where $f: N^p \rightarrow N^q$ is computed by computing the leftmost u bits of all of its output vector elements by applying L to the vector P obtained by taking only the leftmost u bits of its input vector elements, and computing the rightmost v bits of all of its output vector elements by applying $G_{s(P)}$ to the vector Q obtained by taking only the rightmost v bits of its input vector elements, so that the output bits supplied by L(P) and those supplied by $G_{s(P)}$ (Q) are interleaved throughout the output; and
(g) testing $f$ by enumeration of the frequency of occurrence of its 1-by-1 projections to determine whether $f$ is deeply nonlinear, and if not, repeating the above construction until a deeply nonlinear function $f$ is obtained.

17. A method according to claim 16 in which linear functions $L: U^p \rightarrow U^q$ and $G_0, G_1, \ldots, G_{k-1}: V^p \rightarrow V^q$, are not merely 1-to-1, but also bijective, so that both $f$ and its inverse are bijective deeply nonlinear encodings.

18. A method according to claim 16 in which linear functions $L: U^p \rightarrow U^q$ and $G_0, G_1, \ldots, G_{k-1}: V^p \rightarrow V^q$, are not merely 1-to-1, but also maximum distance separable, so that the input information is distributed evenly over the output, and so that $f$, and also its inverse $f^1$ if $f$ is bijective, are maximum distance separable deeply nonlinear functions.

* * * * *